(12) United States Patent
Chang et al.

(10) Patent No.: US 10,558,009 B2
(45) Date of Patent: Feb. 11, 2020

(54) OPTICAL IMAGE CAPTURING SYSTEM AND ELECTRONIC DEVICE

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLGOY CO. LTD., Taichung (TW)

( * ) Notice: Subject to any disclaimer, the term of this patent is extended or adjusted under 35 U.S.C. 154(b) by 71 days.

(21) Appl. No.: 15/680,750

(22) Filed: Aug. 18, 2017

(65) Prior Publication Data
US 2018/0321456 A1    Nov. 8, 2018

(30) Foreign Application Priority Data

May 5, 2017   (TW) .............................. 106115053 A

(51) Int. Cl.
| G02B 7/00 | (2006.01) |
| G02B 7/02 | (2006.01) |
| G02B 9/12 | (2006.01) |
| G02B 9/60 | (2006.01) |
| G02B 9/62 | (2006.01) |

(Continued)

(52) U.S. Cl.
CPC ............. *G02B 7/021* (2013.01); *G02B 7/003* (2013.01); *G02B 7/025* (2013.01); *G02B 9/12* (2013.01); *G02B 9/60* (2013.01); *G02B 9/62* (2013.01); *G02B 9/64* (2013.01); *G02B 13/0045* (2013.01); *G02B 9/14* (2013.01); *G02B 9/34* (2013.01);

(Continued)

(58) Field of Classification Search
CPC .......... G02B 7/021; G02B 7/003; G02B 7/02; G02B 7/022; G02B 7/023; G02B 7/025; G02B 7/026; G02B 9/04; G02B 9/12; G02B 9/34; G02B 9/60; G02B 9/62; G02B 9/64; G02B 13/003; G02B 13/0035; G02B 13/004; G02B 13/0045
See application file for complete search history.

(56) References Cited

U.S. PATENT DOCUMENTS

| 2011/0025903 A1* | 2/2011 | Naoi ........................ G02B 9/34 348/340 |
| 2011/0134305 A1* | 6/2011 | Sano ................... G02B 13/0045 348/340 |

(Continued)

FOREIGN PATENT DOCUMENTS

| JP | 2009031694 A | 2/2009 |
| TW | 201617674 A | 5/2016 |

(Continued)

*Primary Examiner* — Jordan M Schwartz
(74) *Attorney, Agent, or Firm* — Muncy, Geissler, Olds & Lowe, P.C.

(57) ABSTRACT

The invention discloses an at least two optical lenses for capturing image and an optical module for capturing image. The optical image capturing system comprises at least three pieces of optical lenses, an image plane, a first positioning element and a second positioning element. In certain conditions, the design of said optical image capturing system can achieve effects of simultaneously increasing input light, field of view, illuminance and improving the imagining quality in compact cameras.

25 Claims, 26 Drawing Sheets

(51) Int. Cl.
     *G02B 9/64*        (2006.01)
     *G02B 13/00*     (2006.01)
     *G02B 9/34*        (2006.01)
     *G02B 9/14*        (2006.01)

(52) U.S. Cl.
     CPC ........ *G02B 13/004* (2013.01); *G02B 13/0035* (2013.01)

(56) References Cited

U.S. PATENT DOCUMENTS

| | | | |
|---|---|---|---|
| 2016/0116707 A1* | 4/2016 | Chen | G02B 13/004 359/740 |
| 2016/0124187 A1* | 5/2016 | Chen | G02B 13/0045 348/373 |
| 2016/0282586 A1* | 9/2016 | Hsu | G02B 13/0045 |
| 2018/0164546 A1* | 6/2018 | Dai | G02B 13/0045 |

FOREIGN PATENT DOCUMENTS

| | | |
|---|---|---|
| TW | 201640172 A | 11/2016 |
| TW | 201708865 A | 3/2017 |
| TW | 201712391 A | 4/2017 |
| TW | 201713983 A | 4/2017 |

\* cited by examiner

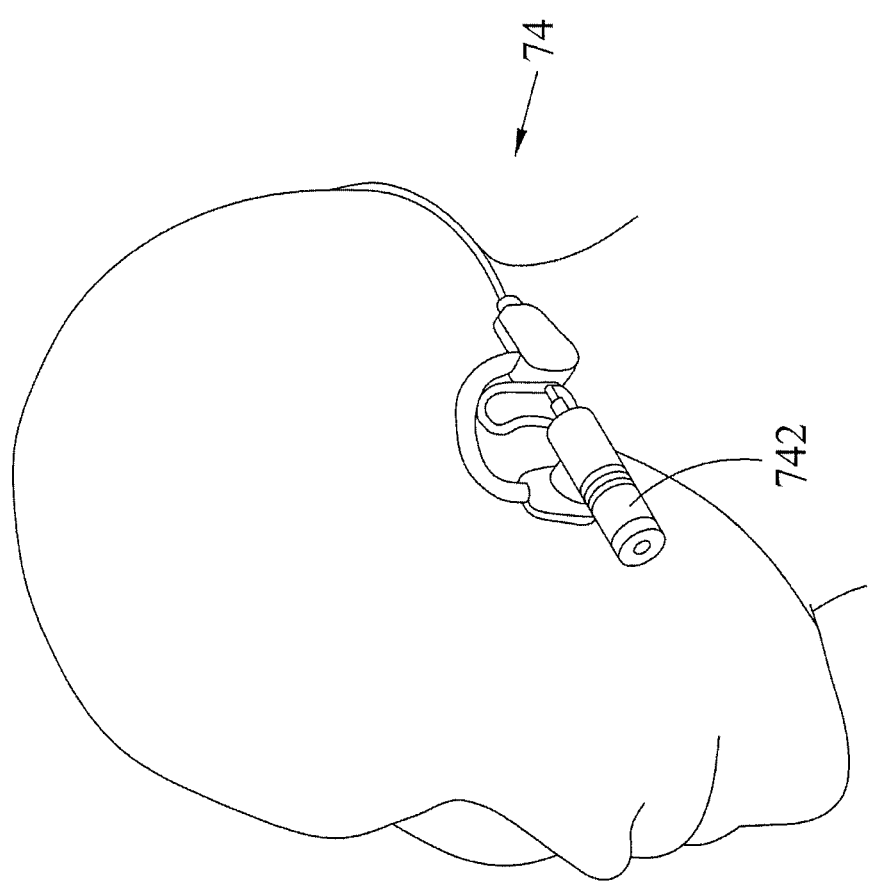

OPTICAL IMAGE CAPTURING SYSTEM AND ELECTRONIC DEVICE

CROSS-REFERENCE TO RELATED APPLICATION

This application claims priority from Taiwan Patent Application No. 106115053, filed on May 5, 2017, in the Taiwan Intellectual Property Office, the content of which is hereby incorporated by reference in its entirety for all purposes.

BACKGROUND OF THE INVENTION

1. Field of the Invention

The present invention generally relates to an optical system, and more particularly to a compact optical image capturing system for an electronic device.

2. Description of the Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). Also, as advanced semiconductor manufacturing technology enables the minimization of the pixel size of the image sensing device, the development of the optical image capturing system towards the field of high pixels. Therefore, the requirement for high imaging quality is rapidly raised.

Conventional optical systems of portable electronic devices usually adopt two-lens structure as main structure. However, since the pixel of the portable electronic devices continuously increase, and more end-users are demanding for cameras having large aperture, which is equipped with functionalities such as low light mode or night mode. The conventional optical image capturing systems may not be sufficient to meet those advanced photography requirements.

Therefore, it is an important issue about how to effectively increase the amount of light admitted into the optical image capturing system and further elevate the image quality thereof.

SUMMARY OF THE INVENTION

The aspect of embodiment of the present disclosure directs to an optical image capturing system and an optical image capturing lens which use combination of refractive powers, convex and concave surfaces of at least two optical lenses (the convex or concave surface in the disclosure denotes the geometrical shape of an image-side surface or an object-side surface of each lens on an optical axis), and use mechanism elements with thread-less configuration and thin thickness, so as to effectively increase the amount of illuminance into the optical image capturing system and the field of view of the optical imaging lens, to be equipped with certain relative illuminance, and to improve the total pixels and quality of image formation, such that the optical image capturing system of present invention may be applied to minimized or narrow-frame electronic products.

The term and definition pertaining to the mechanism element parameters in the embodiment of the present invention are shown below for further reference:

Please refer to FIG. 1C, which is shown for explaining the terms of identical mechanism elements in each embodiment of present invention by taking the first embodiment of present invention for example. The optical image capturing system comprises an image sensing element S. The optical image capturing system may further comprise a first lens positioning element, denoted as PE1 (Positioning Element 1) and formed of a material which may be metal such as aluminum, copper, silver and gold, or plastic such as PC and LCP. The first lens positioning element comprises a lens holder PEH and a base seat PEB, wherein the lens holder PEH is configured to be near to the object side, hollow and opaque for shielding the optical imaging lens assembly, while the base seat PEB has an open accommodating space, and configured in a direction approaching the image plane for shielding the image plane. The maximum of a smallest side length on a plane of a periphery of the base seat PEB and perpendicular to the optical axis is PhiD. The first lens positioning element PE1 may be selected as the commonly known Holder or belong to the integrally formed mechanism member. Furthermore, the optical image capturing system may also comprise a second lens positioning element, denoted as PE2 (Positioning Element 2), with a hollow-tubular shape and opaque property, accommodated in the lens holder PEH and comprising a positioning portion PEP, wherein the positioning portion PEP is utilized to accommodate the optical imaging lens assembly so as to make the lenses arranged on the optical axis as an alignment function. An external side of the positioning portion PEP does not contact inner sides of the lens holder PEH. A maximum diameter on a plane of a periphery of an image-side surface of the positioning portion PEP and perpendicular to the optical axis is PhiC. A maximum thickness of a smallest side length of the base seat PEB is TH1. A minimum thickness of the positioning portion PEP is TH2.

Regarding the optical image capturing system, since the external side of the positioning portion PEP of the second lens positioning element PE2 does not contact the inner sides of the lens holder PEH of the first lens positioning element PE1, curable glues may be smeared on the first lens positioning element PE1 and the second lens positioning element PE2 in advance, the optical axis of the optical imaging lens assembly is then adjusted to overlap the normal line at the center of the image sensing element S, and the step of curing the curable glues is subsequently performed. That is, the so-called active alignment assembly method is performed. Currently, with respect to more complicated optical image capturing system or specific applications such as the assembly of lenses, the active alignment technique is essential therein, and the optical capturing system of present invention may exactly meet the said requirement.

The term and its definition to the lens parameter in the embodiment of the present are shown below for further reference.

The Lens Parameter Related to a Length or a Height of the Lens

The maximum height of an image of the optical image capturing system is expressed as HOI. The height of the optical image capturing system is expressed as HOS. The distance from the object-side surface of the first lens to the image-side surface of the last lens of the optical image capturing system is expressed as InTL. The distance from a fixed aperture (stop) to the image plane of the optical image capturing system is expressed as InS. The distance from the first lens to the second lens of the optical image capturing system is expressed as IN12 (example). The thickness of the first lens of the optical image capturing system on the optical axis is expressed as TP1 (example).

The Lens Parameter Related to a Material of the Lens

A coefficient of dispersion of the first lens in the optical image capturing system is expressed as NA1 (example); a refractive index of the first lens is expressed as Nd1 (example).

The Lens Parameter Related to Angle of View

An angle of view is expressed as AF. Half of the angle of view is expressed as HAF. An angle of a chief ray is expressed as MRA.

The Lens Parameter Related to the Exit/Entrance Pupil

An entrance pupil diameter of the optical image capturing system is expressed as HEP. The maximum effective half diameter (EHD) of any surface of a single lens refers to a perpendicular height between the optical axis and an intersection point, where the incident ray at the maximum view angle passing through the most marginal entrance pupil intersects with the surface of the lens. For example, the maximum effective half diameter of the object-side surface of the first lens is expressed as EHD11. The maximum effective half diameter of the image-side surface of the first lens is expressed as EHD 12. The maximum effective half diameter of the object-side surface of the second lens is expressed as EHD21. The maximum effective half diameter of the image-side surface of the second lens is expressed as EHD22. The maximum effective half diameters of any surfaces of other lens in the optical image capturing system are expressed in the similar way. A maximum effective diameter of an image-side surface of a lens closest to the image plane among the optical imaging lens assembly is PhiA, and a formula as follows is satisfied: PhiA=2 EHD, wherein if the surface is aspheric, the cut-off point of the maximum effective diameter may include the cut-off point of the aspheric surface. An ineffective half diameter denoted as IHD means the surface section extended from the cut-off point (if the surface is aspheric, the cut-off point is the end point with an aspheric parameter on the surface) of the maximum effective diameter on the same surface and in the direction away from the optical axis. A maximum diameter of an image-side surface of a lens closest to the image plane among the optical imaging lens assembly is PhiB, and a formula as follows is satisfied: PhiB=2 (EHD+IHD)=PhiA+2 (IHD).

A maximum effective diameter of an image-side surface of a lens closest to the image plane (i.e. the image space) in the optical image capturing system is also called as an optical exit pupil, denoted as PhiA. If the optical exit pupil is positioned on the image-side surface of the third lens, the optical exit pupil is denoted as PhiA3. If the optical exit pupil is positioned on the image-side surface of the fourth lens, the optical exit pupil is denoted as PhiA4. If the optical exit pupil is positioned on the image-side surface of the fifth lens, the optical exit pupil is denoted as PhiA5. If the optical exit pupil is positioned on the image-side surface of the sixth lens, the optical exit pupil is denoted as PhiA6. If the optical image capturing system has more lenses with refractive power, the optical exit pupil thereof is denoted in the similar way as described above. Besides, a pupil ratio of the optical image capturing system is denoted as PMR, and a condition as follows is satisfied: PMR=PhiA/HEP.

The Lens Parameter Related to the Arc Length of the Lens Shape and the Outline of Surface of the Lens The outline curve length of the maximum effective half diameter of any surface of single lens refers to an arc length of a curve, which starts from an intersection point as an initial point where the surface of the lens intersects the optical axis of the optical image capturing system, travels along the surface outline of the lens, and ends at the point which defines the maximum effective half diameter; the arc length between the aforementioned two points is the outline curve length of the maximum effective half diameter, and denoted as ARS. For example, the length of the maximum effective half diameter outline curve of the object-side surface of the first lens is denoted as ARS11. The length of the maximum effective half diameter outline curve of the image-side surface of the first lens is denoted as ARS12. The length of the maximum effective half diameter outline curve of the object-side surface of the second lens is denoted as ARS21. The length of the maximum effective half diameter outline curve of the image-side surface of the second lens is denoted as ARS22. The outline curve lengths of the maximum effective half diameter of any surface of the other lenses in the optical image capturing system are denoted according to the regular pattern shown above.

The outline curve length of ½ entrance pupil diameter (HEP) of any surface of single lens refers to an arc length of curve, which starts from an intersection point as an initial point where the surface of the lens intersects the optical axis of the optical image capturing system, travels along the surface outline of the lens, and ends at a coordinate point on the surface where the vertical height from the optical axis to the coordinate point is equivalent to ½ entrance pupil diameter; the arc length between the aforementioned two points is the outline curve length of the ½ entrance pupil diameter (HEP), and denoted as ARE. For example, the outline curve length of the ½ entrance pupil diameter (HEP) of the object-side surface of the first lens is denoted as ARE11. The outline curve length of the ½ entrance pupil diameter (HEP) of the image-side surface of the first lens is denoted as ARE12. The outline curve length of the ½ entrance pupil diameter (HEP) of the object-side surface of the second lens is denoted as ARE21. The outline curve length of the ½ entrance pupil diameter (HEP) of the image-side surface of the second lens is denoted as ARS22. The outline curve lengths of the ½ entrance pupil diameter (HEP) of any surface of the other lenses in the optical image capturing system are denoted according to the regular pattern shown above.

The Lens Parameter Related to the Surface Depth of the Lens

The distance paralleling an optical axis, which is measured from the intersection point where the object-side surface of the sixth lens crosses the optical axis to the terminal point of the maximum effective half diameter of the object-side surface of the sixth lens is expressed as InRS61 (depth of the EHD). The distance paralleling an optical axis, which is measured from the intersection point where the image-side surface of the sixth lens crosses the optical axis to the terminal point of the maximum effective half diameter of the image-side surface of the sixth lens is expressed as InRS62 (depth of the EHD). The depths of the EHD (sinkage values) on the object-side surface or the image-side surface of other lens are expressed in the similar way.

The Lens Parameter Related to the Shape of the Lens

The critical point C is a point which is tangential to the tangential plane being perpendicular to the optical axis on the specific surface of the lens except that an intersection point which crosses the optical axis on the specific surface of the lens. In addition to the description above, for example, the perpendicular distance between the critical point C51 on the object-side surface of the fifth lens and the optical axis is HVT51 (example). The perpendicular distance between a critical point C52 on the image-side surface of the fifth lens and the optical axis is HVT52 (example). The perpendicular distance between the critical point C61 on the object-side surface of the sixth lens and the optical axis is HVT61 (example). The perpendicular distance between a critical point C62 on the image-side surface of the sixth lens and the optical axis is HVT62 (example). The perpendicular distances between the critical point on the image-side surface or object-side surface of other lens and the optical axis are expressed in the similar way.

The object-side surface of the seventh lens has one inflection point IF711 which is the nearest to the optical axis, and the sinkage value of the inflection point IF711 is denoted by SGI711 (instance). A distance perpendicular to the optical axis between the inflection point IF711 and the optical axis is HIF711 (instance). The image-side surface of the seventh lens has one inflection point IF721 which is nearest to the optical axis, and the sinkage value of the inflection point IF721 is denoted by SGI721 (instance). A distance perpendicular to the optical axis between the inflection point IF721 and the optical axis is HIF721 (instance).

The object-side surface of the seventh lens has one inflection point IF712 which is the second nearest to the optical axis, and the sinkage value of the inflection point IF712 is denoted by SGI712 (instance). A distance perpendicular to the optical axis between the inflection point IF712 and the optical axis is HIF712 (instance). The image-side surface of the seventh lens has one inflection point IF722 which is the second nearest to the optical axis, and the sinkage value of the inflection point IF722 is denoted by SGI722 (instance). A distance perpendicular to the optical axis between the inflection point IF722 and the optical axis is HIF722 (instance).

The object-side surface of the seventh lens has one inflection point IF713 which is the third nearest to the optical axis, and the sinkage value of the inflection point IF713 is denoted by SGI713 (instance). A distance perpendicular to the optical axis between the inflection point IF713 and the optical axis is HIF713 (instance). The image-side surface of the seventh lens has one inflection point IF723 which is the third nearest to the optical axis, and the sinkage value of the inflection point IF723 is denoted by SGI723 (instance). A distance perpendicular to the optical axis between the inflection point IF723 and the optical axis is HIF723 (instance).

The object-side surface of the seventh lens has one inflection point IF714 which is the fourth nearest to the optical axis, and the sinkage value of the inflection point IF714 is denoted by SGI714 (instance). A distance perpendicular to the optical axis between the inflection point IF714 and the optical axis is HIF714 (instance). The image-side surface of the seventh lens has one inflection point IF724 which is the fourth nearest to the optical axis, and the sinkage value of the inflection point IF724 is denoted by SGI724 (instance). A distance perpendicular to the optical axis between the inflection point IF724 and the optical axis is HIF724 (instance).

An inflection point, a distance perpendicular to the optical axis between the inflection point and the optical axis, and a sinkage value thereof on the object-side surface or image-side surface of other lenses is denoted in the same way.

The Lens Parameter Related to the Aberration

The optical distortion for image formation in the optical image capturing system is expressed as ODT. TV distortion for image formation in the optical image capturing system is expressed as TDT. Furthermore, the degree of aberration offset can be further described within the limited range of 50% to 100% field of view of the formed image. The offset of the spherical aberration is expressed as DFS. The offset of the coma aberration is expressed as DFC.

The present invention provides an optical image capturing system. The object-side surface or the image-side surface of the sixth lens of the optical image capturing system may be provided with the inflection point which can adjust each angle of view striking the sixth lens and conduct amendment for the optical distortion and TV distortion. Besides, the surface of the sixth lens may be provided with the function of the preferable adjustment about the optical path so as to elevate the quality of the image.

In the present invention, an optical image capturing system is provided, which comprises: an optical imaging lens assembly, comprising at least two lenses having refractive power; an image plane; a first lens positioning element, comprising a lens holder and a base seat, wherein the lens holder is hollow and opaque for shielding the optical imaging lens assembly, the base seat is configured in a direction approaching the image plane for shielding the image plane, a maximum of a smallest side length on a plane of a periphery of the base seat and perpendicular to an optical axis is PhiD; and a second lens positioning element, accommodated in the lens holder and comprising a positioning portion, wherein the positioning portion is hollow for accommodating the optical imaging lens assembly so as to make the lenses arranged on the optical axis, an external side of the positioning portion does not contact inner sides of the lens holder, a maximum diameter on a plane of a periphery of an image-side surface of the positioning portion and perpendicular to the optical axis is PhiC, a focal length of the optical imaging lens assembly is f, an entrance pupil diameter of the optical imaging lens assembly is HEP, a half maximum angle of view of the optical imaging lens assembly is HAF, and conditions as follows are satisfied: $1.0 \leq f/HEP \leq 10.0$, $0 \deg < HAF \leq 150 \deg$, and $0 mm < PhiD \leq 18 mm$.

In the present invention, another optical image capturing system is provided, which comprises: an optical imaging lens assembly, comprising at least two lenses having refractive power; an image plane; a first lens positioning element, comprising a lens holder and a base seat, wherein the lens holder is hollow and opaque for shielding the optical imaging lens assembly, the base seat is configured in a direction approaching the image plane for shielding the image plane, a maximum of a smallest side length on a plane of a periphery of the base seat and perpendicular to an optical axis is PhiD; and a second lens positioning element, accommodated in the lens holder and comprising a positioning portion, wherein the positioning portion is hollow for accommodating the optical imaging lens assembly so as to make the lenses arranged on the optical axis, an external side of the positioning portion does not contact inner sides of the lens holder, a maximum diameter on a plane of a periphery of an image-side surface of the positioning portion and perpendicular to the optical axis is PhiC, a focal length of the optical imaging lens assembly is f, an entrance pupil diameter of the optical imaging lens assembly is HEP, a half maximum angle of view of the optical imaging lens assembly is HAF, a maximum thickness of a smallest side length of the base seat is TH1, a minimum thickness of the positioning portion is TH2, and conditions as follows are satisfied: $1.0 \leq f/HEP \leq 10.0$, $0 \deg < HAF \leq 150 \deg$, $0 mm < PhiD \leq 16 mm$, and $0 mm < TH1+TH2 \leq 1.5 mm$.

In the present invention, one more optical image capturing system is provided, which comprises: an optical imaging lens assembly, comprising at least three lenses having refractive power; an image plane; a first lens positioning element, comprising a lens holder and a base seat, wherein the lens holder is hollow and opaque for shielding the optical imaging lens assembly, the base seat is configured in a direction approaching the image plane for shielding the image plane, a maximum of a smallest side length on a plane of a periphery of the base seat and perpendicular to an optical axis is PhiD; and a second lens positioning element, accommodated in the lens holder and comprising a positioning portion, wherein the positioning portion is hollow for accommodating the optical imaging lens assembly so as to make the lenses arranged on the optical axis, an external side of the positioning portion does not contact inner sides of the lens holder, a maximum diameter on a plane of a periphery of an image-side surface of the positioning portion and perpendicular to the optical axis is PhiC, a focal length of the optical imaging lens assembly is f, an entrance pupil diameter of the optical imaging lens assembly is HEP, a half maximum angle of view of the optical imaging lens assembly is HAF, a maximum thickness of a smallest side length of the base seat is TH1, a minimum thickness of the positioning portion is TH2, and conditions as follows are satisfied: $1.0 \leq f/HEP \leq 10.0$, $0 \deg < HAF \leq 150 \deg$, $0 mm < PhiD \leq 18 mm$, $0 mm < TH1 \leq 0.3 mm$, and $0 mm < TH2 \leq 0.3 mm$.

The length of the outline curve of any surface of a signal lens element in the maximum effective half diameter position affects the functions of the surface aberration correction and the optical path difference in each view field. The longer outline curve may lead to a better function of aberration correction, but the difficulty of the production may become inevitable. Hence, the length of the outline curve of the maximum effective half diameter position of any surface of a signal lens element (ARS) has to be controlled, and especially, the ratio relations (ARS/TP) between the length of the outline curve of the maximum effective half diameter position of the surface (ARS) and the thickness of the lens element to which the surface belongs on the optical axis (TP) has to be controlled. For example, the length of the outline curve of the maximum effective half diameter position of the object-side surface of the first lens element is denoted as ARS11, and the thickness of the first lens element on the optical axis is TP1, and the ratio between both of them is ARS11/TP1. The length of the outline curve of the maximum effective half diameter position of the image-side surface of the first lens element is denoted as ARS12, and the ratio between ARS12 and TP1 is ARS12/TP1. The length of the outline curve of the maximum effective half diameter position of the object-side surface of the second lens element is denoted as ARS21, and the thickness of the second lens element on the optical axis is TP2, and the ratio between both of them is ARS21/TP2. The length of the outline curve of the maximum effective half diameter position of the image-side surface of the second lens element is denoted as ARS22, and the ratio between ARS22 and TP2 is ARS22/TP2. The ratio relations between the lengths of the outline curve of the maximum effective half diameter position of any surface of the other lens elements and the thicknesses of the lens elements to which the surfaces belong on the optical axis (TP) are denoted in the similar way.

The length of outline curve of half of an entrance pupil diameter of any surface of a single lens element especially affects the functions of the surface aberration correction and the optical path difference in each shared view field. The longer outline curve may lead to a better function of aberration correction, but the difficulty of the production may become inevitable. Hence, the length of outline curve of half of an entrance pupil diameter of any surface of a single lens element has to be controlled, and especially, the ratio relationship between the length of outline curve of half of an entrance pupil diameter of any surface of a single lens element and the thickness on the optical axis has to be controlled. For example, the length of outline curve of the half of the entrance pupil diameter of the object-side surface of the first lens element is denoted as ARE11, and the thickness of the first lens element on the optical axis is TP1, and the ratio thereof is ARE11/TP1. The length of outline curve of the half of the entrance pupil diameter of the image-side surface of the first lens element is denoted as ARE12, and the thickness of the first lens element on the optical axis is TP1, and the ratio thereof is ARE12/TP1. The length of outline curve of the half of the entrance pupil diameter of the object-side surface of the first lens element is denoted as ARE21, and the thickness of the second lens element on the optical axis is TP2, and the ratio thereof is ARE21/TP2. The length of outline curve of the half of the entrance pupil diameter of the image-side surface of the second lens element is denoted as ARE22, and the thickness of the second lens element on the optical axis is TP2, and the ratio thereof is ARE22/TP2. The ratio relationship of the remaining lens elements of the optical image capturing system can be denoted in the similar way as mentioned above.

BRIEF DESCRIPTION OF THE DRAWINGS

The structure, operating principle and effects of the present invention will be described in detail by way of various embodiments which are illustrated in the accompanying drawings.

FIG. 7D shows a schematic view of the optical image capturing system applied to a smart head-mounted device, in accordance with the present invention;

DETAILED DESCRIPTION OF THE PREFERRED EMBODIMENTS

Figure 1A:
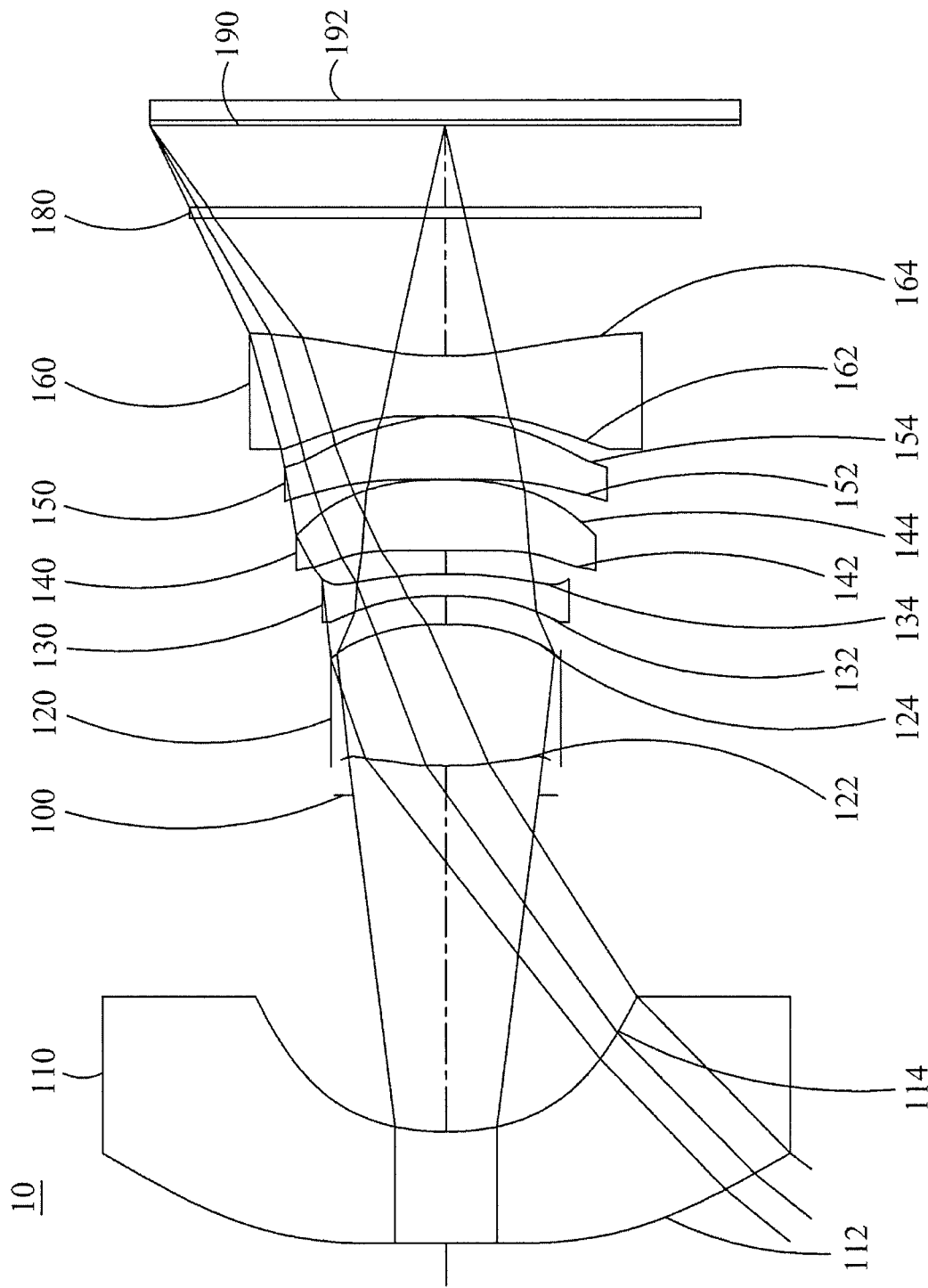
FIG. 1A is a schematic diagram of an optical image capturing system of a first embodiment of the present invention.

The optical image capturing system may use three sets of operation wavelengths, which are respectively 486.1 nm, 587.5 nm and 656.2 nm, and 587.5 nm is served as the primary reference wavelength and a reference wavelength to obtain technical features of the optical image capturing system. The optical image capturing system may also use five sets of wavelengths which are respectively 470 nm, 510 nm, 555 nm, 610 nm and 650 nm, and 555 nm is served as the primary reference wavelength and a reference wavelength to obtain technical features of the optical system.

The ratio of the focal length f of the optical image capturing system to a focal length fp of each lens with positive refractive power is PPR. The ratio of the focal length f of the optical image capturing system to a focal length fn of each lens with negative refractive power is NPR. The sum of the PPR of all lenses with positive refractive powers is ΣPPR. The sum of the NPR of all lenses with negative refractive powers is ΣNPR. The total refractive power and the total length of the optical image capturing system can be controlled easily when meeting following conditions: $0.5 \leq \Sigma PPR/|\Sigma NPR| \leq 15$. Preferably, the following condition may be satisfied: $1 \leq \Sigma PPR/|\Sigma NPR| \leq 3.0$.

The optical image capturing system may further include an image sensing device which is disposed on an image plane. Half of a diagonal of an effective detection field of the image sensing device (i.e. the imaging height or the maximum image height of the optical image capturing system) is HOI. The distance on the optical axis from the object-side surface of the first lens to the image plane is HOS. They meet the following conditions: $HOS/HOI \leq 50$ and $0.5 \leq HOS/f \leq 150$. Preferably, the following conditions may be satisfied: $1 \leq HOS/HOI \leq 40$ and $1 \leq HOS/f \leq 140$. Hereby, the configuration can keep the miniaturization of the optical image capturing system to collocate with light and thin portable electronic product.

In addition, in the optical image capturing system of the present invention, according to different requirements, at least one aperture may be arranged to reduce stray light and it is helpful to elevate the imaging quality.

In the optical image capturing system of the present invention, the aperture may be a front or middle aperture. Wherein, the front aperture is the aperture disposed between a photographed object and the first lens and the middle aperture is the aperture disposed between the first lens and the image plane. In the case that the aperture is the front aperture, it can make the optical image capturing system generate a longer distance between the exit pupil and the image plane thereof, such that the optical image capturing system can accommodate more optical elements and the efficiency of the image sensing device in receiving image can be increased; In the case that the aperture is the middle aperture, it is helpful to expand the angle of view of the optical image capturing system, such that the optical image capturing system has an advantage of the wide angle camera lens. The distance from the foregoing aperture to the image plane is InS. It meets the following condition: $0.1 \leq InS/HOS \leq 1.1$. Therefore, the configuration can keep the optical image capturing system miniaturization with the character of wide angle of view at the same time.

In the optical image capturing system of the present invention, the distance from the object-side surface of the first lens to the image-side surface of the sixth lens is InTL. The sum of thicknesses of all lenses with refractive power on the optical axis is ΣTP. It meets the following condition: $0.1 \leq \Sigma TP/InTL \leq 0.9$. Therefore, it can keep the contrast ratio of the optical image capturing system and the yield rate about manufacturing lens at the same time, and provide the proper back focal length to accommodate other elements.

The curvature radius of the object-side surface of the first lens is R1. The curvature radius of the image-side surface of the first lens is R2. They meet the following condition: $0.001 \leq |R1/R2| \leq 25$. Therefore, the first lens may have a suitable magnitude of positive refractive power, so as to prevent the spherical aberration from increasing too fast. Preferably, the following condition may be satisfied: $0.01 \leq |R1/R2| < 12$.

The curvature radius of the object-side surface of the sixth lens is R11. The curvature radius of the image-side surface of the sixth lens is R12. They meet the following condition: $-7 < (R11-R12)/(R11+R12) < 50$. Hereby, this configuration is beneficial to the correction of the astigmatism generated by the optical image capturing system.

The distance between the first lens and the second lens on the optical axis is IN12. The following condition is satisfied: $IN12/f \le 60$. Hereby, this configuration is helpful to improve the chromatic aberration of the lens in order to elevate their performance.

The distance between the fifth lens and the sixth lens on the optical axis is IN56. The following condition is satisfied: $IN56/f \le 3.0$. Hereby, this configuration is helpful to improve the chromatic aberration of the lens in order to elevate their performance.

The thicknesses of the first lens and the second lens on the optical axis are TP1 and TP2, respectively. The following condition is satisfied: $0.1 \le (TP1+IN12)/TP2 \le 10$. Therefore, this configuration is helpful to control the sensitivity of the optical image capturing system, and improve their performance.

The thicknesses of the fifth lens and the sixth lens on the optical axis are TP5 and TP6, respectively, and the distance between the foregoing two lens on the optical axis is IN56. They meet the following condition: $0.1 \le (TP6+IN56)/TP5 \le 15$. Therefore, this configuration is helpful to control the sensitivity of the optical image capturing system, and decrease the total height of the optical image capturing system.

The thicknesses of the second lens, third lens and fourth lens on the optical axis are TP2, TP3 and TP4, respectively. The distance between the second lens and the third lens on the optical axis is IN23. The distance between the third lens and the fourth lens on the optical axis is IN34. The distance between the fourth lens and the fifth lens on the optical axis is IN45. The distance between the object-side surface of the first lens and the image-side surface of the sixth lens is InTL. They meet the following condition: $0.1 \le TP4/(IN34+TP4+IN45) < 1$. Therefore, this configuration is helpful to slightly correct the aberration of the propagating process of the incident light layer by layer, and decrease the total height of the optical image capturing system.

In the optical image capturing system of the present invention, a perpendicular distance between a critical point C61 on an object-side surface of the sixth lens and the optical axis is HVT61. A perpendicular distance between a critical point C62 on an image-side surface of the sixth lens and the optical axis is HVT62. A horizontal distance from an intersection point on the object-side surface of the sixth lens crossing the optical axis to the critical point C61 on the optical axis is SGC61. A horizontal distance from an intersection point on the image-side surface of the sixth lens crossing the optical axis to the critical point C62 on the optical axis is SGC62. The following conditions may be satisfied: $0 \text{ mm} \le HVT61 \le 3 \text{ mm}$; $0 \text{ mm} < HVT62 \le 6 \text{ mm}$; $0 \le HVT61/HVT62$; $0 \text{ mm} \le |SGC61| \le 0.5 \text{ mm}$; $0 \text{ mm} < |SGC62| \le 2 \text{ mm}$, and $0 < |SGC62|/(|SGC62|+TP6) \le 0.9$. Therefore, this configuration is helpful to correct the off-axis aberration effectively.

The optical image capturing system of the present invention meets the following condition: $0.2 \le HVT62/HOI \le 0.9$. Preferably, it may meet the following condition: $0.3 \le HVT62/HOI \le 0.8$. Therefore, this configuration is helpful to correct the aberration of surrounding field of view for the optical image capturing system.

The optical image capturing system of the present invention may meet the following condition: $0 \le HVT62/HOS \le 0.5$. Preferably, the following condition can be satisfied: $0.2 \le HVT62/HOS \le 0.45$. Therefore, this configuration is helpful to correct the aberration of surrounding field of view for the optical image capturing system.

In the optical image capturing system of the present invention, the distance in parallel with an optical axis from an inflection point on the object-side surface of the sixth lens that is nearest to the optical axis to an intersection point on the object-side surface of the sixth lens crossing the optical axis is expressed as SGI611. The distance in parallel with an optical axis from an inflection point on the image-side surface of the sixth lens that is nearest to the optical axis to an intersection point on the image-side of the sixth lens crossing the optical axis is expressed as SGI621. The following conditions can be satisfied: $0 < SGI611/(SGI611+TP6) \le 0.9$ and $0 < SGI621/(SGI621+TP6) \le 0.9$. Preferably, they may meet the following conditions: $0.1 \le SGI611/(SGI611+TP6) \le 0.6$ and $0.1 \le SGI621/(SGI621+TP6) \le 0.6$.

The distance in parallel with the optical axis from the inflection point on the object-side surface of the sixth lens that is second nearest to the optical axis to an intersection point on the object-side surface of the sixth lens crossing the optical axis is expressed as SGI612. The distance in parallel with an optical axis from an inflection point on the image-side surface of the sixth lens that is second nearest to the optical axis to an intersection point on the image-side surface of the sixth lens crossing the optical axis is expressed as SGI622. The following conditions can be satisfied: $0 < SGI612/(SGI612+TP6) \le 0.9$ and $0 < SGI622/(SGI622+TP6) \le 0.9$. Preferably, the following conditions may be satisfied: $0.1 \le SGI612/(SGI612+TP6) \le 0.6$ and $0.1 \le SGI622/(SGI622+TP6) \le 0.6$.

The distance perpendicular to the optical axis between the inflection point on the object-side surface of the sixth lens that is the nearest to the optical axis and the optical axis is expressed as HIF611. The distance perpendicular to the optical axis between an intersection point on the image-side surface of the sixth lens crossing the optical axis and an inflection point on the image-side surface of the sixth lens that is the nearest to the optical axis is expressed as HIF621. They may meet the following conditions: $0.001 \text{ mm} \le |HIF611| \le 5 \text{ mm}$ and $0.001 \text{ mm} \le |HIF621| \le 5 \text{ mm}$. Preferably, the following conditions may be satisfied: $0.1 \text{ mm} \le |HIF611| \le 3.5 \text{ mm}$ and $1.5 \text{ mm} \le |HIF621| \le 3.5 \text{ mm}$.

The distance perpendicular to the optical axis between the inflection point on the object-side surface of the sixth lens that is second nearest to the optical axis and the optical axis is expressed as HIF612. The distance perpendicular to the optical axis between an intersection point on the image-side surface of the sixth lens crossing the optical axis and an inflection point on the image-side surface of the sixth lens that is second nearest to the optical axis is expressed as HIF622. The following conditions can be satisfied: $0.001 \text{ mm} \le |HIF612| \le 5 \text{ mm}$ and $0.001 \text{ mm} \le |HIF622| \le 5 \text{ mm}$. Preferably, the following conditions may be satisfied: $0.1 \text{ mm} \le |HIF622| \le 3.5 \text{ mm}$ and $0.1 \text{ mm} \le |HIF612| \le 3.5 \text{ mm}$.

The perpendicular distance between the inflection point on the object-side surface of the sixth lens that is third nearest to the optical axis and the optical axis is expressed as HIF613. The perpendicular distance between an intersection point on the image-side surface of the sixth lens crossing the optical axis and an inflection point on the image-side surface of the sixth lens that is third nearest to the optical axis is expressed as HIF623. The following conditions can be satisfied: $0.001 \text{ mm} \le |HIF613| \le 5 \text{ mm}$ and $0.001$ mm≤|HIF623|≤5 mm. Preferably, the following conditions may be satisfied: 0.1 mm≤|HIF623|≤3.5 mm and 0.1 mm≤|HIF613|≤3.5 mm.

The perpendicular distance between the inflection point on the object-side surface of the sixth lens that is fourth nearest to the optical axis and the optical axis is expressed as HIF614. The perpendicular distance between an intersection point on the image-side surface of the sixth lens crossing the optical axis and an inflection point on the image-side surface of the sixth lens that is fourth nearest to the optical axis is expressed as HIF624. The following conditions can be satisfied: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In the optical image capturing system of present invention, PhiA meets a condition as follows: 0 mm<PhiA≤17.4 mm, and preferably, 0 mm<PhiA≤13.5 mm; PhiC meets a condition as follows: 0 mm<PhiC≤17.7 mm, and preferably, 0 mm<PhiC≤14 mm; PhiD meets a condition as follows: 0 mm<PhiD≤18 mm, and preferably, 0 mm<PhiD≤15 mm; TH1 meets a condition as follows: 0 mm<TH1≤5 mm, and preferably, 0 mm<TH1≤0.5 mm; TH2 meets a condition as follows: 0 mm<TH2≤5 mm, and preferably, 0 mm<TH2≤0.5 mm; PhiA/PhiD meets a condition as follows: 0<PhiA/PhiD≤0.99, and preferably, 0<PhiA/PhiD≤0.97; TH1+TH2 meets a condition as follows: 0 mm<TH1+TH2≤10 mm, and preferably, 0 mm<TH1+TH2≤1 mm; (TH1+TH2)/HOI meets a condition as follows: 0<(TH1+TH2)/HOI≤0.95, and preferably, 0<(TH1+TH2)/HOI≤0.5; (TH1+TH2)/HOS meets a condition as follows: 0<(TH1+TH2)/HOS≤0.95, and preferably, 0<(TH1+TH2)/HOS≤0.5; 2(TH1+TH2)/PhiA meets a condition as follows: 0<2(TH1+TH2)/PhiA≤0.95, and preferably, 0<2(TH1+TH2)/PhiA≤0.5.

In one embodiment of the optical image capturing system of the present invention, it can be helpful to correct the chromatic aberration of the optical image capturing system by arranging the lens with high coefficient of dispersion and low coefficient of dispersion in an interlaced manner.

The Aspheric equation for the lens can be represented by:

$$z=ch2/[1+[1-(k+1)c2h2]0.5]+A4h4+A6h6+A8h8+A10h10+A12h12+A14h14+A16h16+A18h18+A20h20+ \quad (1),$$

wherein z is a position value of the position along the optical axis and at the height h which refers to the surface apex; k is the cone coefficient, c is the reciprocal of curvature radius, and A4, A6, A8, A10, A12, A14, A16, A18, and A20 are high order aspheric coefficients.

In the optical image capturing system provided by the present invention, the lens may be made of glass or plastic material. If the lens is made of the plastic material, it can reduce the cost of manufacturing as well as the weight of the lens effectively. If lens is made of glass, it can control the heat effect and increase the design space of the configuration of the lens with refractive powers in the optical image capturing system. Besides, the object-side surface and the image-side surface of the first lens through seventh lens may be aspheric, which can gain more control variables and even reduce the number of the used lens in contrast to traditional glass lens in addition to the use of reducing the aberration. Thus, the total height of the optical image capturing system can be reduced effectively.

Furthermore, in the optical image capturing system provided by the present disclosure, when the surface of lens is a convex surface, the surface of that lens is basically a convex surface in the vicinity of the optical axis. When the surface of lens is a concave surface, the surface of that lens is basically a concave surface in the vicinity of the optical axis.

The optical image capturing system of the present invention can be applied to the optical image capturing system with automatic focus based on the demand and have the characters of a good aberration correction and a good quality of image. Thereby, the optical image capturing system can expand the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the process of the photographing.

In the optical image capturing system of the present invention, at least one lens among the first lens, second lens, third lens, fourth lens, fifth lens, sixth lens and seventh lens may further be a light filtering element for light with wavelength of less than 500 nm based on the design requirements. The light filtering element may be achieved by coating film on at least one surface of that lens with certain filtering function, or forming that lens with material that can filter light with short wavelength.

The image plane of the optical image capturing system of the present invention may be a plane or a curved surface based on the design requirement. When the image plane is a curved surface (e.g. a spherical surface with curvature radius), it is helpful to decrease the required incident angle that make the rays focus on the image plane. In addition to the aid of the miniaturization of the length of the optical image capturing system (TTL), it is helpful to elevate the relative illumination at the same time.

According to the foregoing implementation method, the specific embodiments with figures are presented in detail as below.

The First Embodiment

Figure 1B:
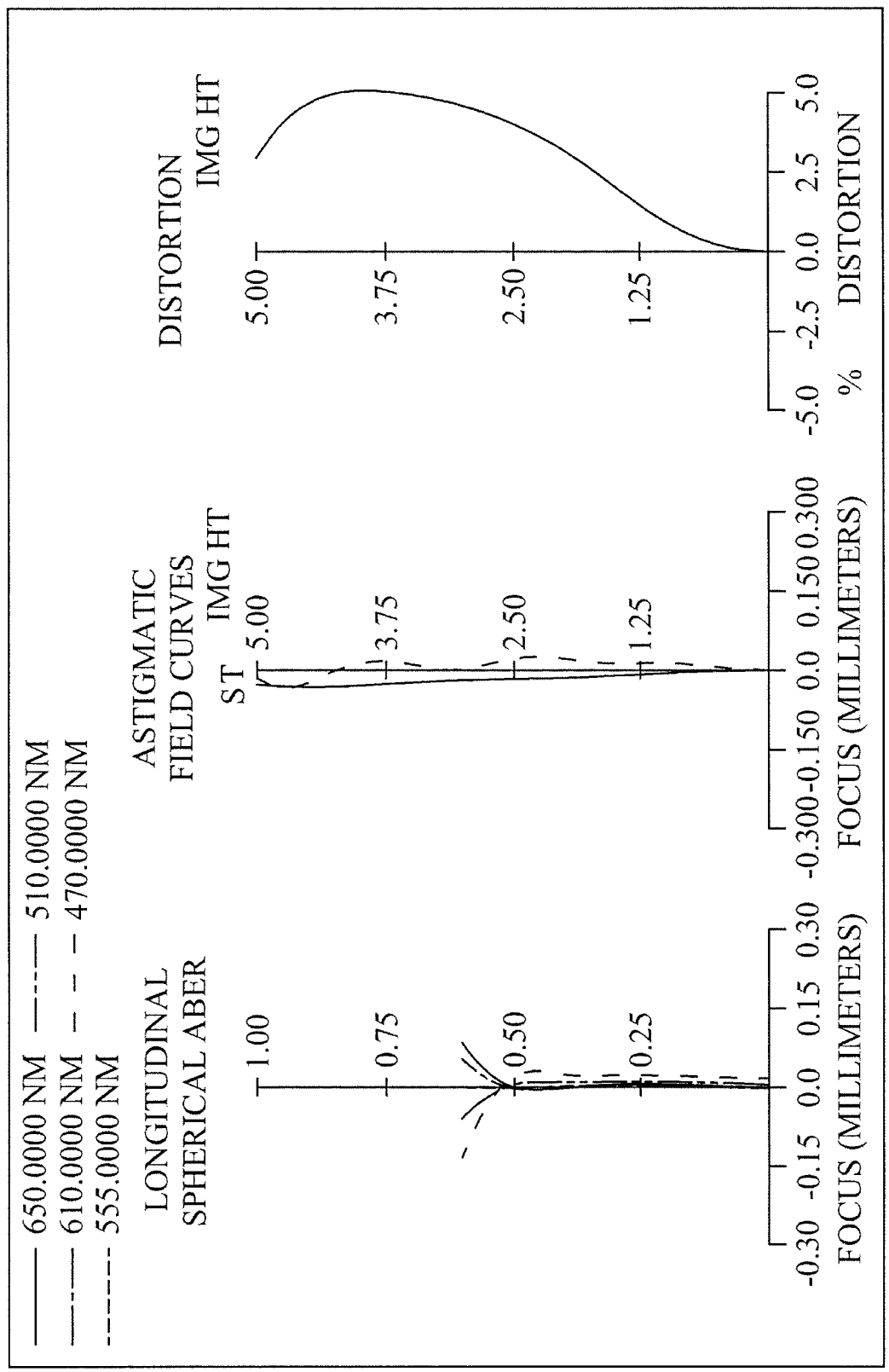
FIG. 1B shows curve diagrams of longitudinal spherical aberration, astigmatic field, and optical distortion of the optical image capturing system in the order from left to right, in accordance with the first embodiment of the present invention.
Figure 1C:
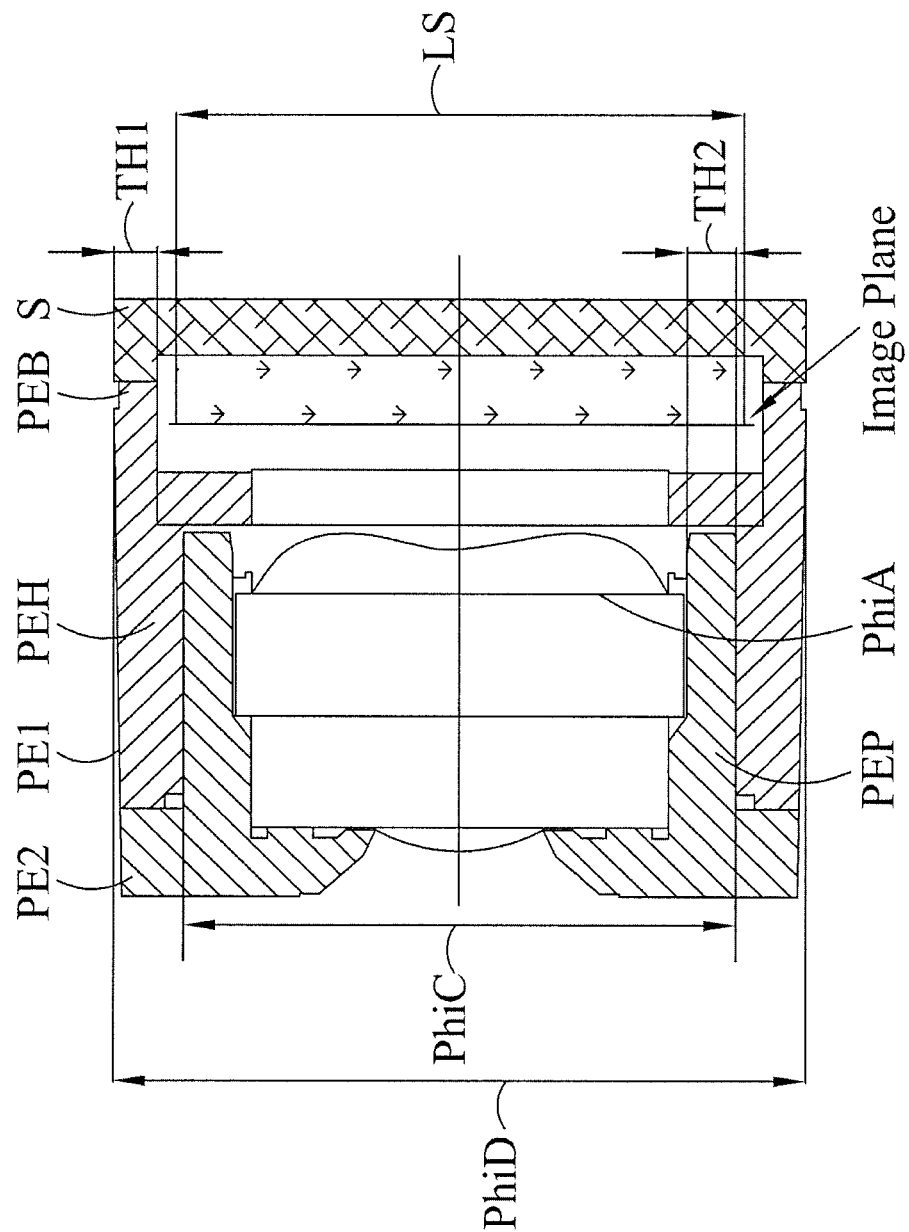
FIG. 1C is a schematic diagram depicting an assembly of a first positioning element and a second lens positioning element of the first embodiment of the present invention.

Please refer to FIG. 1A and FIG. 1B, wherein FIG. 1A is a schematic view of the optical imaging lens assembly of optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C is a schematic diagram depicting an assembly of a first positioning element and a second lens positioning element of the first embodiment of the present invention. As shown in FIG. 1A, in order from an object side to an image side, the optical image capturing system includes a first lens 110, an aperture 100, a second lens 120, a third lens 130, a fourth lens 140, a fifth lens 150, a sixth lens 160, an infrared filter 180, an image plane 190, and an image sensing device 192.

The first lens 110 has negative refractive power and is made of plastic material. An object-side surface 112 of the first lens 110 is a concave surface and an image-side surface 114 of the first lens 110 is a concave surface, and both the object-side surface 112 and the image-side surface 114 are aspheric. The object-side surface 112 thereof has two inflection points. The length of the maximum effective half diameter outline curve of the object-side surface of the first lens is denoted as ARS11, and the length of the maximum effective half diameter outline curve of the image-side surface of the first lens is denoted as ARS12. The outline curve length of the ½ entrance pupil diameter (HEP) of the object-side surface of the first lens is denoted as ARE11, and the outline curve length of the ½ entrance pupil diameter (HEP) of the image-side surface of the first lens is denoted as ARE12. The central thickness of the first lens on the optical axis is denoted as TP1.

The distance paralleling an optical axis from an inflection point on the object-side surface of the first lens which is nearest to the optical axis to an intersection point on the object-side surface of the first lens crossing the optical axis is expressed as SGI111. The distance paralleling an optical axis from an inflection point on the image-side surface of the first lens which is nearest to the optical axis to an intersection point on the image-side surface of the first lens crossing the optical axis is expressed as SGI121. They meet the following conditions: SGI111=−0.0031 mm, and |SGI111|/(|SGI111|+TP1)=0.0016.

The distance in parallel with an optical axis from an inflection point on the object-side surface of the first lens that is second nearest to the optical axis to an intersection point on the object-side surface of the first lens crossing the optical axis is expressed as SGI112. The distance in parallel with an optical axis from an inflection point on the image-side surface of the first lens that is second nearest to the optical axis to an intersection point on the image-side surface of the first lens crossing the optical axis is expressed as SGI122. They meet the following conditions: SGI112=1.3178 mm and |SGI112|/(|SGI112|+TP1)=0.4052.

The distance perpendicular to the optical axis from the inflection point on the object-side surface of the first lens that is nearest to the optical axis to an optical axis is expressed as HIF111. The distance perpendicular to the optical axis from the inflection point on the image-side surface of the first lens that is nearest to the optical axis to an intersection point on the image-side surface of the first lens crossing the optical axis is expressed as HIF121. It meets the following conditions: HIF111=0.5557 mm and HIF111/HOI=0.1111.

The distance perpendicular to the optical axis from the inflection point on the object-side surface of the first lens that is second nearest to the optical axis to an optical axis is expressed as HIF112. The distance perpendicular to the optical axis from the inflection point on the image-side surface of the first lens that is second nearest to the optical axis to an intersection point on the image-side surface of the first lens crossing the optical axis is expressed as HIF122. It meets the following conditions: HIF112=5.3732 mm and HIF112/HOI=1.0746.

The second lens 120 has positive refractive power and is made of plastic material. An object-side surface 122 of the second lens 120 is a convex surface and an image-side surface 124 of the second lens 120 is a convex surface, and both the object-side surface 122 and the image-side surface 124 are aspheric. The object-side surface 122 of the second lens 120 has one inflection point. The length of the maximum effective half diameter outline curve of the object-side surface of the second lens is denoted as ARS21, and the length of the maximum effective half diameter outline curve of the image-side surface of the second lens is denoted as ARS22. The outline curve length of the ½ entrance pupil diameter (HEP) of the object-side surface of the second lens is denoted as ARE21, and the outline curve length of the ½ entrance pupil diameter (HEP) of the image-side surface of the second lens is denoted as ARS22. The central thickness of the second lens on the optical axis is denoted as TP2.

The distance in parallel with an optical axis from an inflection point on the object-side surface of the second lens that is nearest to the optical axis to the intersection point on the object-side surface of the second lens crossing the optical axis is expressed as SGI211. The distance in parallel with an optical axis from an inflection point on the image-side surface of the second lens that is nearest to the optical axis to the intersection point on the image-side surface of the second lens crossing the optical axis is expressed as SGI221. They meet the following conditions: SGI211=0.1069 mm, |SGI211|/(|SGI211|+TP2)=0.0412, SGI221=0 mm and |SGI221|/(|SGI221|+TP2)=0.

The perpendicular distance from the inflection point on the object-side surface of the second lens that is nearest to the optical axis to the optical axis is expressed as HIF211. The distance perpendicular to the optical axis from the inflection point on the image-side surface of the second lens that is nearest to the optical axis to the intersection point on the image-side surface of the second lens crossing the optical axis is expressed as HIF221. They meet the following conditions: HIF211=1.1264 mm, HIF211/HOI=0.2253, HIF221=0 mm and HIF221/HOI=0.

The third lens 130 has negative refractive power and is made of plastic material. An object-side surface 132 of the third lens 130 is a concave surface and an image-side surface 134 of the third lens 130 is a convex surface, and both the object-side surface 132 and the image-side surface 134 are aspheric. The object-side surface 132 and the image-side surface 134 both have one inflection point. The length of the maximum effective half diameter outline curve of the object-side surface of the third lens is denoted as ARS31, and the length of the maximum effective half diameter outline curve of the image-side surface of the third lens is denoted as ARS32. The outline curve length of the ½ entrance pupil diameter (HEP) of the object-side surface of the third lens is denoted as ARE31, and the outline curve length of the ½ entrance pupil diameter (HEP) of the image-side surface of the third lens is denoted as ARE32. The central thickness of the third lens on the optical axis is denoted as TP3.

The distance in parallel with an optical axis from an inflection point on the object-side surface of the third lens that is nearest to the optical axis to an intersection point on the object-side surface of the third lens crossing the optical axis is expressed as SGI311. The distance in parallel with an optical axis from an inflection point on the image-side surface of the third lens that is nearest to the optical axis to an intersection point on the image-side surface of the third lens crossing the optical axis is expressed as SGI321. The following conditions can be satisfied: SGI311=−0.3041 mm, |SGI311|/(|SGI311|+TP3)=0.4445, SGI321=−0.1172 mm and |SGI321|/(|SGI321|+TP3)=0.2357.

The perpendicular distance between the inflection point on the object-side surface of the third lens that is nearest to the optical axis and the optical axis is expressed as HIF311. The distance perpendicular to the optical axis between the inflection point on the image-side surface of the third lens that is nearest to the optical axis and the intersection point on the image-side surface of the third lens crossing the optical axis is expressed as HIF321. The following conditions can be satisfied: HIF311=1.5907 mm, HIF311/HOI=0.3181, HIF321=1.3380 mm and HIF321/HOI=0.2676.

The fourth lens 140 has positive refractive power and is made of plastic material. An object-side surface 142 of the fourth lens 140 is a convex surface and an image-side surface 144 of the fourth lens 140 is a concave surface, and both of the object-side surface 142 and the image-side surface 144 are aspheric. The object-side surface 142 thereof has two inflection points, and the image-side surface 144 thereof has one inflection point. The length of the maximum effective half diameter outline curve of the object-side surface of the fourth lens is denoted as ARS41, and the length of the maximum effective half diameter outline curve of the image-side surface of the fourth lens is denoted as ARS42. The outline curve length of the ½ entrance pupil diameter (HEP) of the object-side surface of the fourth lens is denoted as ARE41, and the outline curve length of the ½ entrance pupil diameter (HEP) of the image-side surface of the fourth lens is denoted as ARE42. The central thickness of the fourth lens on the optical axis is denoted as TP4.

The distance in parallel with the optical axis from an inflection point on the object-side surface of the fourth lens that is nearest to the optical axis to the intersection point on the object-side surface of the fourth lens crossing the optical axis is expressed as SGI411. The distance in parallel with the optical axis from an inflection point on the image-side surface of the fourth lens that is nearest to the optical axis to the intersection point on the image-side surface of the fourth lens crossing the optical axis is expressed as SGI421. The following conditions can be satisfied: SGI411=0.0070 mm, |SGI411|/(|SGI411|+TP4)=0.0056, SGI421=0.0006 mm and |SGI421|/(|SGI421|+TP4)=0.0005.

The distance in parallel with an optical axis from an inflection point on the object-side surface of the fourth lens that is second nearest to the optical axis to the intersection point on the object-side surface of the fourth lens crossing the optical axis is expressed as SGI412. The distance in parallel with an optical axis from an inflection point on the image-side surface of the fourth lens that is second nearest to the optical axis to the intersection point on the image-side surface of the fourth lens crossing the optical axis is expressed as SGI422 The following conditions can be satisfied: SGI412=−0.2078 mm and |SGI412|/(|SGI412|+TP4)=0.1439.

The perpendicular distance between the inflection point on the object-side surface of the fourth lens that is nearest to the optical axis and the optical axis is expressed as HIF411. The distance perpendicular to the optical axis between the inflection point on the image-side surface of the fourth lens that is nearest to the optical axis and the intersection point on the image-side surface of the fourth lens crossing the optical axis is expressed as HIF421. The following conditions can be satisfied: HIF411=0.4706 mm, HIF411/HOI=0.0941, HIF421=0.1721 mm and HIF421/HOI=0.0344.

The perpendicular distance between the inflection point on the object-side surface of the fourth lens that is second nearest to the optical axis and the optical axis is expressed as HIF412. The distance perpendicular to the optical axis between the inflection point on the image-side surface of the fourth lens that is second nearest to the optical axis and the intersection point on the image-side surface of the fourth lens crossing the optical axis is expressed as HIF422. The following conditions can be satisfied: HIF412=2.0421 mm and HIF412/HOI=0.4084.

The fifth lens 150 has positive refractive power and is made of plastic material. An object-side surface 152 of the fifth lens 150 is a convex surface and an image-side surface 154 of the fifth lens 150 is a convex surface, and both the object-side surface 152 and the image-side surface 154 are aspheric. The object-side surface 152 thereof has two inflection points and the image-side surface 154 thereof has one inflection point. The length of the maximum effective half diameter outline curve of the object-side surface of the fifth lens is denoted as ARS51, and the length of the maximum effective half diameter outline curve of the image-side surface of the fifth lens is denoted as ARS52. The outline curve length of the ½ entrance pupil diameter (HEP) of the object-side surface of the fifth lens is denoted as ARE51, and the outline curve length of the ½ entrance pupil diameter (HEP) of the image-side surface of the fifth lens is denoted as ARE52. The central thickness of the fifth lens on the optical axis is denoted as TP5.

The distance in parallel with an optical axis from an inflection point on the object-side surface of the fifth lens that is nearest to the optical axis to the intersection point on the object-side surface of the fifth lens crossing the optical axis is expressed as SGI511. The distance in parallel with an optical axis from an inflection point on the image-side surface of the fifth lens that is nearest to the optical axis to the intersection point on the image-side surface of the fifth lens crossing the optical axis is expressed as SGI521. The following conditions can be satisfied: SGI511=0.00364 mm, |SGI511|/(|SGI511|+TP5)=0.00338, SGI521=−0.63365 mm and |SGI521|/(|SGI521|+TP5)=0.37154.

The distance in parallel with an optical axis from an inflection point on the object-side surface of the fifth lens that is second nearest to the optical axis to the intersection point on the object-side surface of the fifth lens crossing the optical axis is expressed as SGI512. The distance in parallel with an optical axis from an inflection point on the image-side surface of the fifth lens that is second nearest to the optical axis to the intersection point on the image-side surface of the fifth lens crossing the optical axis is expressed as SGI522. The following conditions can be satisfied: SGI512=−0.32032 mm and |SGI512|/(|SGI512|+TP5)=0.23009.

The distance in parallel with an optical axis from an inflection point on the object-side surface of the fifth lens that is third nearest to the optical axis to the intersection point on the object-side surface of the fifth lens crossing the optical axis is expressed as SGI513. The distance in parallel with an optical axis from an inflection point on the image-side surface of the fifth lens that is third nearest to the optical axis to the intersection point on the image-side surface of the fifth lens crossing the optical axis is expressed as SGI523. The following conditions can be satisfied: SGI513=0 mm, |SGI513|/(|SGI513|+TP5)=0, SGI523=0 mm and |SGI523|/(|SGI523|+TP5)=0.

The distance in parallel with an optical axis from an inflection point on the object-side surface of the fifth lens that is fourth nearest to the optical axis to the intersection point on the object-side surface of the fifth lens crossing the optical axis is expressed as SGI514. The distance in parallel with an optical axis from an inflection point on the image-side surface of the fifth lens that is fourth nearest to the optical axis to the intersection point on the image-side surface of the fifth lens crossing the optical axis is expressed as SGI524. The following conditions can be satisfied: SGI514=0 mm, |SGI514|/(|SGI514|+TP5)=0, SGI524=0 mm and |SGI524|/(|SGI524|+TP5)=0.

The perpendicular distance between the optical axis and the inflection point on the object-side surface of the fifth lens that is nearest to the optical axis is expressed as HIF511. The perpendicular distance between the optical axis and the inflection point on the image-side surface of the fifth lens that is nearest to the optical axis is expressed as HIF521. The following conditions can be satisfied: HIF511=0.28212 mm, HIF511/HOI=0.05642, HIF521=2.13850 mm and HIF521/HOI=0.42770.

The perpendicular distance between the inflection point on the object-side surface of the fifth lens that is second nearest to the optical axis and the optical axis is expressed as HIF512. The perpendicular distance between the inflection point on the image-side surface of the fifth lens that is second nearest to the optical axis and the optical axis is expressed as HIF522. The following conditions can be satisfied: HIF512=2.51384 mm and HIF512/HOI=0.50277.

The perpendicular distance between the inflection point on the object-side surface of the fifth lens that is third nearest to the optical axis and the optical axis is expressed as HIF513. The perpendicular distance between the inflection point on the image-side surface of the fifth lens that is third nearest to the optical axis and the optical axis is expressed as HIF523. The following conditions can be satisfied: HIF513=0 mm, HIF513/HOI=0, HIF523=0 mm and HIF523/HOI=0.

The perpendicular distance between the inflection point on the object-side surface of the fifth lens that is fourth nearest to the optical axis and the optical axis is expressed as HIF514. The perpendicular distance between the inflection point on the image-side surface of the fifth lens that is fourth nearest to the optical axis and the optical axis is expressed as HIF524. The following conditions can be satisfied: HIF514=0 mm, HIF514/HOI=0, HIF524=0 mm and HIF524/HOI=0.

The sixth lens 160 has negative refractive power and it is made of plastic material. An object-side surface 162 of the sixth lens 160 is a concave surface and an image-side surface 164 of the sixth lens 160 is a concave surface, and the object-side surface 162 thereof has two inflection points and the image-side surface 164 thereof has one inflection point. Therefore, the incident angle of each field of view on the sixth lens can be effectively adjusted and the spherical aberration can thus be improved. The length of the maximum effective half diameter outline curve of the object-side surface of the sixth lens is denoted as ARS61, and the length of the maximum effective half diameter outline curve of the image-side surface of the sixth lens is denoted as ARS62. The outline curve length of the ½ entrance pupil diameter (HEP) of the object-side surface of the sixth lens is denoted as ARE61, and the outline curve length of the ½ entrance pupil diameter (HEP) of the image-side surface of the sixth lens is denoted as ARE62. The central thickness of the sixth lens on the optical axis is denoted as TP6.

The distance in parallel with an optical axis from an inflection point on the object-side surface of the sixth lens that is nearest to the optical axis to the intersection point on the object-side surface of the sixth lens crossing the optical axis is expressed as SGI611. The distance in parallel with an optical axis from an inflection point on the image-side surface of the sixth lens that is nearest to the optical axis to the intersection point on the image-side surface of the sixth lens crossing the optical axis is expressed as SGI621. They meet the following conditions: SGI611=−0.38558 mm, |SGI611|/(|SGI611|+TP6)=0.27212, SGI621=0.12386 mm and |SGI621|/(|SGI621|+TP6)=0.10722.

The distance in parallel with an optical axis from an inflection point on the object-side surface of the sixth lens that is second nearest to the optical axis to an intersection point on the object-side surface of the sixth lens crossing the optical axis is expressed as SGI612. The distance in parallel with an optical axis from an inflection point on the image-side surface of the sixth lens that is second nearest to the optical axis to the intersection point on the image-side surface of the sixth lens crossing the optical axis is expressed as SGI622. They meet the following conditions: SGI612=−0.47400 mm, |SGI612|/(|SGI612|+TP6)=0.31488, SGI622=0 mm and |SGI622|/(|SGI622|+TP6)=0.

The perpendicular distance between the inflection point on the object-side surface of the sixth lens that is nearest to the optical axis and the optical axis is expressed as HIF611. The perpendicular distance between the inflection point on the image-side surface of the sixth lens that is nearest to the optical axis and the optical axis is expressed as HIF621. They meet the following conditions: HIF611=2.24283 mm, HIF611/HOI=0.44857, HIF621=1.07376 mm and HIF621/HOI=0.21475.

The perpendicular distance between the inflection point on the object-side surface of the sixth lens that is second nearest to the optical axis and the optical axis is expressed as HIF612. The perpendicular distance between the inflection point on the image-side surface of the sixth lens that is second nearest to the optical axis and the optical axis is expressed as HIF622. It meets the following conditions: HIF612=2.48895 mm and HIF612/HOI=0.49779.

The perpendicular distance between the inflection point on the object-side surface of the sixth lens that is third nearest to the optical axis and the optical axis is expressed as HIF613. The perpendicular distance between the inflection point on the image-side surface of the sixth lens that is third nearest to the optical axis and the optical axis is expressed HIF623. They meet the following conditions: HIF613=0 mm, HIF613/HOI=0, HIF623=0 mm and HIF623/HOI=0.

The perpendicular distance between the inflection point on the object-side surface of the sixth lens that is fourth nearest to the optical axis and the optical axis is expressed as HIF614. The perpendicular distance between the inflection point on the image-side surface of the sixth lens that is fourth nearest to the optical axis and the optical axis is expressed as HIF624. They meet the following conditions: HIF614=0 mm, HIF614/HOI=0, HIF624=0 mm and HIF624/HOI=0.

The Infrared filter 180 is made of glass material. The Infrared filter 180 is disposed between the sixth lens 160 and the image plane 190, and it does not affect the focal length of the optical image capturing system.

In the optical image capturing system of the first embodiment, the focal length of the optical image capturing system is f, the entrance pupil diameter of the optical image capturing system is HEP, and a half maximum view angle of the optical image capturing system is HAF. The value of the parameters are shown as below: f=4.075 mm, f/HEP=1.4, HAF=50.001° and tan(HAF)=1.1918.

In the optical image capturing system of the first embodiment, the focal length of the first lens 110 is f1 and the focal length of the sixth lens 160 is f6. The following conditions are satisfied: f1=−7.828 mm, |f/f1|=0.52060, f6=−4.886 and |f1|>|f6|.

In the optical image capturing system of the first embodiment, focal lengths of the second lens 120 to the fifth lens 150 are f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each lens with positive refractive power is PPR. The ratio of the focal length f of the optical image capturing system to the focal length fn of each lens with negative refractive power is NPR. In the optical image capturing system of the first embodiment, a sum of the PPR of all lenses with positive refractive power is ΣPPR=f/f2+f/f4+f/f5=1.63290. The sum of the NPR of all lenses with negative refractive powers is ΣNPR=|f/f1|+|f/f3|+|f/f6|=1.51305, ΣPPR/|ΣNPR|=1.07921. The following conditions are also satisfied: |f/f2|=0.69101, |f/f3|=0.15834, |f/f4|=0.06883, |f/f5|=0.87305 and |f/f6|=0.83412.

In the optical image capturing system of the first embodiment, the distance from the object-side surface 112 of the first lens to the image-side surface 164 of the sixth lens is InTL. The distance from the object-side surface 112 of the first lens to the image plane 190 is HOS. The distance from an aperture 100 to an image plane 190 is InS. Half of a diagonal length of an effective detection field of the image sensing device 192 is HOI. The distance from the image-side surface 164 of the sixth lens to the image plane 190 is BFL. They meet the following conditions: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total thickness of all lenses with refractive power on the optical axis is ΣTP. It meets the following conditions: ΣTP=8.13899 mm and ΣTP/InTL=0.52477. Therefore, this configuration can keep the contrast ratio of the optical image capturing system and the yield rate about manufacturing lens at the same time, and provide the proper back focal length so as to accommodate other elements.

In the optical image capturing system of the first embodiment, the curvature radius of the object-side surface 112 of the first lens is R1. The curvature radius of the image-side surface 114 of the first lens is R2. The following condition is satisfied: |R1/R2|=8.99987. Hereby, the first lens has a suitable magnitude of positive refractive power, so as to prevent the longitudinal spherical aberration from increasing too fast.

In the optical image capturing system of the first embodiment, the curvature radius of the object-side surface 162 of the sixth lens is R11. The curvature radius of the image-side surface 164 of the sixth lens is R12. They meet the following conditions: (R11−R12)/(R11+R12)=1.27780. Therefore, it is beneficial to correct the astigmatism generated by the optical image capturing system.

In the optical image capturing system of the first embodiment, a sum of focal lengths of all lenses with positive refractive power is ΣPP. The following conditions are satisfied: ΣPP=f2+f4+f5=69.770 mm and f5/(f2+f4+f5)=0.067. Hereby, this configuration is helpful to distribute the positive refractive power of a single lens to other lens with positive refractive powers in an appropriate way, so as to suppress the generation of noticeable aberrations in the propagating process of the incident light in the optical image capturing system.

In the optical image capturing system of the first embodiment, the sum of focal lengths of all lenses with negative refractive power is ΣNP. It meets the following conditions: ΣNP=f1+f3+f6=−38.451 mm and f6/(f1+f3+f6)=0.127. Hereby, this configuration is helpful to distribute the sixth lens with negative refractive power to other lens with negative refractive powers in an appropriate way, so as to suppress the generation of noticeable aberrations in the propagating process of the incident light in the optical image capturing system.

In the optical image capturing system of the first embodiment, the distance between the first lens 110 and the second lens 120 on the optical axis is IN12. It meets the following conditions: IN12=6.418 mm and IN12/f=1.57491. Therefore, it is helpful to improve the chromatic aberration of the lens in order to elevate their performance.

In the optical image capturing system of the first embodiment, a distance between the fifth lens 150 and the sixth lens 160 on the optical axis is IN56. It meets the following conditions: IN56=0.025 mm and IN56/f=0.00613. There-fore, it is helpful to improve the chromatic aberration of the lens in order to elevate their performance.

In the optical image capturing system of the first embodiment, the thicknesses of the first lens 110 and the second lens 120 on the optical axis are TP1 and TP2, respectively. The following conditions are satisfied: TP1=1.934 mm, TP2=2.486 mm and (TP1+IN12)/TP2=3.36005. Therefore, it is helpful to control the sensitivity generated by the optical image capturing system and elevate their performance.

In the optical image capturing system of the first embodiment, central thicknesses of the fifth lens 150 and the sixth lens 160 on the optical axis are TP5 and TP6, respectively, and the distance between the aforementioned two lenses on the optical axis is IN56. The following conditions are satisfied: TP5=1.072 mm, TP6=1.031 mm and (TP6+IN56)/TP5=0.98555. Therefore, it is helpful to control the sensitivity generated by the optical image capturing system and reduce the total height of the optical image capturing system.

In the optical image capturing system of the first embodiment, a distance between the third lens 130 and the fourth lens 140 on the optical axis is IN34. The distance between the fourth lens 140 and the fifth lens 150 on the optical axis is IN45. The following conditions are satisfied: IN34=0.401 mm, IN45=0.025 mm and TP4/(IN 34+TP4+IN45)=0.74376. Therefore, this configuration is helpful to slightly correct the aberration of the propagating process of the incident light layer by layer and decrease the total height of the optical image capturing system.

In the optical image capturing system of the first embodiment, a distance in parallel with an optical axis from a maximum effective half diameter position on the object-side surface 152 of the fifth lens to an intersection point on the object-side surface 152 of the fifth lens crossing the optical axis is InRS51. The distance in parallel with an optical axis from a maximum effective half diameter position on the image-side surface 154 of the fifth lens to an intersection point on the image-side surface 154 of the fifth lens crossing the optical axis is InRS52. The thickness of the fifth lens 150 is TP5. The following conditions are satisfied: InRS51=−0.34789 mm, InRS52=−0.88185 mm, |InRS51/TP5=0.32458| and |InRS52|/TP5=0.82276. Hereby, this configuration is favorable to the manufacturing and forming of lens and keeping the miniaturization of the optical image capturing system effectively.

In the optical image capturing system of the first embodiment, the perpendicular distance between a critical point C51 on the object-side surface 152 of the fifth lens and the optical axis is HVT51. The perpendicular distance between a critical point C52 on the image-side surface 154 of the fifth lens and the optical axis is HVT52. The following conditions are satisfied: HVT51=0.515349 mm and HVT52=0 mm.

In the optical image capturing system of the first embodiment, a distance in parallel with an optical axis from a maximum effective half diameter position on the object-side surface 162 of the sixth lens to an intersection point on the object-side surface 162 of the sixth lens crossing the optical axis is InRS61. A distance in parallel with an optical axis from a maximum effective half diameter position on the image-side surface 164 of the sixth lens to an intersection point on the image-side surface 164 of the sixth lens crossing the optical axis is InRS62. The thickness of the sixth lens 160 is TP6. The following conditions are satisfied: InRS61=−0.58390 mm, InRS62=0.41976 mm, |InRS61|/TP6=0.56616 and |InRS62|/TP6=0.40700. Hereby, this configuration is favorable to the manufacturing and forming of lens and keeping the miniaturization of the optical image capturing system effectively.

In the optical image capturing system of the first embodiment, the perpendicular distance between a critical point C61 on the object-side surface 162 of the sixth lens and the optical axis is HVT61. The perpendicular distance between a critical point C62 on the image-side surface 164 of the sixth lens and the optical axis is HVT62. The following conditions are satisfied: HVT61=0 mm and HVT62=0 mm.

In the optical image capturing system of the first embodiment, the following condition is satisfied: HVT51/HOI=0.1031. Therefore, it is helpful to correct the aberration of surrounding field of view of the optical image capturing system.

In the optical image capturing system of the first embodiment, the following condition is satisfied: HVT51/HOS=0.02634. Therefore, it is helpful to correct the aberration of surrounding field of view of the optical image capturing system.

In the optical image capturing system of the first embodiment, the second lens 120, the third lens 130 and the sixth lens 160 have negative refractive powers. The coefficient of dispersion of the second lens is NA2. The coefficient of dispersion of the third lens is NA3. The coefficient of dispersion of the sixth lens is NA6. They meet the following condition: NA6/NA2≤1. Therefore, it is helpful to correct the chromatic aberration of the optical image capturing system.

In the optical image capturing system of the first embodiment, TV distortion and optical distortion for image formation in the optical image capturing system are TDT and ODT, respectively. The following conditions are satisfied: |TDT|=2.124% and |ODT|=5.076%.

Please refer to FIG. 1C, the code names and values pertaining to the related mechanism element parameters in the embodiment of the present invention are explicitly shown below. The optical image capturing system may comprise an image sensor S, wherein a maximum of a smallest side length on a plane of a periphery of the image sensor S and perpendicular to the optical axis is LS. The optical image capturing system may also comprise a first lens positioning element, denoted as PE1 (Positioning Element 1), wherein the first lens positioning element PE1 is hollow and opaque, and comprises a lens holder PEH and a base seat PEB. The base seat PEB is configured in a direction approaching the image plane for shielding and fixing the image sensor S, and has a predetermined thickness of positioning element 1 TH1, wherein a maximum of a smallest side length on a plane of a periphery of the base seat PEB and perpendicular to the optical axis is PhiD. The lens holder PEH (may selectively be integrally formed) has a hollow-tubular shape and opaque property for accommodating the second lens positioning element, wherein the second lens positioning element is denoted as PE2.

The second lens positioning element PE2 comprises a positioning portion PEP. The positioning portion PEP is hollow and has a predetermined thickness of positioning element 2 TH2 at the image side thereof. A maximum diameter on a plane of a periphery of the positioning portion PEP and perpendicular to the optical axis is PhiC. The positioning portion PEP has an alignment function of accommodating the lenses and making them arranged on the optical axis. An external side of the positioning portion PEP does not contact inner sides (the thread-less design is employed in the present embodiment) of the lens holder PEH. Furthermore, the manner of dispensing glues on object-side surfaces is selectively performed so as to make the first lens positioning element PE1 and the second lens positioning element PE2 bonded and fixed.

In the optical image capturing system, LS is 12 mm, PhiA is double values of EHD62 and equals to 6.726 mm (EHD6: the maximum effective half diameter on the image-side surface of the sixth lens), PhiC=PhiA+2*TH2=7.026 mm, PhiD=PhiC+2*(TH1+TH2)=7.426 mm, TH1 is 0.2 mm, TH2 is 0.15 mm, PhiA/PhiD is 0.9057, (TH1+TH2) is 0.35 mm, (TH1+TH2)/HOI is 0.035, (TH1+TH2)/HOS is 0.0179, 2*(TH1+TH2)/PhiA is 0.1041, and (TH1+TH2)/LS is 0.0292.

The parameters of the lenses of the first embodiment are listed in Table 1 and Table 2.

TABLE 1

Lens Parameters for the First Embodiment
f(focal length) = 4.075 mm; f/HEP = 1.4; HAF (half angle of view) = 50.000 deg

| Surfaces No. | | Curvature Radius | Thickness (mm) | Material | Refractive Index | Coefficient of Dispersion | Focal Length |
|---|---|---|---|---|---|---|---|
| 0 | Object | Plane | Plane | | | | |
| 1 | Lens 1 | −40.99625704 | 1.934 | Plastic | 1.515 | 56.55 | −7.828 |
| 2 | | 4.555209289 | 5.923 | | | | |
| 3 | Aperture | Plane | 0.495 | | | | |
| 4 | Lens 2 | 5.333427366 | 2.486 | Plastic | 1.544 | 55.96 | 5.897 |
| 5 | | −6.781659971 | 0.502 | | | | |
| 6 | Lens 3 | −5.697794287 | 0.380 | Plastic | 1.642 | 22.46 | −25.738 |
| 7 | | −8.883957518 | 0.401 | | | | |
| 8 | Lens 4 | 13.19225664 | 1.236 | Plastic | 1.544 | 55.96 | 59.205 |
| 9 | | 21.55681832 | 0.025 | | | | |
| 10 | Lens 5 | 8.987806345 | 1.072 | Plastic | 1.515 | 56.55 | 4.668 |
| 11 | | −3.158875374 | 0.025 | | | | |
| 12 | Lens 6 | −29.46491425 | 1.031 | Plastic | 1.642 | 22.46 | −4.886 |
| 13 | | 3.593484273 | 2.412 | | | | |
| 14 | Infrared filter | Plane | 0.200 | | 1.517 | 64.13 | |
| 15 | | Plane | 1.420 | | | | |
| 16 | Image Plane | Plane | | | | | |

Reference Wavelength: 555 nm; Shield Position: The 1st surface with effective aperture = 5.800 mm; The 3rd surface with effective aperture radius = 1.570 mm; The 5th surface with the effective aperture radius = 1.950 mm

TABLE 2

Coefficients of the aspheric surfaces
Table 2: Aspheric Coefficients

| | Surface No | | | | | |
|---|---|---|---|---|---|---|
| | 1 | 2 | 4 | 5 | 6 | 7 |
| k | 4.310876E+01 | −4.707622E+00 | 2.616025E+00 | 2.445397E+00 | 5.645686E+00 | −2.117147E+01 |
| A4 | 7.054243E−03 | 1.714312E−02 | −8.377541E−03 | −1.789549E−02 | −3.379055E−03 | −1.370959E−02 |
| A6 | −5.233264E−04 | −1.502232E−04 | −1.838068E−03 | −3.657520E−03 | −1.225453E−03 | 6.250200E−03 |
| A8 | 3.077890E−05 | −1.359611E−04 | 1.233332E−03 | −1.131622E−03 | −5.979572E−03 | −5.854426E−03 |
| A10 | −1.260650E−06 | 2.680747E−05 | −2.390895E−03 | 1.390351E−03 | 4.556449E−03 | 4.049451E−03 |
| A12 | 3.319093E−08 | −2.017491E−06 | 1.998555E−03 | −4.152857E−04 | −1.177175E−03 | −1.314592E−03 |
| A14 | −5.051600E−10 | 6.604615E−08 | −9.734019E−04 | 5.487286E−05 | 1.370522E−04 | 2.143097E−04 |
| A16 | 3.380000E−12 | −1.301630E−09 | 2.478373E−04 | −2.919339E−06 | −5.974015E−06 | −1.399894E−05 |

| | Surface No | | | | | |
|---|---|---|---|---|---|---|
| | 8 | 9 | 10 | 11 | 12 | 13 |
| k | −5.287220E+00 | 6.200000E+01 | −2.114008E+01 | −7.699904E+00 | −6.155476E+01 | −3.120467E−01 |
| A4 | −2.937377E−02 | −1.359965E−01 | −1.263831E−01 | −1.927804E−02 | −2.492467E−02 | −3.521844E−02 |
| A6 | 2.743532E−03 | 6.628518E−02 | 6.965399E−02 | 2.478376E−03 | −1.835360E−03 | 5.629654E−03 |
| A8 | −2.457574E−03 | −2.129167E−02 | −2.116027E−02 | 1.438785E−03 | 3.201343E−03 | −5.466925E−04 |
| A10 | 1.874319E−03 | 4.396344E−03 | 3.819371E−03 | −7.013749E−04 | −8.990757E−04 | 2.231154E−05 |
| A12 | −6.013661E−04 | −5.542899E−04 | −4.040283E−04 | 1.253214E−04 | 1.245343E−04 | 5.548990E−07 |
| A14 | 8.792480E−05 | 3.768879E−05 | 2.280473E−05 | −9.943196E−06 | −8.788363E−06 | −9.396920E−08 |
| A16 | −4.770527E−06 | −1.052467E−06 | −5.165452E−07 | 2.898397E−07 | 2.494302E−07 | 2.728360E−09 |

The values pertaining to the outline curve lengths are obtainable according to the data in Table 1 and Table 2:

First Embodiment (Primary Reference Wavelength Used = 555 nm)

| ARE | ½(HEP) | ARE value | ARE − ½(HEP) | 2(ARE/HEP) % | TP | ARE/TP (%) |
|---|---|---|---|---|---|---|
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |

| ARS | EHD | ARS value | ARS − EHD | (ARS/EHD) % | TP | ARS/TP (%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

The detail parameters of the first embodiment are listed in Table 1, in which the unit of the radius of curvature, thickness, and focal length are millimeter, and surface 0-16 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again. Furthermore, definitions of the mechanism element parameters of each embodiment described below are the same as that of the first embodiment.

Second embodiment

Figure 2A:
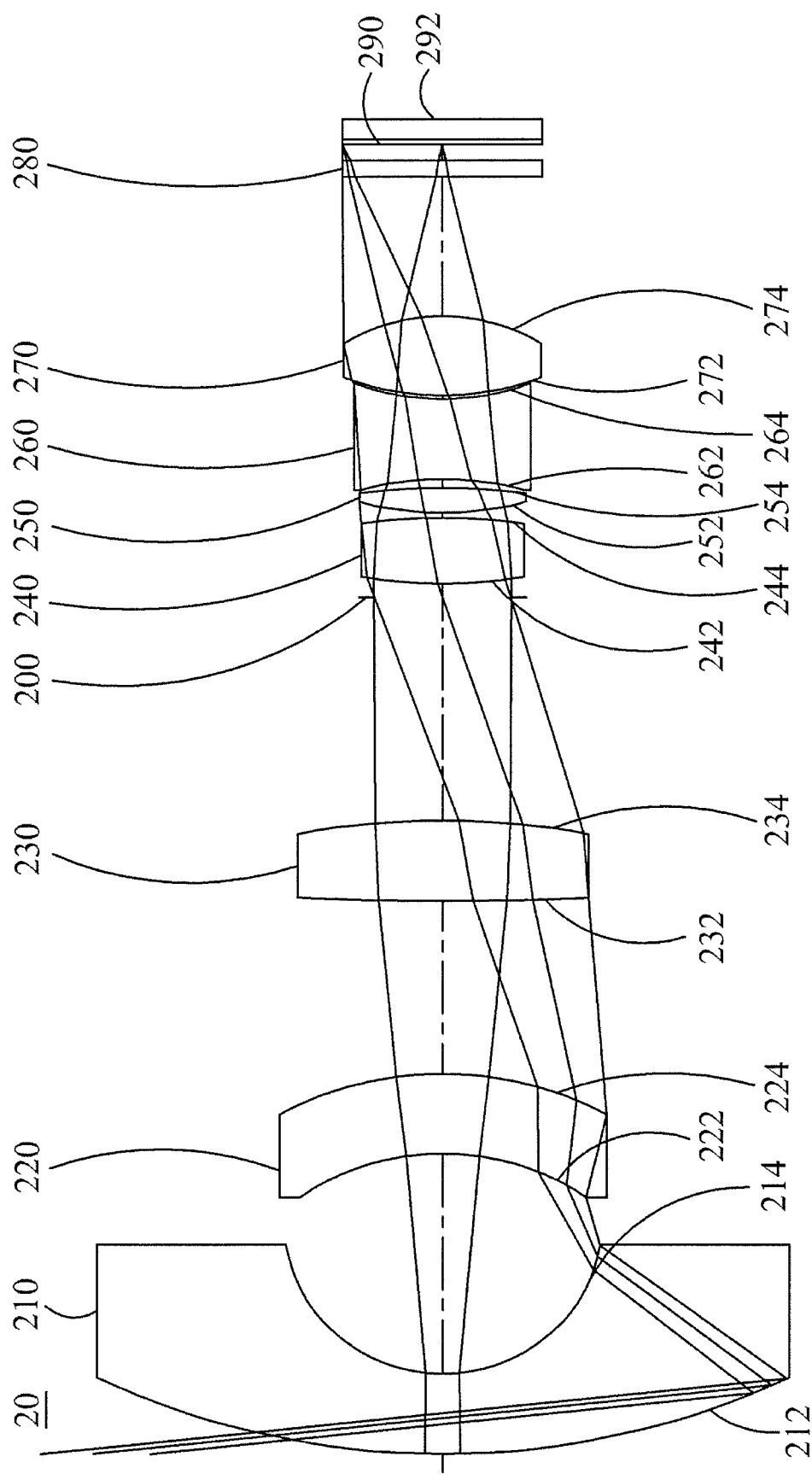
FIG. 2A is a schematic diagram of an optical image capturing system of a second embodiment of the present invention.
Figure 2B:
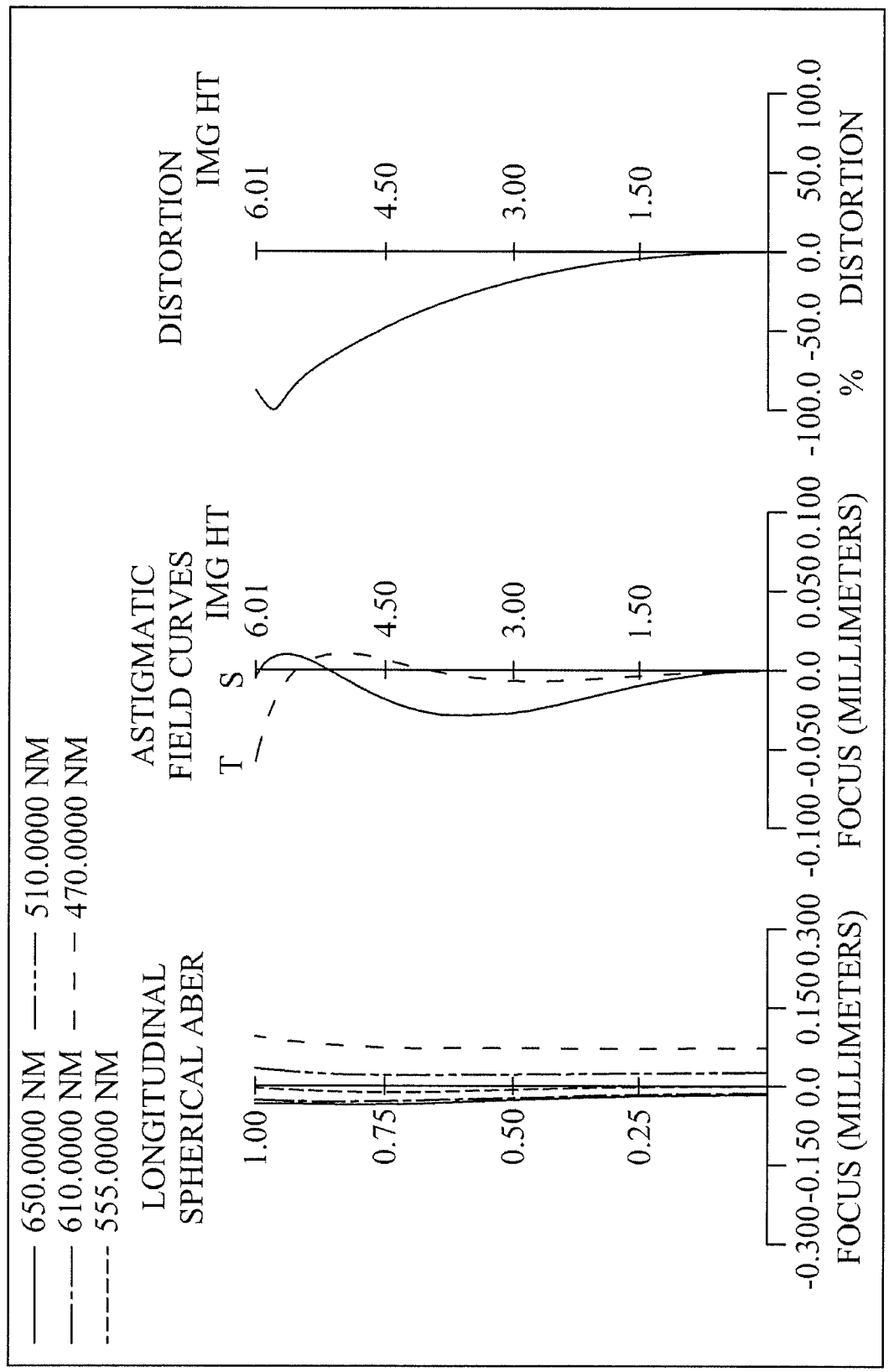
FIG. 2B shows curve diagrams of longitudinal spherical aberration, astigmatic field, and optical distortion of the optical image capturing system in the order from left to right, in accordance with the second embodiment of the present application.
Figure 2C:
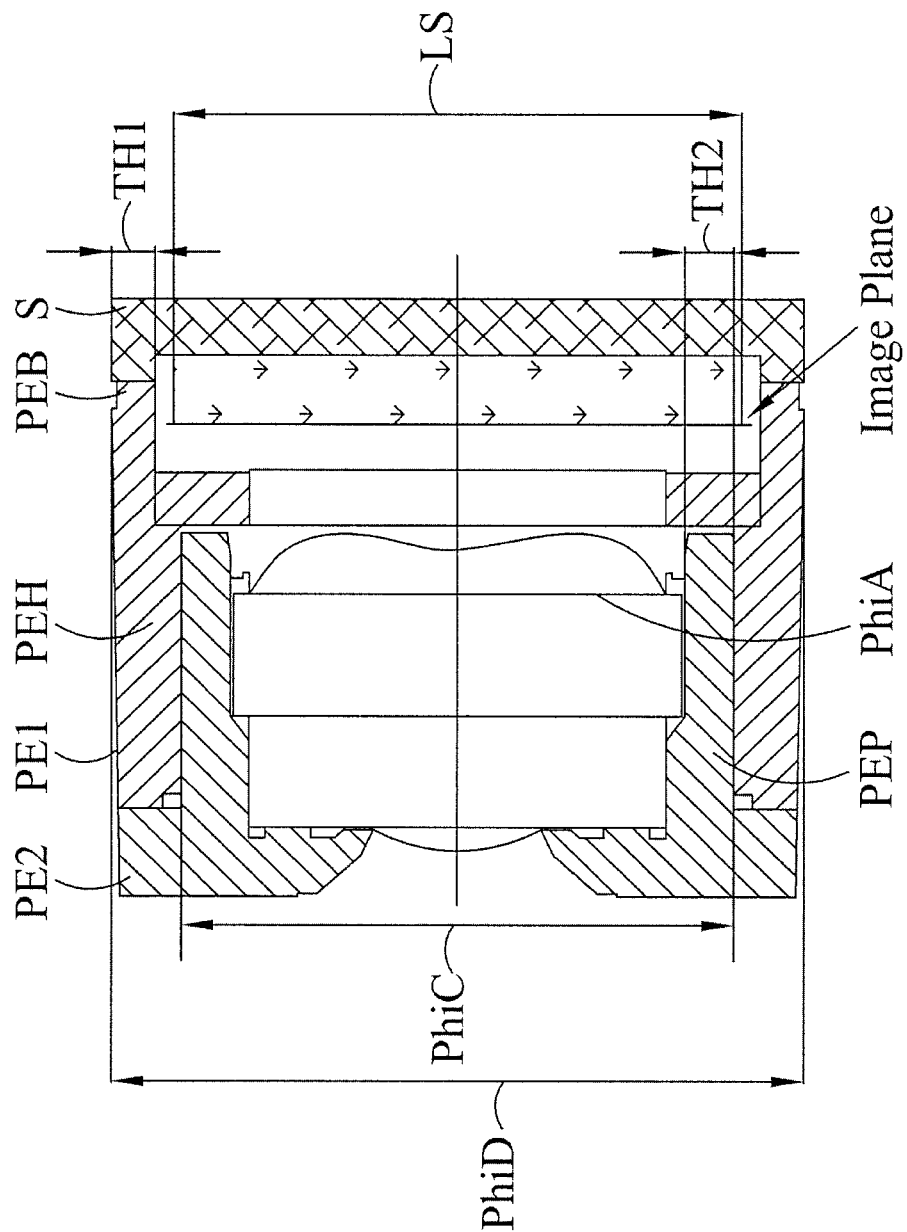
FIG. 2C is a schematic diagram depicting an assembly of a first positioning element and a second lens positioning element of the second embodiment of the present invention.

The following refers to FIGS. 2A through 2D. FIG. 2A is a schematic diagram of a second embodiment of an optical imaging lens assembly of an optical image capturing system of the present invention; FIG. 2B shows curve diagrams of longitudinal spherical aberration, astigmatic field, and optical distortion of the optical image capturing system in the order from left to right of the second embodiment of the present application; FIG. 2C is a schematic diagram depicting an assembly of a first positioning element and a second lens positioning element of the second embodiment of the present invention. An external side of the positioning portion PEP does not contact inner sides (the thread-less design is employed in the present embodiment) of the lens holder PEH. Furthermore, the manner of dispensing glues on object-side surfaces is selectively performed so as to make the first lens positioning element PE1 and the second lens positioning element PE2 dispensed by glue and fixed. As shown in FIG. 2A, in the order from the object side to the image side, the optical image capturing system includes an aperture 200, a first lens 210, a second lens 220, a third lens 230, a fourth lens 240, a fifth lens 250, a sixth lens 260, a seventh lens 270, an Infrared filter 280, an image plane 290, and an image sensing device 292.

The first lens 210 has negative refractive power and is made of glass. An object-side surface 212 thereof is a convex surface, and an image-side surface 214 thereof is a concave surface. Both the object-side surface 212 and the image-side surface 214 are aspheric and have one inflection point.

The second lens 220 has negative refractive power and is made of glass material. The object-side surface 222 of the second lens 220 is a convex surface and the image-side surface 224 of the second lens 220 is a concave surface. Both the object-side surface 222 and the image-side surface 224 are aspheric and have one inflection point.

The third lens 230 has positive refractive power and is made of glass material. The object-side surface 232 of the third lens 230 is a convex surface and the image-side surface 234 of the third lens 230 is a concave surface, and both the object-side surface 232 and the image-side surface 234 are aspheric. Besides, the object-side surface 232 has one inflection point.

The fourth lens 240 has positive refractive power and is made of glass material. The object-side surface 242 of the fourth lens 240 is a concave surface and the image-side surface 244 of the fourth lens 240 is a convex surface. Both the object-side surface 242 and the image-side surface 244 are aspheric. Besides, the object-side surface 242 has one inflection point and the image-side surface 244 has two inflection points.

The fifth lens 250 has positive refractive power and is made of glass material. The object-side surface 252 of the fifth lens 250 is a convex surface and the image-side surface 254 of the fifth lens 250 is a concave surface. Both the object-side surface 252 and the image-side surface 254 are aspheric and have one inflection point.

The sixth lens 260 has negative refractive power and is made of glass material. The object-side surface 262 of the sixth lens 260 is a concave surface and the image-side surface 264 of the sixth lens 260 is a convex surface. Both the object-side surface 262 and the image-side surface 264 are aspheric and have two inflection points. Hereby, the angle of striking on the sixth lens 260 in each field of view can be effectively adjusted so as to improve the aberration.

The seventh lens 270 has negative refractive power and is made of glass material. The object-side surface 272 of the seventh lens 270 is a convex surface and the image-side surface 274 of the seventh lens 270 is a concave surface. Hereby, the configuration is beneficial to shorten the back focal length of the optical image capturing system so as to keep its miniaturization. Besides, both the object-side surface 272 and the image-side surface 274 of the seventh lens 270 have one inflection point. Hence, it can also reduce the incident angle of the off-axis rays effectively, and thereby further correcting the off-axis aberration.

The Infrared filter 280 is made of glass material and is disposed between the seventh lens 270 and the image plane 290. The Infrared filter 280 does not affect the focal length of the optical image capturing system.

The parameters of the lenses of the second embodiment are listed in Table 3 and Table 4.

TABLE 3

Lens Parameters for the Second Embodiment
f(focal length) = 4.7601 mm; f/HEP = 2.2;
HAF(half angle of view) = 95.98 deg.

| Surfaces No. | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 47.71478323 | 4.977 | Glass | 2.001 | 29.13 | −12.647 |
| 2 | | 9.527614761 | 13.737 | | | | |
| 3 | Lens 2 | −14.88061107 | 5.000 | Glass | 2.001 | 29.13 | −99.541 |
| 4 | | −20.42046946 | 10.837 | | | | |
| 5 | Lens 3 | 182.4762997 | 5.000 | Glass | 1.847 | 23.78 | 44.046 |
| 6 | | −46.71963608 | 13.902 | | | | |
| 7 | Aperture | 1E+18 | 0.850 | | | | |
| 8 | Lens 4 | 28.60018103 | 4.095 | Glass | 1.834 | 37.35 | 19.369 |
| 9 | | −35.08507586 | 0.323 | | | | |
| 10 | Lens 5 | 18.25991342 | 1.539 | Glass | 1.609 | 46.44 | 20.223 |
| 11 | | −36.99028878 | 0.546 | | | | |
| 12 | Lens 6 | −18.24574524 | 5.000 | Glass | 2.002 | 19.32 | −7.668 |
| 13 | | 15.33897192 | 0.215 | | | | |
| 14 | Lens 7 | 16.13218937 | 4.933 | Glass | 1.517 | 64.20 | 13.620 |
| 15 | | −11.24007 | 8.664 | | | | |
| 16 | Infrared filter | 1E+18 | 1.000 | BK_7 | 1.517 | 64.20 | |
| 17 | | 1E+18 | 1.007 | | | | |
| 18 | Image Plane | 1E+18 | −0.007 | | | | |

Reference Wavelength (d-line) = 555 nm

TABLE 4

Coefficients of the aspheric surfaces of the second embodiment
Table 4: Aspheric Coefficients

| | Surface No. | | | | | | |
|---|---|---|---|---|---|---|---|
| | 1 | 2 | 3 | 4 | 5 | 6 | 8 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

TABLE 4-continued

Coefficients of the aspheric surfaces of the second embodiment
Table 4: Aspheric Coefficients

| | Surface No. | | | | | | |
|---|---|---|---|---|---|---|---|
| | 9 | 10 | 11 | 12 | 13 | 14 | 15 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

An equation of the aspheric surfaces of the second embodiment is the same as that of the first embodiment, and the definitions are the same as well.

The exact parameters of the second embodiment based on Table 3 and Table 4 are listed in the following table:

| Second Embodiment (Primary reference wavelength = 555 nm) | | | | | |
|---|---|---|---|---|---|
| |f/f1| | |f/f2| | |f/f3| | |f/f4| | |f/f5| | |f/f6| |
| 0.3764 | 0.0478 | 0.1081 | 0.2458 | 0.2354 | 0.6208 |
| |f/f7| | ΣPPR | ΣNPR | ΣPPR/|ΣNPR| | IN12/f | IN67/f |
| 0.3495 | 1.3510 | 0.6327 | 2.1352 | 2.8858 | 0.0451 |
| |f1/f2| | |f2/f3| | (TP1 + IN12)/TP2 | | (TP7 + IN67)/TP6 | |
| 0.1271 | 2.2599 | 3.7428 | | 1.0296 | |
| HOS | InTL | HOS/HOI | InS/HOS | ODT % | TDT % |
| 81.6178 | 70.9539 | 13.6030 | 0.3451 | −113.2790 | 84.4806 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 0.0000 | 0.0000 | 0.0000 | 0.0000 |
| PhiA | PhiC | PhiD | TH1 | TH2 | HOI |
| 11.962 mm | 12.362 mm | 12.862 mm | 0.25 mm | 0.2 mm | 6 mm |
| PhiA/PhiD | TH1 + TH2 | (TH1 + TH2)/HOI | (TH1 + TH2)/HOS | 2(TH1 + TH2)/PhiA | |
| 0.9676 | 0.45 mm | 0.075 | 0.0055 | 0.0752 | |

Values related to the lengths of the outline curves of the second embodiment based on Table 3 and Table 4 are listed in the following table:

| Second embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.082 | 1.081 | −0.00075 | 99.93% | 4.977 | 21.72% |
| 12 | 1.082 | 1.083 | 0.00149 | 100.14% | 4.977 | 21.77% |
| 21 | 1.082 | 1.082 | 0.00011 | 100.01% | 5.000 | 21.64% |
| 22 | 1.082 | 1.082 | −0.00034 | 99.97% | 5.000 | 21.63% |
| 31 | 1.082 | 1.081 | −0.00084 | 99.92% | 5.000 | 21.62% |
| 32 | 1.082 | 1.081 | −0.00075 | 99.93% | 5.000 | 21.62% |
| 41 | 1.082 | 1.081 | −0.00059 | 99.95% | 4.095 | 26.41% |
| 42 | 1.082 | 1.081 | −0.00067 | 99.94% | 4.095 | 26.40% |
| 51 | 1.082 | 1.082 | −0.00021 | 99.98% | 1.539 | 70.28% |
| 52 | 1.082 | 1.081 | −0.00069 | 99.94% | 1.539 | 70.25% |
| 61 | 1.082 | 1.082 | −0.00021 | 99.98% | 5.000 | 21.63% |
| 62 | 1.082 | 1.082 | 0.00005 | 100.00% | 5.000 | 21.64% |
| 71 | 1.082 | 1.082 | −0.00003 | 100.00% | 4.933 | 21.93% |
| 72 | 1.082 | 1.083 | 0.00083 | 100.08% | 4.933 | 21.95% |
| ARS | EHD | ARS value | ARS − EHD | (ARS/EHD) % | TP | ARS/TP (%) |
| 11 | 20.767 | 21.486 | 0.719 | 103.46% | 4.977 | 431.68% |
| 12 | 9.412 | 13.474 | 4.062 | 143.16% | 4.977 | 270.71% |
| 21 | 8.636 | 9.212 | 0.577 | 106.68% | 5.000 | 184.25% |
| 22 | 9.838 | 10.264 | 0.426 | 104.33% | 5.000 | 205.27% |
| 31 | 8.770 | 8.772 | 0.003 | 100.03% | 5.000 | 175.45% |
| 32 | 8.511 | 8.558 | 0.047 | 100.55% | 5.000 | 171.16% |
| 41 | 4.600 | 4.619 | 0.019 | 100.42% | 4.095 | 112.80% |
| 42 | 4.965 | 4.981 | 0.016 | 100.32% | 4.095 | 121.64% |
| 51 | 5.075 | 5.143 | 0.067 | 101.33% | 1.539 | 334.15% |
| 52 | 5.047 | 5.062 | 0.015 | 100.30% | 1.539 | 328.89% |
| 61 | 5.011 | 5.075 | 0.064 | 101.28% | 5.000 | 101.50% |
| 62 | 5.373 | 5.489 | 0.116 | 102.16% | 5.000 | 109.79% |
| 71 | 5.513 | 5.625 | 0.112 | 102.04% | 4.933 | 114.03% |
| 72 | 5.981 | 6.307 | 0.326 | 105.44% | 4.933 | 127.84% |

The results of the equations of the second embodiment based on Table 3 and Table 4 are listed in the following table:

| Values related to the inflection points of the second embodiment (Reference wavelength: 555 nm) | | | | | | |
|---|---|---|---|---|---|---|
| HIF111 | 0 | HIF111/HOI | 0 | SGI111 | 0 | |SGI111|/(|SGI111| + TP1) | 0 |

Third Embodiment

Figure 3A:
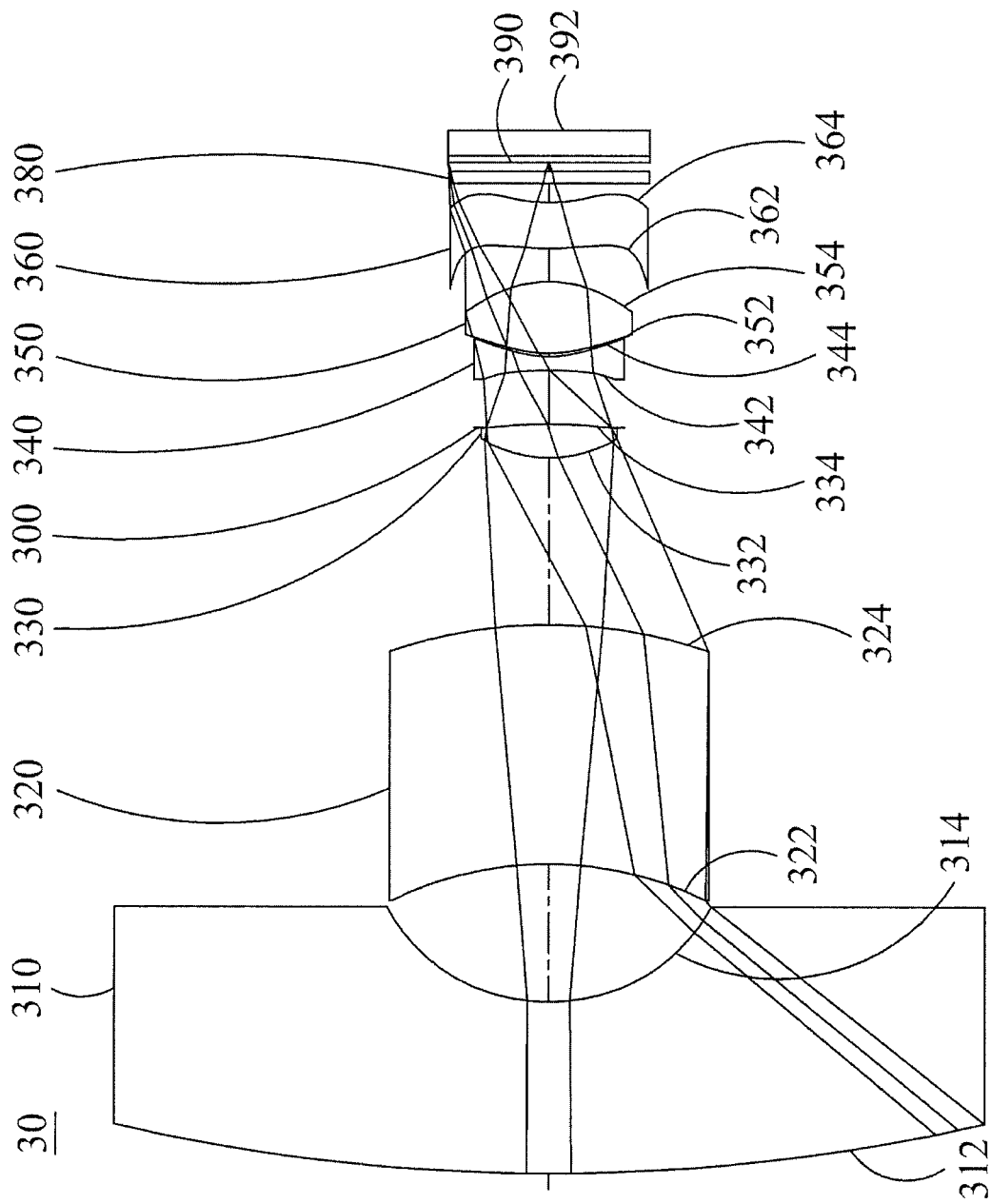
FIG. 3A is a schematic diagram of an optical image capturing system of a third embodiment of the present invention.
Figure 3B:
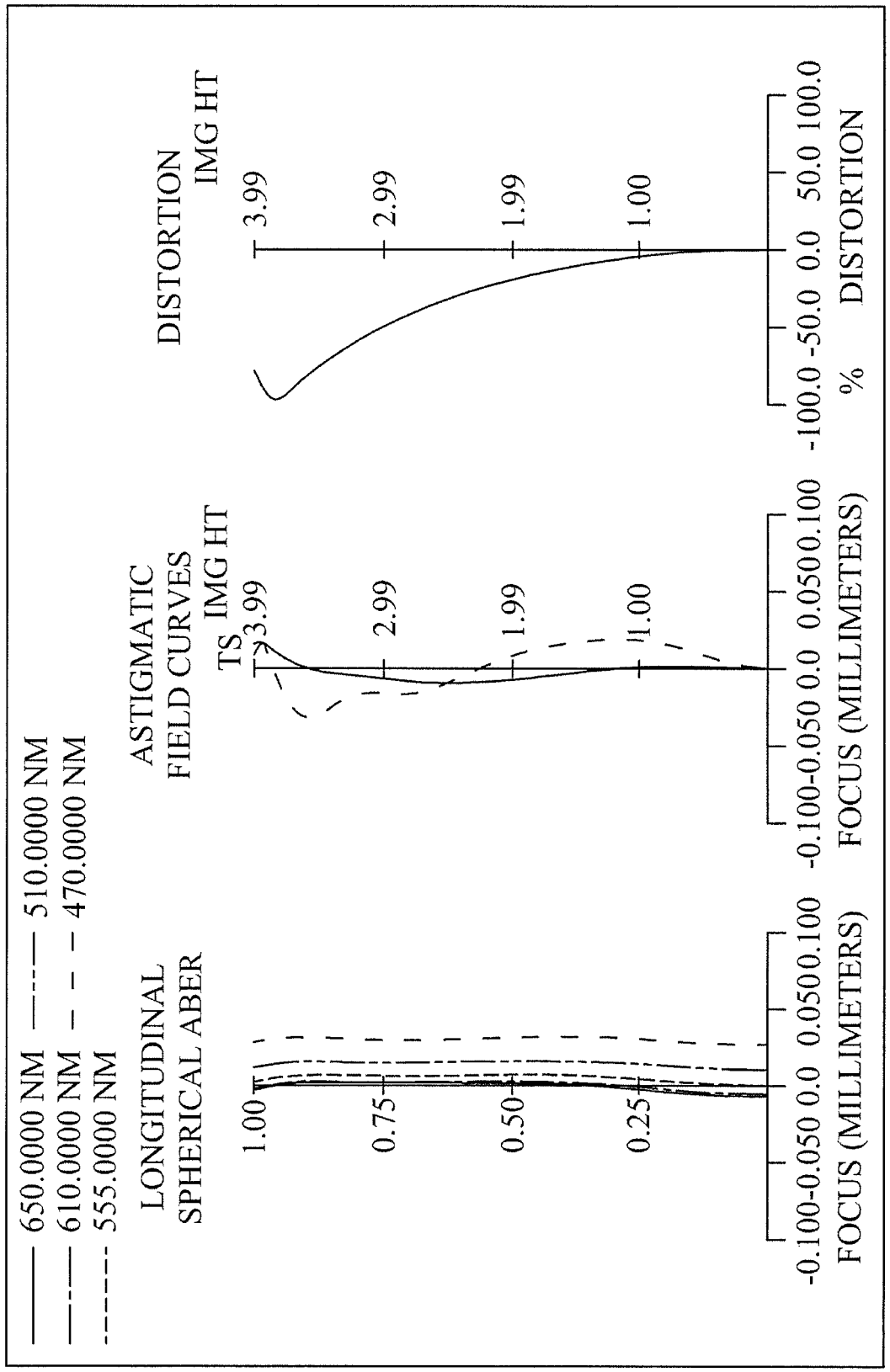
FIG. 3B shows curve diagrams of longitudinal spherical aberration, astigmatic field, and optical distortion of the optical image capturing system in the order from left to right of the third embodiment of the present application.
Figure 3C:
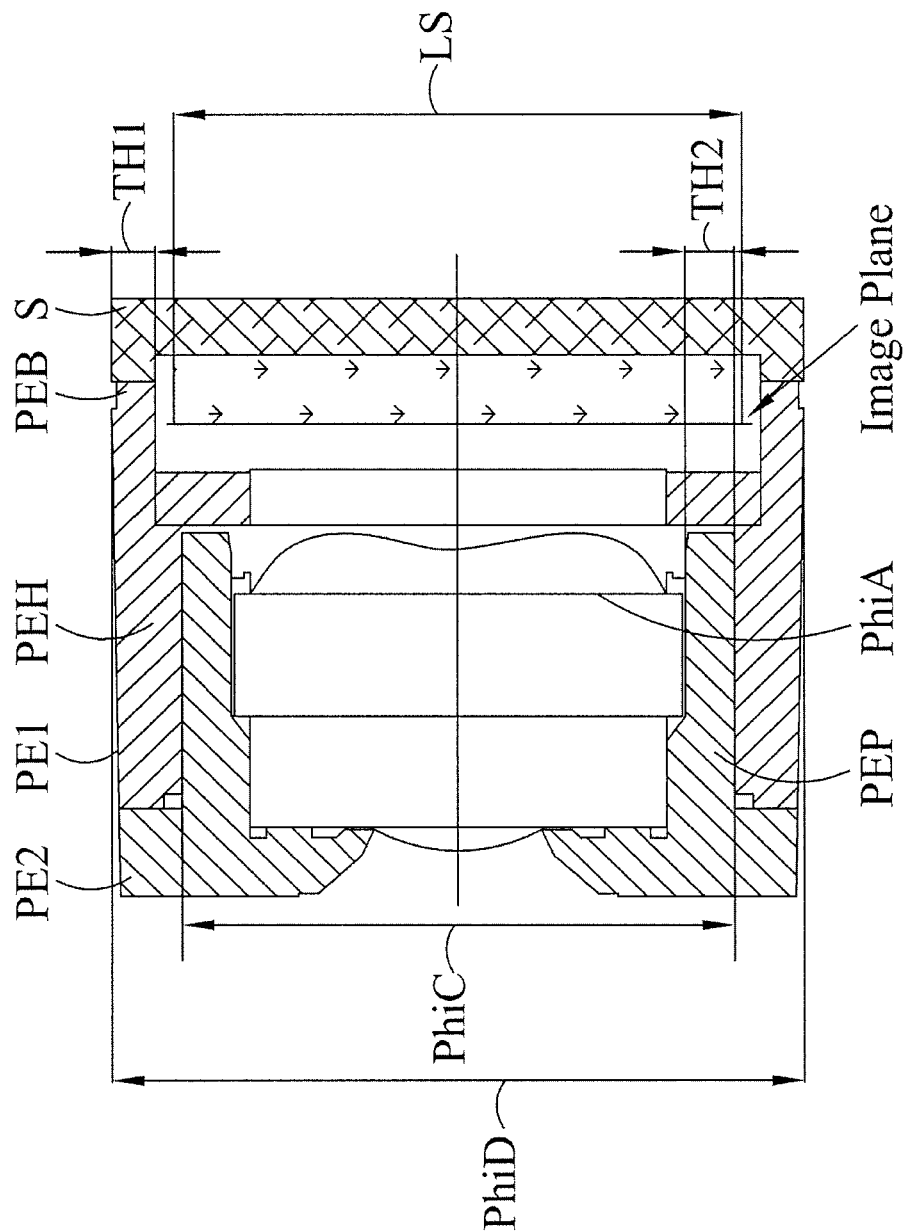
FIG. 3C is a schematic diagram depicting an assembly of a first positioning element and a second lens positioning element of the third embodiment of the present invention.

The following refers to FIGS. 3A through 3D. FIG. 3A is a schematic diagram of a third embodiment of an optical imaging lens assembly of an optical image capturing system of the present invention; FIG. 3B shows curve diagrams of longitudinal spherical aberration, astigmatic field, and optical distortion of the optical image capturing system in the order from left to right of the third embodiment of the present application; FIG. 3C is a schematic diagram depicting an assembly of a first positioning element and a second lens positioning element of the third embodiment of the present invention. An external side of the positioning portion PEP does not contact inner sides (the thread-less design is employed in the present embodiment) of the lens holder PEH. Furthermore, the manner of dispensing glues on object-side surfaces is selectively performed so as to make the first lens positioning element PE1 and the second lens positioning element PE2 dispensed by glue and fixed. As shown in FIG. 3A, the optical image capturing system of the third embodiment includes, along an optical axis from an object side to an image side, a first lens 310, a second lens 320, a third lens 330, an aperture 300, a fourth lens 340, a fifth lens 350, a sixth lens 360, an infrared rays filter 380, an image plane 390, and an image sensing element 392.

The first lens 310 has negative refractive power and is made of glass material. The object-side surface 312 of the first lens 310 is a convex surface and the image-side surface 314 of the first lens 310 is a concave surface. Both the object-side surface 312 and the image-side surface 314 are spherical.

The second lens 320 has negative refractive power and is made of glass material. The object-side surface 322 of the second lens 320 is a concave surface and the image-side surface 324 of the second lens 320 is a convex surface. Both the object-side surface 322 and the image-side surface 324 are spherical.

The third lens 330 has positive refractive power and is made of plastic material. The object-side surface 332 of the third lens 330 is a convex surface and the image-side surface 334 of the third lens 330 is a convex surface, and both the object-side surface 332 and the image-side surface 334 are aspheric. Besides, the image-side surface 334 has one inflection point.

The fourth lens 340 has negative refractive power and is made of plastic material. The object-side surface 342 of the fourth lens 340 is a concave surface and the image-side surface 344 of the fourth lens 340 is a concave surface, and both the object-side surface 342 and the image-side surface 344 are aspheric. Besides, the image-side surface 344 has one inflection point.

The fifth lens 350 has positive refractive power and is made of plastic material. The object-side surface 352 of the fifth lens 350 is a convex surface and the image-side surface 354 of the fifth lens 350 is a convex surface, and both the object-side surface 352 and the image-side surface 354 are aspheric.

The sixth lens 360 has negative refractive power and is made of plastic material. The object-side surface 362 of the sixth lens 360 is a convex surface and the image-side surface 364 of the sixth lens 360 is a concave surface, and both the object-side surface 362 and the image-side surface 364 are aspheric. Both the object-side surface 362 and the image-side surface 364 have one inflection point. Hereby, the configuration is beneficial to shorten the back focal length of the optical image capturing system so as to keep its miniaturization. Besides, the incident angle of the off-axis rays can be reduced effectively, thereby further correcting the off-axis aberration.

The Infrared filter 380 is made of glass material and is disposed between the sixth lens 360 and the image plane 390. The Infrared filter 380 does not affect the focal length of the optical image capturing system.

The parameters of the lenses of the third embodiment are listed in Table 5 and Table 6.

TABLE 5

Lens Parameters for the Third Embodiment
f(focal length) = 2.808 mm; f/HEP = 1.6,
HAF(half angle of view) = 100 deg.

| Surfaces No. | | Curvature Radius | Thickness (mm) | Material | Refractive Index | Coefficient of Dispersion | Focal Length |
|---|---|---|---|---|---|---|---|
| 0 | Object | 1E + 18 | 1E + 18 | | | | |
| 1 | Lens 1 | 71.398124 | 7.214 | Glass | 1.702 | 41.15 | −11.765 |
| 2 | | 7.117272355 | 5.788 | | | | |
| 3 | Lens 2 | −13.29213699 | 10.000 | Glass | 2.003 | 19.32 | −4537.460 |
| 4 | | −18.37509887 | 7.005 | | | | |
| 5 | Lens 3 | 5.039114804 | 1.398 | Plastic | 1.514 | 56.80 | 7.553 |
| 6 | | −15.53136631 | −0.140 | | | | |
| 7 | Aperture | 1E+18 | 2.378 | | | | |
| 8 | Lens 4 | −18.68613609 | 0.577 | Plastic | 1.661 | 20.40 | −4.978 |
| 9 | | 4.086545927 | 0.141 | | | | |
| 10 | Lens 5 | 4.927609282 | 2.974 | Plastic | 1.565 | 58.00 | 4.709 |
| 11 | | −4.551946605 | 1.389 | | | | |
| 12 | Lens 6 | 9.184876531 | 1.916 | Plastic | 1.514 | 56.80 | −23.405 |
| 13 | | 4.845500046 | 0.800 | | | | |
| 14 | Infrared filter | 1E+18 | 0.500 | BK_7 | 1.517 | 64.13 | |
| 15 | | 1E+18 | 0.371 | | | | |
| 16 | Image Plane | 1E+18 | 0.005 | | | | |

Reference Wavelength = 555 nm

TABLE 6

Coefficients of the aspheric surfaces of the third embodiment

Table 6: Aspheric Coefficients

| | Surface No. | | | | | | |
|---|---|---|---|---|---|---|---|
| | 1 | 2 | 3 | 4 | 5 | 6 | 8 |
| k | 0.000000E+00 | 0.000000E+00 | 0.000000E+00 | 0.000000E+00 | 1.318519E−01 | 3.120384E+00 | −1.494442E+01 |
| A4 | 0.000000E+00 | 0.000000E+00 | 0.000000E+00 | 0.000000E+00 | 6.405246E−05 | 2.103942E−03 | −1.598286E−03 |
| A6 | 0.000000E+00 | 0.000000E+00 | 0.000000E+00 | 0.000000E+00 | 2.278341E−05 | −1.050629E−04 | −9.177115E−04 |

TABLE 6-continued

Coefficients of the aspheric surfaces of the third embodiment
Table 6: Aspheric Coefficients

| | | | | | | | |
|---|---|---|---|---|---|---|---|
| A8 | 0.000000E+00 | 0.000000E+00 | 0.000000E+00 | 0.000000E+00 | −3.672908E−06 | 6.168906E−06 | 1.011405E−04 |
| A10 | 0.000000E+00 | 0.000000E+00 | 0.000000E+00 | 0.000000E+00 | 3.748457E−07 | −1.224682E−07 | −4.919835E−06 |

| | Surface No. | | | | |
|---|---|---|---|---|---|
| | 9 | 10 | 11 | 12 | 13 |
| k | 2.744228E−02 | −7.864013E+00 | −2.263702E+00 | −4.206923E+01 | −7.030803E+00 |
| A4 | −7.291825E−03 | 1.405243E−04 | −3.919567E−03 | −1.679499E−03 | −2.640099E−03 |
| A6 | 9.730714E−05 | 1.837602E−04 | 2.683449E−04 | −3.518520E−04 | −4.507651E−05 |
| A8 | 1.101816E−06 | −2.173368E−05 | −1.229452E−05 | 5.047353E−05 | −2.600391E−05 |
| A10 | −6.849076E−07 | 7.328496E−07 | 4.222621E−07 | −3.851055E−06 | 1.161811E−06 |

An equation of the aspheric surfaces of the third embodiment is the same as that of the first embodiment, and the definitions are the same as well.

The exact parameters of the third embodiment based on Table 5 and Table 6 are listed in the following table:

| Third Embodiment (Primary Reference Wavelength = 555 nm) | | | | | |
|---|---|---|---|---|---|
| |f/f1| | |f/f2| | |f/f3| | |f/f4| | |f/f5| | |f/f6| |
| 0.23865 | 0.00062 | 0.37172 | 0.56396 | 0.59621 | 0.11996 |
| ΣPPR | ΣNPR | ΣPPR/ |ΣNPR| | IN12/f | IN56/f | TP4/(IN34 + TP4 + IN45) |
| 1.77054 | 0.12058 | 14.68400 | 2.06169 | 0.49464 | 0.19512 |
| |f1/f2| | |f2/f3| | (TP1 + IN12)/TP2 | | | (TP6 + IN56)/TP5 |
| 0.00259 | 600.74778 | 1.30023 | | | 1.11131 |
| HOS | InTL | HOS/HOI | InS/HOS | ODT % | TDT % |
| 42.31580 | 40.63970 | 10.57895 | 0.26115 | −122.32700 | 93.33510 |

| Third Embodiment (Primary Reference Wavelength = 555 nm) | | | | | |
|---|---|---|---|---|---|
| HVT51 | HVT52 | HVT61 | HVT62 | HVT62/ HOI | HVT62/ HOS |
| 0 | 0 | 2.22299 | 2.60561 | 0.65140 | 0.06158 |
| TP2/ TP3 | TP3/ TP4 | InRS61 | InRS62 | |InRS61|/ |TP6 | |InRS62|/ |TP6 |
| 7.15374 | 2.42321 | −0.20807 | −0.24978 | 0.10861 | 0.13038 |
| PhiA | PhiC | PhiD | TH1 | TH2 | HOI |
| 6.150 mm | 6.41 mm | 6.71 mm | 0.15 mm | 0.13 mm | 4 mm |
| PhiA/ PhiD | TH1 + TH2 | (TH1 + TH2)/ HOI | (TH1 + TH2)/ HOS | 2(TH1 + TH2)/ PhiA | |
| 0.9165 | 0.28 mm | 0.07 | 0.0066 | 0.0911 | |

Values related to the lengths of the outline curves of the third embodiment based on Table 5 and Table 6 are listed in the following table:

| Third embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.877 | 0.877 | −0.00036 | 99.96% | 7.214 | 12.16% |
| 12 | 0.877 | 0.879 | 0.00186 | 100.21% | 7.214 | 12.19% |
| 21 | 0.877 | 0.878 | 0.00026 | 100.03% | 10.000 | 8.78% |
| 22 | 0.877 | 0.877 | −0.00004 | 100.00% | 10.000 | 8.77% |
| 31 | 0.877 | 0.882 | 0.00413 | 100.47% | 1.398 | 63.06% |
| 32 | 0.877 | 0.877 | 0.00004 | 100.00% | 1.398 | 62.77% |
| 41 | 0.877 | 0.877 | −0.00001 | 100.00% | 0.577 | 152.09% |
| 42 | 0.877 | 0.883 | 0.00579 | 100.66% | 0.577 | 153.10% |
| 51 | 0.877 | 0.881 | 0.00373 | 100.43% | 2.974 | 29.63% |
| 52 | 0.877 | 0.883 | 0.00521 | 100.59% | 2.974 | 29.68% |
| 61 | 0.877 | 0.878 | 0.00064 | 100.07% | 1.916 | 45.83% |
| 62 | 0.877 | 0.881 | 0.00368 | 100.42% | 1.916 | 45.99% |
| ARS | EHD | ARS value | ARS − EHD | (ARS/EHD) % | TP | ARS/TP (%) |
| 11 | 17.443 | 17.620 | 0.178 | 101.02% | 7.214 | 244.25% |
| 12 | 6.428 | 8.019 | 1.592 | 124.76% | 7.214 | 111.16% |
| 21 | 6.318 | 6.584 | 0.266 | 104.20% | 10.000 | 65.84% |
| 22 | 6.340 | 6.472 | 0.132 | 102.08% | 10.000 | 64.72% |
| 31 | 2.699 | 2.857 | 0.158 | 105.84% | 1.398 | 204.38% |
| 32 | 2.476 | 2.481 | 0.005 | 100.18% | 1.398 | 177.46% |
| 41 | 2.601 | 2.652 | 0.051 | 101.96% | 0.577 | 459.78% |
| 42 | 3.006 | 3.119 | 0.113 | 103.75% | 0.577 | 540.61% |
| 51 | 3.075 | 3.171 | 0.096 | 103.13% | 2.974 | 106.65% |
| 52 | 3.317 | 3.624 | 0.307 | 109.24% | 2.974 | 121.88% |
| 61 | 3.331 | 3.427 | 0.095 | 102.86% | 1.916 | 178.88% |
| 62 | 3.944 | 4.160 | 0.215 | 105.46% | 1.916 | 217.14% |

The results of the equations of the third embodiment based on Table 5 and Table 6 are listed in the following table:

Values related to the inflection points of the third embodiment
(Reference wavelength: 555 nm)

| HIF321 | 2.0367 | HIF321/HOI | 0.5092 | SGI321 | −0.1056 | \|SGI321\|/(\|SGI321\| + TP3) | 0.0702 |
|---|---|---|---|---|---|---|---|
| HIF421 | 2.4635 | HIF421/HOI | 0.6159 | SGI421 | 0.5780 | \|SGI421\|/(\|SGI421\| + TP4) | 0.5005 |
| HIF611 | 1.2364 | HIF611/HOI | 0.3091 | SGI611 | 0.0668 | \|SGI611\|/(\|SGI611\| + TP6) | 0.0337 |
| HIF621 | 1.5488 | HIF621/HOI | 0.3872 | SGI621 | 0.2014 | \|SGI621\|/(\|SGI621\| + TP6) | 0.0951 |

Fourth Embodiment

Figure 4A:
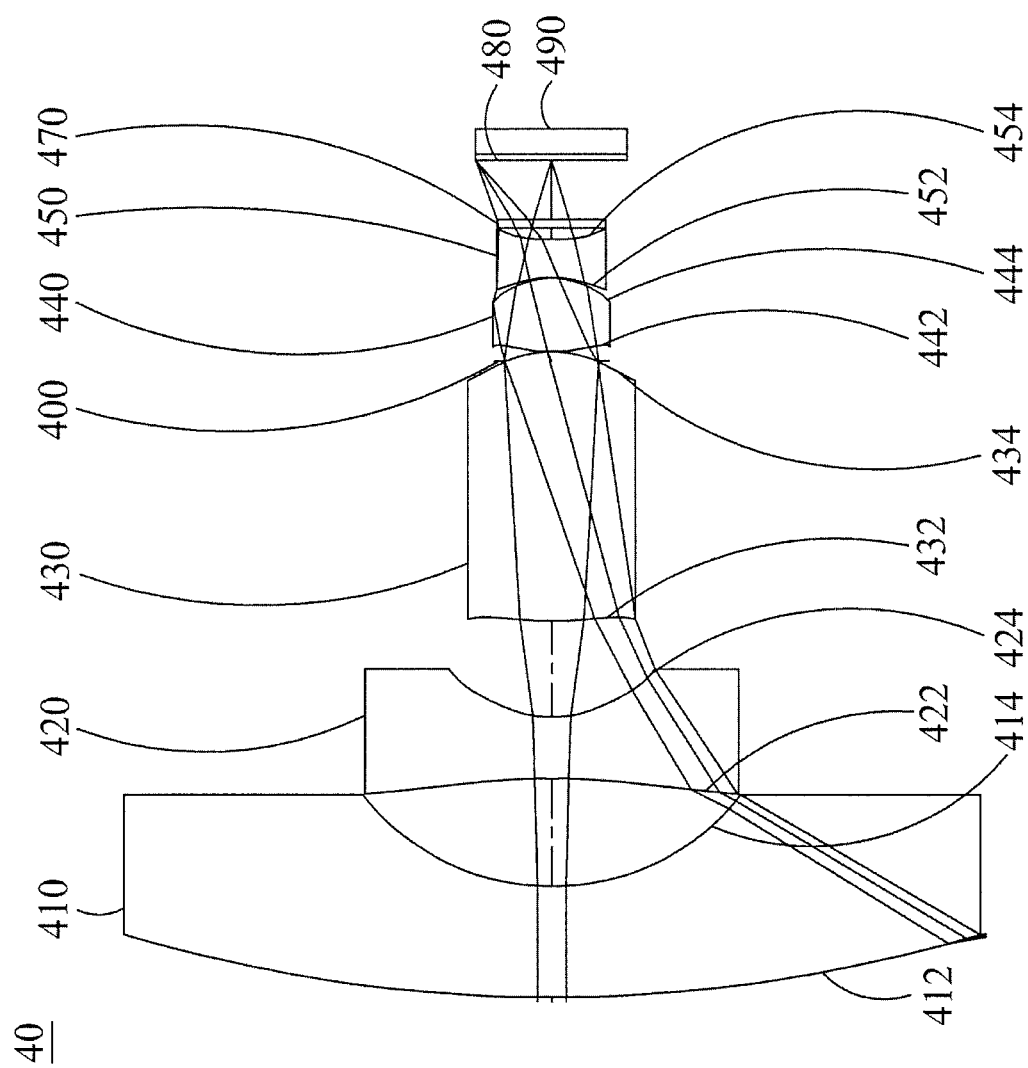
FIG. 4A is a schematic diagram of an optical image capturing system of a fourth embodiment of the present invention.
Figure 4B:
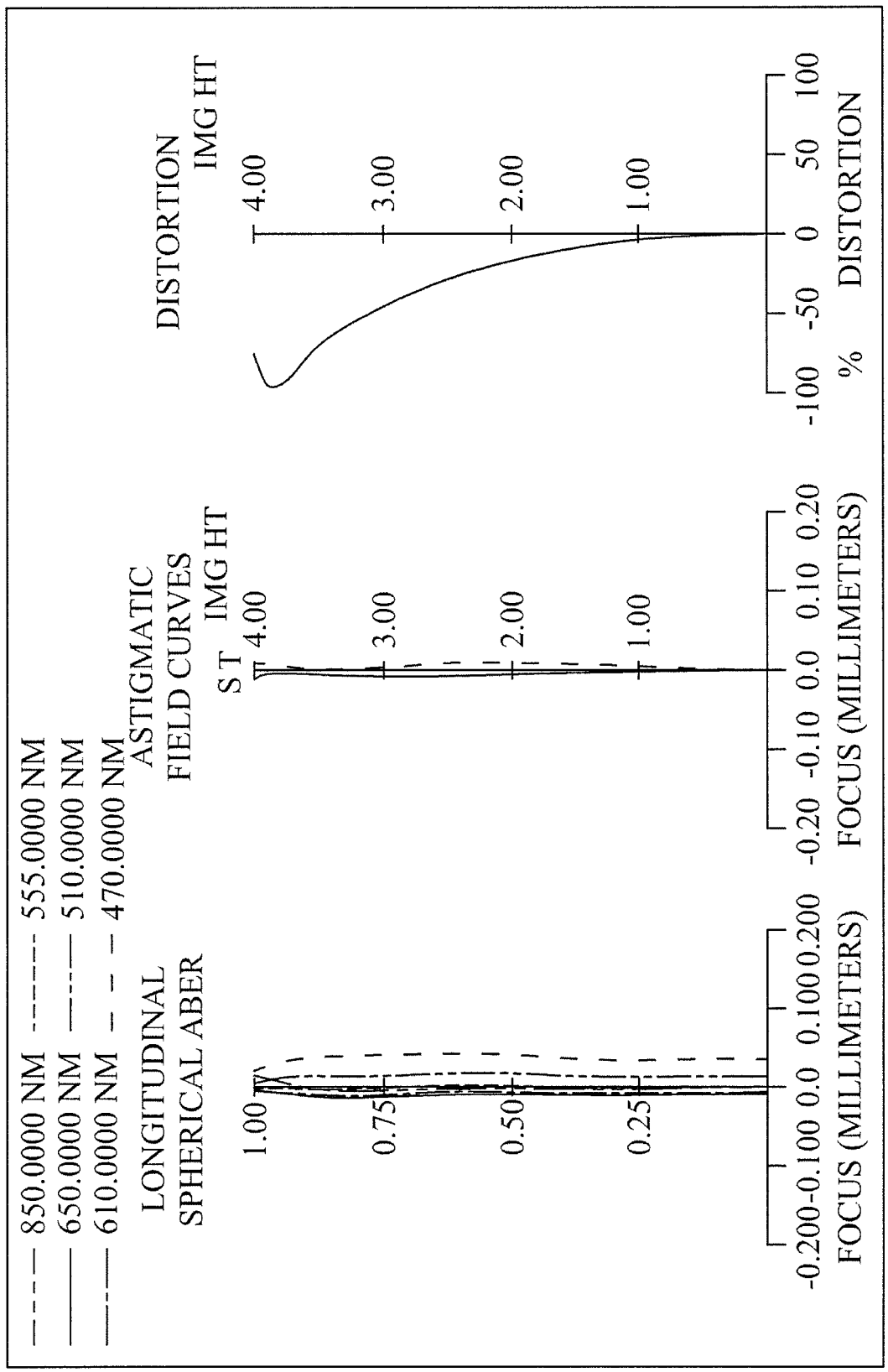
FIG. 4B shows curve diagrams of longitudinal spherical aberration, astigmatic field, and optical distortion of the optical image capturing system in the order from left to right, in accordance with the fourth embodiment of the present application.
Figure 4C:
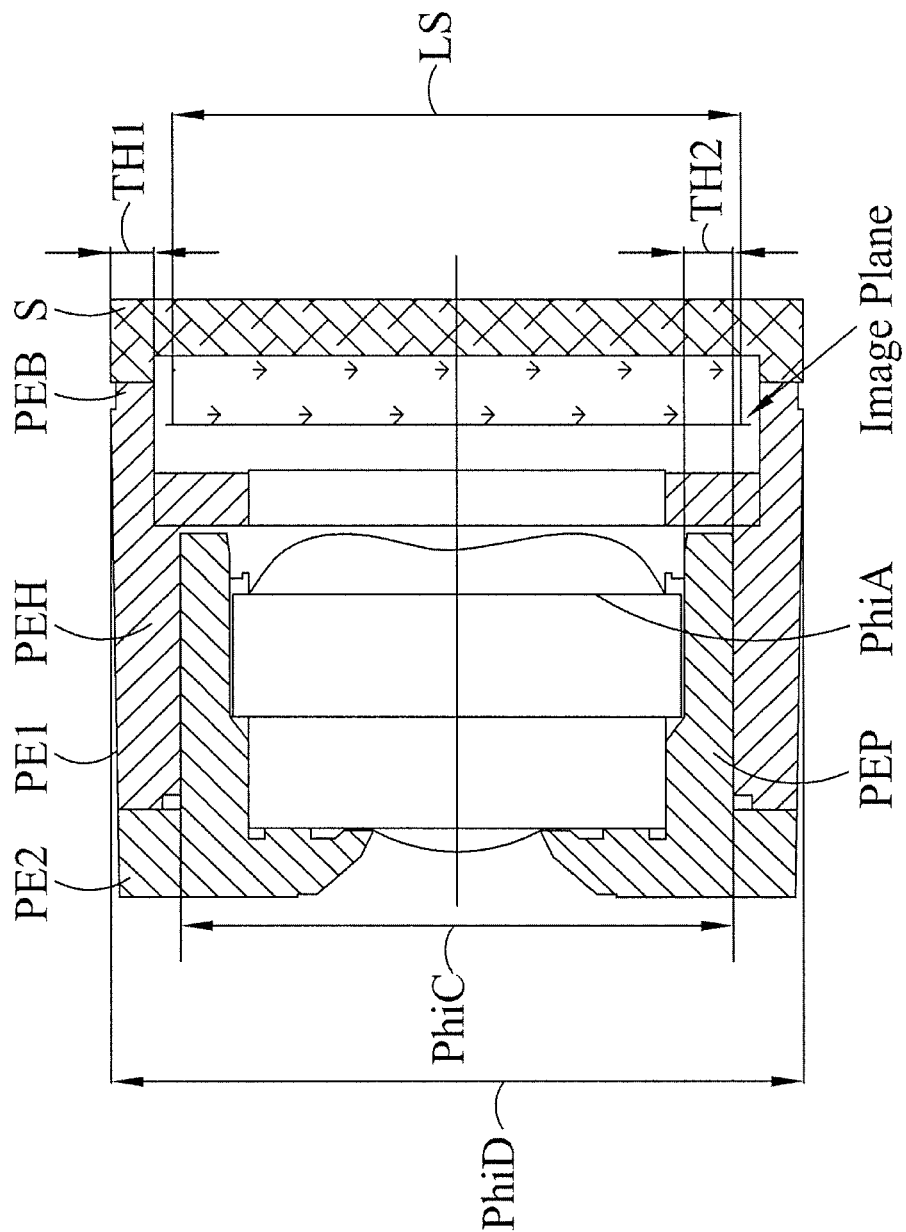
FIG. 4C is a schematic diagram depicting an assembly of a first positioning element and a second lens positioning element of the fourth embodiment of the present invention.

The following refers to FIGS. 4A through 4D. FIG. 4A is a schematic diagram of an optical imaging lens assembly of an optical image capturing system of a fourth embodiment of the present invention; FIG. 4B shows curve diagrams of longitudinal spherical aberration, astigmatic field, and optical distortion of the optical image capturing system in the order from left to right of the fourth embodiment of the present application; FIG. 4C is a schematic diagram depicting an assembly of a first positioning element and a second lens positioning element of the fourth embodiment of the present invention. An external side of the positioning portion PEP does not contact inner sides (the thread-less design is employed in the present embodiment) of the lens holder PEH. Furthermore, the manner of dispensing glues on object-side surfaces is selectively performed so as to make the first lens positioning element PE1 and the second lens positioning element PE2 dispensed by glue and fixed. As shown in FIG. 4A, The optical image capturing system of the fourth embodiment includes, along an optical axis from an object side to an image side, a first lens 410, a second lens 420, an aperture 400, a third lens 430, a fourth lens 440, a fifth lens 450, an infrared rays filter 480, an image plane 490, and an image sensor 492.

The first lens 410 has negative refractive power and is made of glass. An object-side surface 412 thereof, which faces the object side, is a convex surface, and an image-side surface 414 thereof, which faces the image side, is a concave surface. Both the object-side surface 412 and the image-side surface 414 are spherical.

The second lens 420 has negative refractive power and is made of plastic. An object-side surface 422 thereof, which faces the object side, is a concave surface, and an image-side surface 424 thereof, which faces the image side, is a concave surface. Both the object-side surface 422 and the image-side surface 424 are aspheric. Besides, the object-side surface 422 has one inflection point.

The third lens 430 has positive refractive power and is made of plastic. An object-side surface 432 thereof, which faces the object side, is a convex surface, and an image-side surface 434 thereof, which faces the image side, is a convex surface. Both the object-side surface 432 and the image-side surface 434 are aspheric. The object-side surface 432 has one inflection points.

The fourth lens 440 has positive refractive power and is made of plastic. An object-side surface 442 thereof, which faces the object side, is a convex surface, and an image-side surface 444 thereof, which faces the image side, is a convex surface. Both the object-side surface 442 and the image-side surface 444 are aspheric. The object-side surface 442 has one inflection point.

The fifth lens 450 has negative refractive power and is made of plastic. An object-side surface 452 thereof, which faces the object side, is a concave surface, and an image-side surface 454 thereof, which faces the image side, is a concave surface. Both the object-side surface 452 and the image-side surface 454 are aspheric. The object-side surface 452 has two inflection points. Hereby, the configuration is beneficial to shorten the back focal distance of the optical image capturing system so as to keep its miniaturization.

The infrared filter 480 is made of glass and between the fifth lens 450 and the image plane 490. The infrared rays filter 480 gives no contribution to the focal length of the system.

The parameters of the lenses of the fourth embodiment are listed in Table 7 and Table 8.

TABLE 7

Lens Parameters for the Fourth Embodiment
f(focal length) = 2.7883 mm; f/HEP = 1.8; HAF(half angle of view) = 101 deg.

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 76.84219 | 6.117399 | Glass | 1.497 | 81.61 | −31.322 |
| 2 | | 12.62555 | 5.924382 | | | | |
| 3 | Lens 2 | −37.0327 | 3.429817 | Plastic | 1.565 | 54.5 | −8.70843 |
| 4 | | 5.88556 | 5.305191 | | | | |
| 5 | Lens 3 | 17.99395 | 14.79391 | Plastic | 1.565 | 58 | 9.94787 |
| 6 | | −5.76903 | −0.4855 | | | | |
| 7 | Aperture | 1E+18 | 0.535498 | | | | |
| 8 | Lens 4 | 8.19404 | 4.011739 | Plastic | 1.565 | 58 | 5.24898 |
| 9 | | −3.84363 | 0.050366 | | | | |
| 10 | Lens 5 | −4.34991 | 2.088275 | Plastic | 1.661 | 20.4 | −4.97515 |
| 11 | | 16.6609 | 0.6 | | | | |
| 12 | Infrared filter | 1E+18 | 0.5 | BK_7 | 1.517 | 64.13 | |

TABLE 7-continued

Lens Parameters for the Fourth Embodiment
f(focal length) = 2.7883 mm; f/HEP = 1.8; HAF(half angle of view) = 101 deg.

| Surface No | Curvature Radius | Thickness (mm) | Material | Refractive Index | Coefficient of Dispersion | Focal Length |
|---|---|---|---|---|---|---|
| 13 | | 1E+18 | 3.254927 | | | |
| 14 | Image Plane | 1E+18 | −0.00013 | | | |

Reference Wavelength = 555 nm

TABLE 8

Coefficients of the aspheric surfaces of the fourth embodiment
Table 8: Aspheric Coefficients

| | Surface No | | | | | | |
|---|---|---|---|---|---|---|---|
| | 1 | 2 | 3 | 4 | 5 | 6 | 8 |
| k | 0.000000E+00 | 0.000000E+00 | 0.131249 | −0.069541 | −0.324555 | 0.009216 | −0.292346 |
| A4 | 0.000000E+00 | 0.000000E+00 | 3.99823E−05 | −8.55712E−04 | −9.07093E−04 | 8.80963E−04 | −1.02138E−03 |
| A6 | 0.000000E+00 | 0.000000E+00 | 9.03636E−08 | −1.96175E−06 | −1.02465E−05 | 3.14497E−05 | −1.18559E−04 |
| A8 | 0.000000E+00 | 0.000000E+00 | 1.91025E−09 | −1.39344E−08 | −8.18157E−08 | −3.15863E−06 | 1.34404E−05 |
| A10 | 0.000000E+00 | 0.000000E+00 | −1.18567E−11 | −4.17090E−09 | −2.42621E−09 | 1.44613E−07 | −2.80681E−06 |
| A12 | 0.000000E+00 | 0.000000E+00 | 0.000000E+00 | 0.000000E+00 | 0.000000E+00 | 0.000000E+00 | 0.000000E+00 |

| | Surface No | | |
|---|---|---|---|
| | 9 | 10 | 11 |
| k | −0.18604 | −6.17195 | 27.541383 |
| A4 | 4.33629E−03 | 1.58379E−03 | 7.56932E−03 |
| A6 | −2.91588E−04 | −1.81549E−04 | −7.83858E−04 |
| A8 | 9.11419E−06 | −1.18213E−05 | 4.79120E−05 |
| A10 | 1.28365E−07 | 1.92716E−06 | −1.73591E−06 |
| A12 | 0.000000E+00 | 0.000000E+00 | 0.000000E+00 |

An equation of the aspheric surfaces of the fourth embodiment is the same as that of the first embodiment, and the definitions are the same as well.

The exact parameters of the fourth embodiment based on Table 7 and Table 8 are listed in the following table:

| Fourth Embodiment (Primary Reference Wavelength = 555 nm) | | | | | |
|---|---|---|---|---|---|
| $\|f/f1\|$ | $\|f/f2\|$ | $\|f/f3\|$ | $\|f/f4\|$ | $\|f/f5\|$ | $\|f1/f2\|$ |
| 0.08902 | 0.32019 | 0.28029 | 0.53121 | 0.56045 | 3.59674 |
| ΣPPR | ΣNPR | ΣPPR/\|ΣNPR\| | IN12/f | IN45/f | \|f2/f3\| |
| 1.4118 | 0.3693 | 3.8229 | 2.1247 | 0.0181 | 0.8754 |
| TP3/(IN23 + TP3 + IN34) | | (TP1 + IN12)/TP2 | | (TP5 + IN45)/TP4 | |
| 0.73422 | | 3.51091 | | 0.53309 | |
| HOS | InTL | HOS/HOI | InS/HOS | ODT % | TDT % |
| 46.12590 | 41.77110 | 11.53148 | 0.23936 | −125.266 | 99.1671 |
| | | | | HVT52/ | HVT52/ |

| Fourth Embodiment (Primary Reference Wavelength = 555 nm) | | | | | |
|---|---|---|---|---|---|
| HVT41 | HVT42 | HVT51 | HVT52 | HOI | HOS |
| 0.00000 | 0.00000 | 0.00000 | 0.00000 | 0.00000 | 0.00000 |
| TP2/ | TP3/ | | | \|InRS51\|/ | \|InRS52\|/ |
| TP3 | TP4 | InRS51 | InRS52 | TP5 | TP5 |
| 0.23184 | 3.68765 | −0.679265 | 0.5369 | 0.32528 | 0.25710 |
| PhiA | PhiC | PhiD | TH1 | TH2 | HOI |
| 5.598 mm | 5.858 mm | 6.118 mm | 0.13 mm | 0.13 mm | 4 mm |
| PhiA/ | TH1 + | (TH1 + TH2)/ | (TH1 + TH2)/ | 2(TH1 + TH2)/ | |
| PhiD | TH2 | HOI | HOS | PhiA | |
| 0.9150 | 0.26 mm | 0.065 | 0.0056 | 0.0929 | |

Values related to the lengths of the outline curves of the fourth embodiment based on Table 7 and Table 8 are listed in the following table:

| Fourth embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.775 | 0.774 | −0.00052 | 99.93% | 6.117 | 12.65% |
| 12 | 0.775 | 0.774 | −0.00005 | 99.99% | 6.117 | 12.66% |
| 21 | 0.775 | 0.774 | −0.00048 | 99.94% | 3.430 | 22.57% |
| 22 | 0.775 | 0.776 | 0.00168 | 100.22% | 3.430 | 22.63% |
| 31 | 0.775 | 0.774 | −0.00031 | 99.96% | 14.794 | 5.23% |
| 32 | 0.775 | 0.776 | 0.00177 | 100.23% | 14.794 | 5.25% |
| 41 | 0.775 | 0.775 | 0.00059 | 100.08% | 4.012 | 19.32% |
| 42 | 0.775 | 0.779 | 0.00453 | 100.59% | 4.012 | 19.42% |

-continued

| Fourth embodiment (Reference wavelength: 555 nm) | | | | | |
|---|---|---|---|---|---|
| 51 | 0.775 | 0.778 | 0.00311 | 100.40% | 2.088 | 37.24% |
| 52 | 0.775 | 0.774 | −0.00014 | 99.98% | 2.088 | 37.08% |

| ARS | EHD | ARS value | ARS − EHD | (ARS/EHD)% | TP | ARS/TP (%) |
|---|---|---|---|---|---|---|
| 11 | 23.038 | 23.397 | 0.359 | 101.56% | 6.117 | 382.46% |
| 12 | 10.140 | 11.772 | 1.632 | 116.10% | 6.117 | 192.44% |
| 21 | 10.138 | 10.178 | 0.039 | 100.39% | 3.430 | 296.74% |
| 22 | 5.537 | 6.337 | 0.800 | 114.44% | 3.430 | 184.76% |
| 31 | 4.490 | 4.502 | 0.012 | 100.27% | 14.794 | 30.43% |
| 32 | 2.544 | 2.620 | 0.076 | 102.97% | 14.794 | 17.71% |
| 41 | 2.735 | 2.759 | 0.024 | 100.89% | 4.012 | 68.77% |
| 42 | 3.123 | 3.449 | 0.326 | 110.43% | 4.012 | 85.97% |
| 51 | 2.934 | 3.023 | 0.089 | 103.04% | 2.088 | 144.74% |
| 52 | 2.799 | 2.883 | 0.084 | 103.00% | 2.088 | 138.08% |

The results of the equations of the fourth embodiment based on Table 7 and Table 8 are listed in the following table:

| Values related to the inflection points of the fourth embodiment (Reference wavelength: 555 nm) | | | | | | |
|---|---|---|---|---|---|---|
| HIF211 | 6.3902 | HIF211/HOI | 1.5976 | SGI211 | −0.4793 | |SGI211|/(|SGI211| + TP2) | 0.1226 |
| HIF311 | 2.1324 | HIF311/HOI | 0.5331 | SGI311 | 0.1069 | |SGI311|/(|SGI311| + TP3) | 0.0072 |
| HIF411 | 2.0278 | HIF411/HOI | 0.5070 | SGI411 | 0.2287 | |SGI411|/(|SGI411| + TP4) | 0.0539 |
| HIF511 | 2.6253 | HIF511/HOI | 0.6563 | SGI511 | −0.5681 | |SGI511|/(|SGI511| + TP5) | 0.2139 |
| HIF512 | 2.1521 | HIF512/HOI | 0.5380 | SGI512 | −0.8314 | |SGI512|/(|SGI512| + TP5) | 0.2848 |

Fifth Embodiment

Figure 5A:
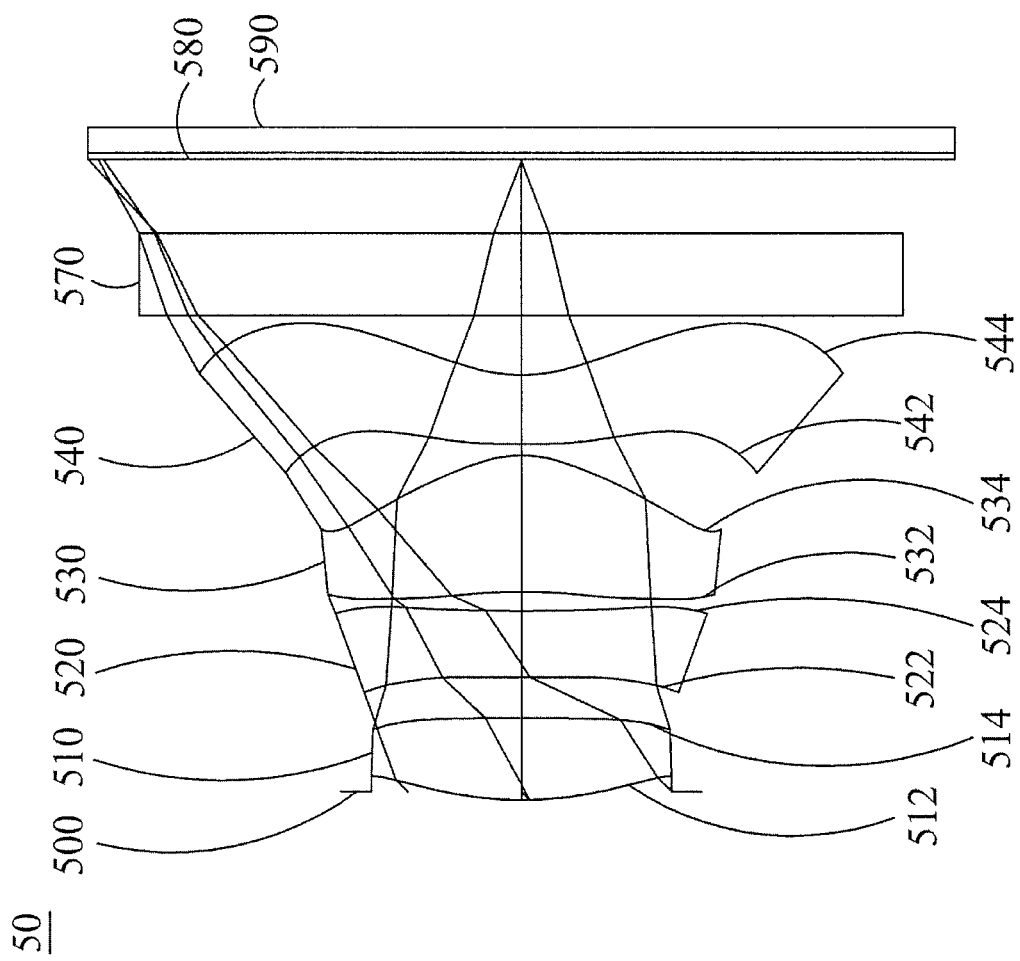
FIG. 5A is a schematic diagram of an optical image capturing system of a fifth embodiment of the present invention.
Figure 5B:
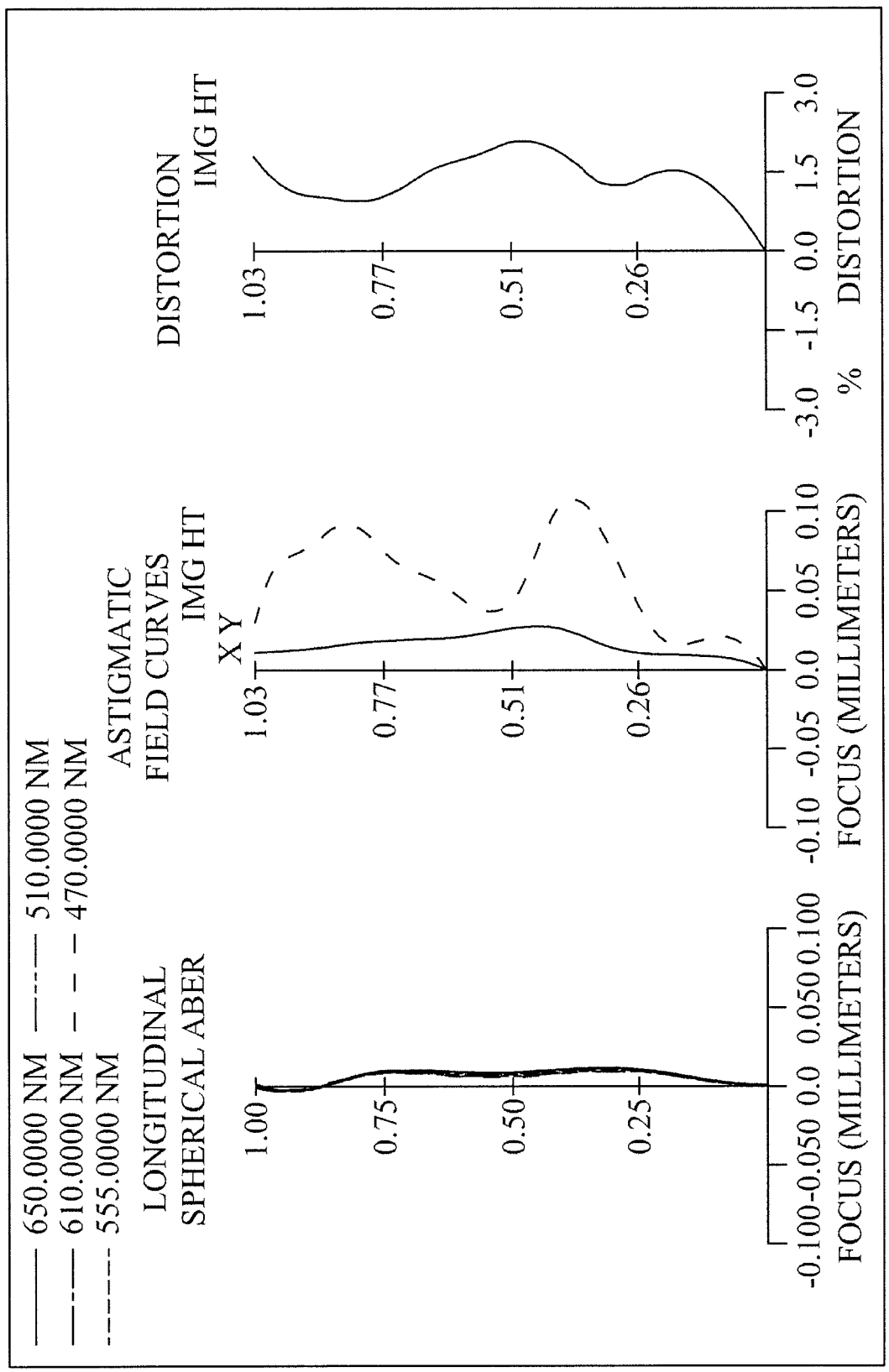
FIG. 5B shows curve diagrams of longitudinal spherical aberration, astigmatic field, and optical distortion of the optical image capturing system in the order from left to right, in accordance with the fifth embodiment of the present application.
Figure 5C:
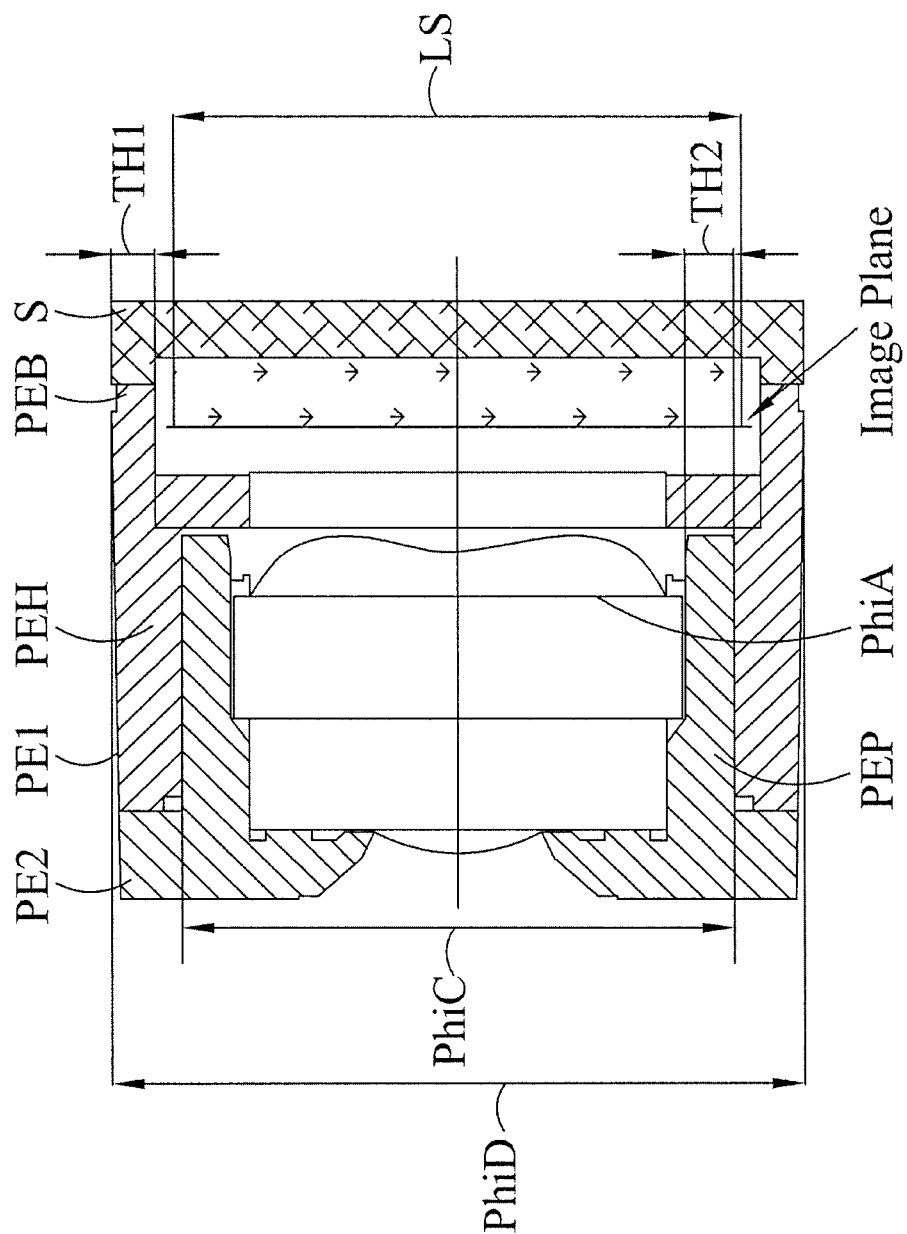
FIG. 5C is a schematic diagram depicting an assembly of a first positioning element and a second lens positioning element of the fifth embodiment of the present invention.

The following refers to FIGS. 5A through 5D. FIG. 5A is a schematic diagram of an optical imaging lens assembly of an optical image capturing system of a fifth embodiment of the present invention; FIG. 5B shows curve diagrams of longitudinal spherical aberration, astigmatic field, and optical distortion of the optical image capturing system in the order from left to right of the fifth embodiment of the present application; FIG. 5C is a schematic diagram depicting an assembly of a first positioning element and a second lens positioning element of the fifth embodiment of the present invention. An external side of the positioning portion PEP does not contact inner sides (the thread-less design is employed in the present embodiment) of the lens holder PEH. Furthermore, the manner of dispensing glues on object-side surfaces is selectively performed so as to make the first lens positioning element PE1 and the second lens positioning element PE2 dispensed by glue and fixed. As shown in FIG. 5A, the optical image capturing system of the fifth embodiment includes, along an optical axis from an object side to an image side, an aperture 500, a first lens 510, a second lens 520, a third lens 530, a fourth lens 540, an infrared filter 570, an image plane 580, and an image sensing element 590.

The first lens 510 has positive refractive power and is made of plastic. An object-side surface 512 thereof, which faces the object side, is a convex surface, and an image-side surface 514 thereof, which faces the image side, is a convex surface. Both the object-side surface 512 and image-side surface 514 are aspheric. The object-side surface 512 has one inflection point.

The second lens 520 has negative refractive power and is made of plastic. An object-side surface 522 thereof, which faces the object side, is a convex surface, and an image-side surface 524 thereof, which faces the image side, is a concave surface. Both the object-side surface 522 and image-side surface 524 are aspheric. The object-side surface 522 has two inflection points and the image-side surface 524 has one inflection point.

The third lens 530 has positive refractive power and is made of plastic. An object-side surface 532 thereof, which faces the object side, is a concave surface, and an image-side surface 534 thereof, which faces the image side, is a convex surface. Both the object-side surface 532 and image-side surface 534 are aspheric. The object-side surface 532 has three inflection points and the image-side surface 534 has one inflection point.

The fourth lens 540 has negative refractive power and is made of plastic. An object-side surface 542 thereof, which faces the object side, is a concave surface, and an image-side surface 544 thereof, which faces the image side, is a concave surface. Both the object-side surface 542 and image-side surface 544 are aspheric. The object-side surface 542 has two inflection points and the image-side surface 544 has one inflection point.

The infrared filter 570 is made of glass and between the fourth lens 540 and the image plane 580. The infrared filter 570 gives no contribution to the focal length of the system.

The parameters of the lenses of the fifth embodiment are listed in Table 9 and Table 10.

TABLE 9

Lens Parameters for the Fifth Embodiment
f(focal length) = 1.04102 mm; f/HEP = 1.4; HAF(half angle of view) = 44.0346 deg.

| Surface No | | Curvature Radius | Thickness (mm) | Material | Refractive Index | Coefficient of Dispersion | Focal Length |
|---|---|---|---|---|---|---|---|
| 0 | Object | 1E+18 | 600 | | | | |
| 1 | Aperture | 1E+18 | −0.020 | | | | |
| 2 | Lens 1 | 0.890166851 | 0.210 | Plastic | 1.545 | 55.96 | 1.587 |
| 3 | | −29.11040115 | −0.010 | | | | |
| 4 | | 1E+18 | 0.116 | | | | |
| 5 | Lens 2 | 10.67765398 | 0.170 | Plastic | 1.642 | 22.46 | −14.569 |
| 6 | | 4.977771922 | 0.049 | | | | |
| 7 | Lens 3 | −1.191436932 | 0.349 | Plastic | 1.545 | 55.96 | 0.510 |
| 8 | | −0.248990674 | 0.030 | | | | |
| 9 | Lens 4 | −38.08537212 | 0.176 | Plastic | 1.642 | 22.46 | −0.569 |
| 10 | | 0.372574476 | 0.152 | | | | |
| 11 | Infrared filter | 1E+18 | 0.210 | BK_7 | 1.517 | 64.13 | |
| 12 | | 1E+18 | 0.185 | | | | |
| 13 | Image Plane | 1E+18 | 0.005 | | | | |

Reference Wavelength = 555 nm; Shield Position: The 4th surface with effective aperture radius = 0.360 mm

TABLE 10

Coefficients of the aspheric surfaces of fifth embodiment
Table 10: Aspheric Coefficients

| | Surface No | | | | | |
|---|---|---|---|---|---|---|
| | 2 | 3 | 5 | 6 | 7 | 8 |
| k = | −1.106629E+00 | 2.994179E−07 | −7.788754E+01 | −3.440335E+01 | −8.522097E−01 | −4.735945E+00 |
| A4 = | 8.291155E−01 | −6.401113E−01 | −4.958114E+00 | −1.875957E+00 | −4.878227E−01 | −2.490377E+00 |
| A6= | −2.398799E+01 | −1.265726E+01 | 1.299769E+02 | 8.568480E+01 | 1.291242E+02 | 1.524149E+02 |
| A8 = | 1.825378E+02 | 8.457286E+01 | −2.736977E+03 | −1.279044E+03 | −1.979689E+03 | −4.841033E+03 |
| A10= | −6.211133E+02 | −2.157875E+02 | 2.908537E+04 | 8.661312E+03 | 1.456076E+04 | 8.053747E+04 |
| A12 = | −4.719066E+02 | −6.203600E+02 | −1.499597E+05 | −2.875274E+04 | −5.975920E+04 | −7.936887E+05 |
| A14 = | 0.000000E+00 | 0.000000E+00 | 2.992026E+05 | 3.764871E+04 | 1.351676E+05 | 4.811528E+06 |
| A16 = | 0.000000E+00 | 0.000000E+00 | 0.000000E+00 | 0.000000E+00 | −1.329001E+05 | −1.762293E+07 |
| A18 = | 0.000000E+00 | 0.000000E+00 | 0.000000E+00 | 0.000000E+00 | 0.000000E+00 | 3.579891E+07 |
| A20 = | 0.000000E+00 | 0.000000E+00 | 0.000000E+00 | 0.000000E+00 | 0.000000E+00 | −3.094006E+07 |

| | Surface No. | |
|---|---|---|
| | 9 | 10 |
| k = | −2.277155E+01 | −8.039778E−01 |
| A4 = | 1.672704E+01 | −7.613206E+00 |
| A6= | −3.260722E+02 | 3.374046E+01 |
| A8 = | 3.373231E+03 | −1.368453E+02 |
| A10= | −2.177676E+04 | 4.049486E+02 |
| A12 = | 8.951687E+04 | −9.711797E+02 |
| A14 = | −2.363737E+05 | 1.942574E+03 |
| A16 = | 3.983151E+05 | −2.876356E+03 |
| A18 = | −4.090689E+05 | 2.562386E+03 |
| A20 = | 2.056724E+05 | −9.943657E+02 |

An equation of the aspheric surfaces of the fifth embodiment is the same as that of the first embodiment, and the definitions are the same as well.

The exact parameters of the fifth embodiment based on Table 9 and Table 10 are listed in the following table:

Fifth Embodiment (Primary Reference Wavelength = 555 nm)

| InRS41 | InRS42 | HVT41 | HVT42 | ODT % | TDT % |
|---|---|---|---|---|---|
| −0.07431 | 0.00475 | 0.00000 | 0.53450 | 2.09403 | 0.84704 |
| \|f/f1\| | \|f/f2\| | \|f/f3\| | \|f/f4\| | \|f1/f2\| | \|f2/f3\| |

Fifth Embodiment (Primary Reference Wavelength = 555 nm)

| 0.65616 | 0.07145 | 2.04129 | 1.83056 | 0.10890 | 28.56826 |
|---|---|---|---|---|---|
| ΣPPR | ΣNPR | ΣPPR/\|ΣNPR\| | ΣPP | ΣNP | f1/ΣPP |
| 2.11274 | 2.48672 | 0.84961 | −14.05932 | 1.01785 | 1.03627 |
| f4/ΣNP | IN12/f | IN23/f | IN34/f | TP3/f | TP4/f |
| 1.55872 | 0.10215 | 0.04697 | 0.02882 | 0.33567 | 0.16952 |
| InTL | HOS | HOS/HOI | InS/HOS | InTL/HOS | ΣTP/InTL |
| 1.09131 | 1.64329 | 1.59853 | 0.98783 | 0.66410 | 0.83025 |
| (TP1 + IN12)/TP2 | (TP4 + IN34)/TP3 | TP1/TP2 | TP3/TP4 | IN23 + TP3) | IN23/(TP2 + |

-continued

| Fifth Embodiment (Primary Reference Wavelength = 555 nm) | | | | | |
|---|---|---|---|---|---|
| 1.86168 | 0.59088 | 1.23615 | 1.98009 | 0.08604 | |
| \|InRS41\|/TP4 | \|InRS42\|/TP4 | HVT42/HOI | HVT42/HOS | | |
| 0.4211 | 0.0269 | 0.5199 | 0.3253 | | |
| PhiA | PhiC | PhiD | TH1 | TH2 | HOI |
| 1.596 mm | 1.996 mm | 2.396 mm | 0.2 mm | 0.2 mm | 1.028 mm |
| PhiA/ | | | (TH1 + | 2 (TH1 + | |
| PhiD | TH1 + TH2 | (TH1 + TH2)/HOI | TH2)/HOS | TH2)/PhiA | |
| 0.7996 | 0.4 mm | 0.3891 | 0.2434 | 0.5013 | |

The results of the equations of the fifth embodiment based on Table 9 and Table 10 are listed in the following table:

| Values related to the inflection points of the fifth embodiment (Reference wavelength: 555 nm) | | | | | | | |
|---|---|---|---|---|---|---|---|
| HIF111 | 0.28454 | HIF111/HOI | 0.27679 | SGI111 | 0.04361 | \|SGI111\|/(\|SGI111\| + TP1) | 0.17184 |
| HIF211 | 0.04198 | HIF211/HOI | 0.04083 | SGI211 | 0.00007 | \|SGI211\|/(\|SGI211\| + TP2) | 0.00040 |
| HIF212 | 0.37903 | HIF212/HOI | 0.36871 | SGI212 | −0.03682 | \|SGI212\|/(\|SGI212\| + TP2) | 0.17801 |
| HIF221 | 0.25058 | HIF221/HOI | 0.24376 | SGI221 | 0.00695 | \|SGI221\|/(\|SGI221\| + TP2) | 0.03927 |
| HIF311 | 0.14881 | HIF311/HOI | 0.14476 | SGI311 | −0.00854 | \|SGI311\|/(\|SGI311\| + TP3) | 0.02386 |
| HIF312 | 0.31992 | HIF312/HOI | 0.31120 | SGI312 | −0.01783 | \|SGI312\|/(\|SGI312\| + TP3) | 0.04855 |
| HIF313 | 0.32956 | HIF313/HOI | 0.32058 | SGI313 | −0.01801 | \|SGI313\|/(\|SGI313\| + TP3) | 0.04902 |
| HIF321 | 0.36943 | HIF321/HOI | 0.35937 | SGI321 | −0.14878 | \|SGI321\|/(\|SGI321\| + TP3) | 0.29862 |
| HIF411 | 0.01147 | HIF411/HOI | 0.01116 | SGI411 | −0.00000 | \|SGI411\|/(\|SGI411\| + TP4) | 0.00001 |
| HIF412 | 0.22405 | HIF412/HOI | 0.21795 | SGI412 | 0.01598 | \|SGI412\|/(\|SGI412\| + TP4) | 0.08304 |
| HIF421 | 0.24105 | HIF421/HOI | 0.23448 | SGI421 | 0.05924 | \|SGI421\|/(\|SGI421\| + TP4) | 0.25131 |

Values related to the lengths of the outline curves of the fifth embodiment based on Table 9 and Table 10 are listed in the following table:

| Fifth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.372 | 0.375 | 0.00267 | 100.72% | 0.170 | 220.31% |
| 22 | 0.372 | 0.371 | −0.00060 | 99.84% | 0.170 | 218.39% |
| 31 | 0.372 | 0.372 | −0.00023 | 99.94% | 0.349 | 106.35% |
| 32 | 0.372 | 0.404 | 0.03219 | 108.66% | 0.349 | 115.63% |
| 41 | 0.372 | 0.373 | 0.00112 | 100.30% | 0.176 | 211.35% |
| 42 | 0.372 | 0.387 | 0.01533 | 104.12% | 0.176 | 219.40% |
| ARS | EHD | ARS value | ARS − EHD | (ARS/EHD) % | TP | ARS/TP (%) |
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.387 | 0.391 | 0.00383 | 100.99% | 0.170 | 229.73% |
| 22 | 0.458 | 0.460 | 0.00202 | 100.44% | 0.170 | 270.73% |
| 31 | 0.476 | 0.478 | 0.00161 | 100.34% | 0.349 | 136.76% |
| 32 | 0.494 | 0.538 | 0.04435 | 108.98% | 0.349 | 154.02% |
| 41 | 0.585 | 0.624 | 0.03890 | 106.65% | 0.176 | 353.34% |
| 42 | 0.798 | 0.866 | 0.06775 | 108.49% | 0.176 | 490.68% |

Sixth Embodiment

Figure 6A:
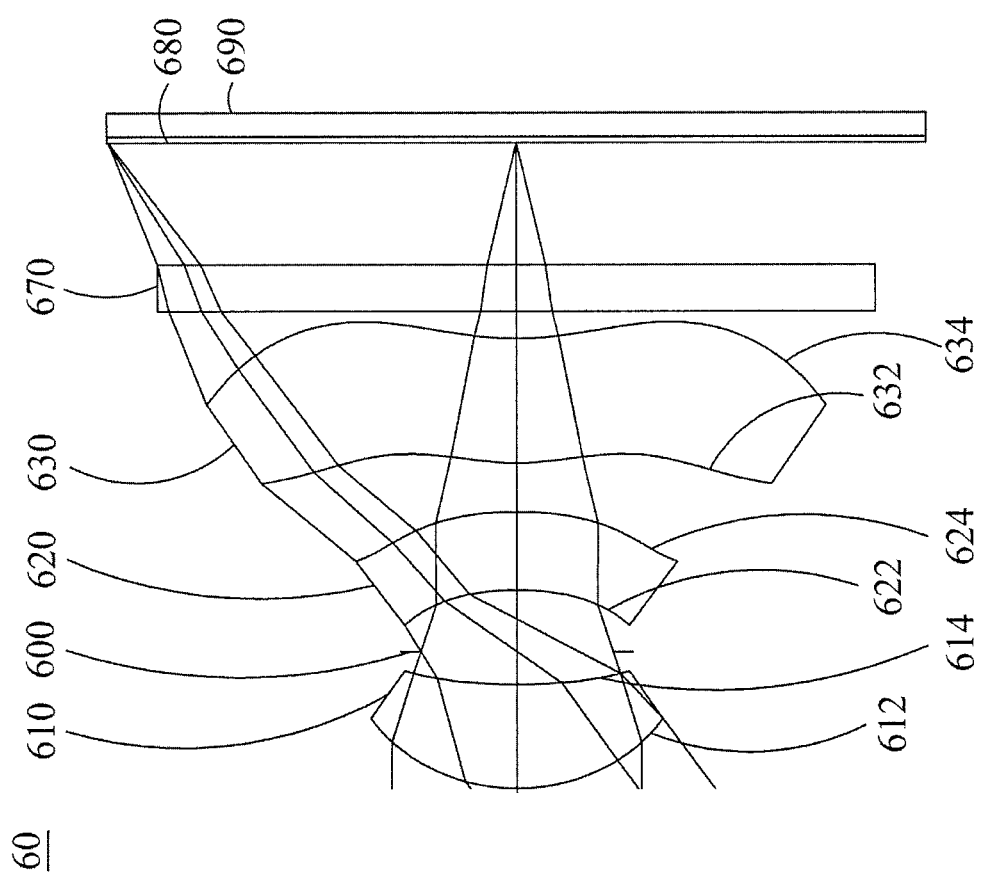
FIG. 6A is a schematic diagram of an optical image capturing system of a sixth embodiment of the present invention.
Figure 6B:
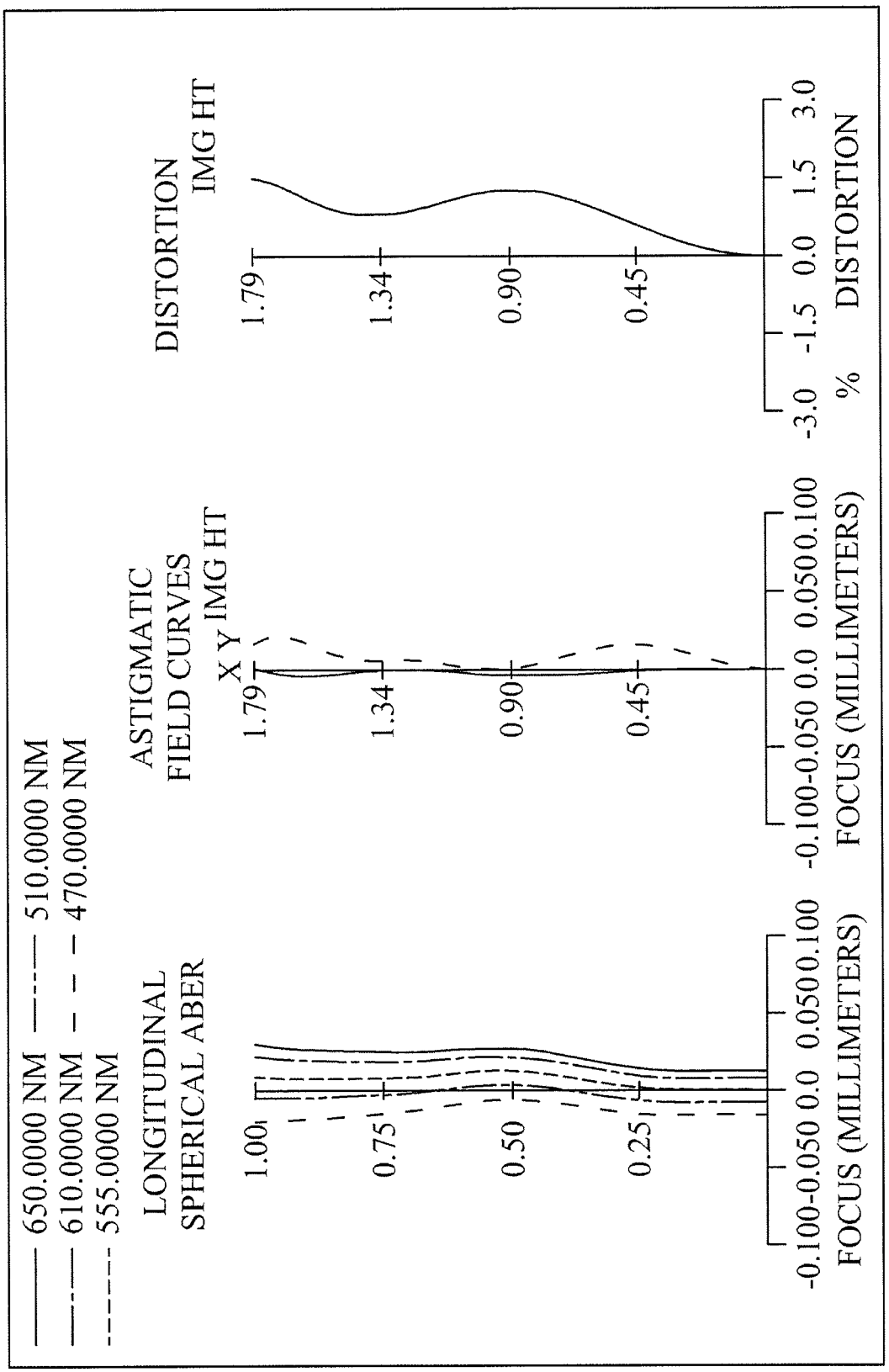
FIG. 6B shows curve diagrams of longitudinal spherical aberration, astigmatic field, and optical distortion of the optical image capturing system in the order from left to right, in accordance with the sixth embodiment of the present application.
Figure 6C:
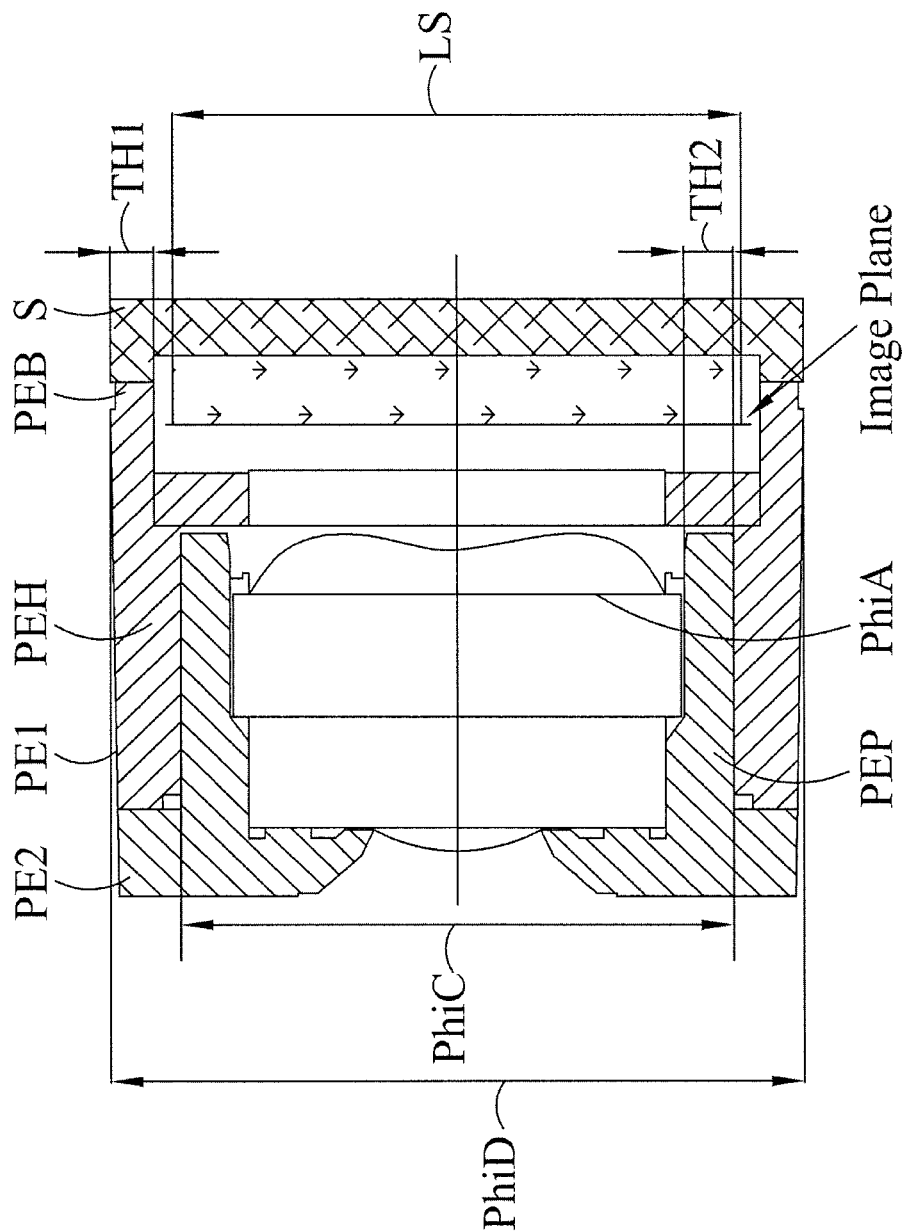
FIG. 6C is a schematic diagram depicting an assembly of a first positioning element and a second lens positioning element of the sixth embodiment of the present invention.

The following refers to FIGS. 6A through 6D. FIG. 6A is a schematic diagram of an optical imaging lens assembly of an optical image capturing system of a sixth embodiment of the present invention; FIG. 6B shows curve diagrams of longitudinal spherical aberration, astigmatic field, and optical distortion of the optical image capturing system in the order from left to right of the sixth embodiment of the present application; FIG. 6C is a schematic diagram depicting an assembly of a first positioning element and a second lens positioning element of the sixth embodiment of the present invention. An external side of the positioning portion PEP does not contact inner sides (the thread-less design is employed in the present embodiment) of the lens holder PEH. Furthermore, the manner of dispensing glues on object-side surfaces is selectively performed so as to make the first lens positioning element PE1 and the second lens positioning element PE2 dispensed by glue and fixed. As shown in FIG. 6A, the optical image capturing system includes, along an optical axis from an object side to an image side, a first lens 610, an aperture 600, a second lens 620, a third lens 630, an infrared filter 670, an image plane 680, and an image sensing element 690.

The first lens 610 has positive refractive power and is made of plastic. An object-side surface 612 thereof, which faces the object side, is a convex surface, and an image-side surface 614 thereof, which faces the image side, is a concave surface. Both the object-side surface 612 and the image-side surface 614 are aspheric.

The second lens 620 has negative refractive power and is made of plastic. An object-side surface 622 thereof, which faces the object side, is a concave surface, and an image-side surface 624 thereof, which faces the image side, is a convex surface. Both the object-side surface 622 and the image-side surface 624 are aspheric. The image-side surface 624 has one inflection point.

The third lens 630 has positive refractive power and is made of plastic. An object-side surface 632 thereof, which faces the object side, is a convex surface, and an image-side surface 634 thereof, which faces the image side, is a convex surface. Both the object-side surface 632 and the image-side surface 634 are aspheric. The object-side surface 632 has two inflection points and the image-side surface 634 has one inflection point.

The infrared filter 670 is made of glass and between the third lens 630 and the image plane 680. The infrared filter 670 gives no contribution to the focal length of the system.

The parameters of the lenses of the sixth embodiment are listed in Table 11 and Table 12.

TABLE 11

Lens Parameters for the Sixth Embodiment
f(focal length) = 2.41135 mm; f/HEP = 2.22; HAF(half angle of view) = 36 deg.

| Surface No | | Curvature Radius | Thickness (mm) | Material | Refractive Index | Coefficient of Dispersion | Focal Length |
|---|---|---|---|---|---|---|---|
| 0 | Object | 1E+18 | 600 | | | | |
| 1 | Lens 1 | 0.840352226 | 0.468 | Plastic | 1.535 | 56.27 | 2.232 |
| 2 | | 2.271975602 | 0.148 | | | | |
| 3 | Aperture | 1E+18 | 0.277 | | | | |
| 4 | Lens 2 | −1.157324239 | 0.349 | Plastic | 1.642 | 22.46 | −5.221 |
| 5 | | −1.968404008 | 0.221 | | | | |
| 6 | Lens 3 | 1.151874235 | 0.559 | Plastic | 1.544 | 56.09 | 7.360 |
| 7 | | 1.338105159 | 0.123 | | | | |
| 8 | Infrared filter | 1E+18 | 0.210 | BK_7 | 1.517 | 64.13 | |
| 9 | | 1E+18 | 0.547 | | | | |
| 10 | Image Plane | 1E+18 | 0.000 | | | | |

Reference Wavelength = 555 nm; Shield Position: The 1st surface with effective aperture radius = 0.640 mm

TABLE 12

Coefficients of the aspheric surfaces of the sixth embodiment
Table 12: Aspheric Coefficients

| | Surface No. | | | | | |
|---|---|---|---|---|---|---|
| | 1 | 2 | 4 | 5 | 6 | 7 |
| k = | −2.019203E−01 | 1.528275E+01 | 3.743939E+00 | −1.207814E+01 | −1.276860E+01 | −3.034004E+00 |
| A4 = | 3.944883E−02 | −1.670490E−01 | −4.266331E−01 | −1.696483E+00 | −7.396546E−01 | −5.308488E−01 |
| A6= | 4.774062E−01 | 3.857435E+00 | −1.423859E+00 | 5.164775E+00 | 4.449101E−01 | 4.374142E−01 |
| A8 = | −1.528780E+00 | −7.091408E+01 | 4.119587E+01 | −1.445541E+01 | 2.622372E−01 | −3.111192E−01 |
| A10= | 5.133947E+00 | 6.365801E+02 | −3.456462E+02 | 2.876958E+01 | −2.510946E−01 | 1.354257E−01 |
| A12 = | −6.250496E+00 | −3.141002E+03 | 1.495452E+03 | −2.662400E+01 | −1.048030E−01 | −2.652902E−02 |
| A14= | 1.068803E+00 | 7.962834E+03 | −2.747802E+03 | 1.661634E+01 | 1.462137E−01 | −1.203306E−03 |
| A16 = | 7.995491E+00 | −8.268637E+03 | 1.443133E+03 | −1.327827E+01 | −3.676651E−02 | 7.805611E−04 |

An equation of the aspheric surfaces of the sixth embodiment is the same as that of the first embodiment, and the definitions are the same as well.

The exact parameters of the sixth embodiment based on Table 11 and Table 12 are listed in the following table:

| Sixth Embodiment (Primary Reference Wavelength = 555 nm) | | | | | |
|---|---|---|---|---|---|
| |f/f1| | |f/f2| | |f/f3| | |f1/f2| | |f2/f3| | TP1/TP2 |
| 1.08042 | 0.46186 | 0.32763 | 2.33928 | 1.40968 | 1.33921 |
| ΣPPR | ΣNPR | ΣPPR/|ΣNPR| | IN12/f | IN23/f | TP2/TP3 |
| 1.40805 | 0.46186 | 3.04866 | 0.17636 | 0.09155 | 0.62498 |
| TP2/(IN12 + TP2 + IN23) | | (TP1 + IN12)/TP2 | | (TP3 + IN23)/TP2 | |
| 0.35102 | | 2.23183 | | 2.23183 | |
| HOS | InTL | HOS/HOI | InS/HOS | |ODT|% | |TDT|% |
| 2.90175 | 2.02243 | 1.61928 | 0.78770 | 1.50000 | 0.71008 |
| HVT21 | HVT22 | HVT31 | HVT32 | HVT32/HOI | HVT32/HOS |
| 0.00000 | 0.00000 | 0.46887 | 0.67544 | 0.37692 | 0.23277 |
| PhiA | PhiC | PhiD | TH1 | TH2 | HOI |
| 2.716 mm | 3.116 mm | 3.616 mm | 0.25 mm | 0.2 mm | 1.792 mm |
| PhiA/PhiD | TH1 + TH2 | (TH1 + TH2)/HOI | (TH1 + TH2)/HOS | 2 (TH1 + TH2)/PhiA | |
| 0.7511 | 0.45 mm | 0.2511 | 0.1551 | 0.3314 | |

The results of the equations of the sixth embodiment based on Table 11 and Table 12 are listed in the following table:

| Values related to the inflection points of the sixth embodiment (Reference wavelength: 555 nm) | | | | | | |
|---|---|---|---|---|---|---|
| HIF221 | 0.5599 | HIF221/HOI | 0.3125 | SGI221 | −0.1487 | \|SGI221\|/(\|SGI221\| + TP2) | 0.2412 |
| HIF311 | 0.2405 | HIF311/HOI | 0.1342 | SGI311 | 0.0201 | \|SGI311\|/(\|SGI311\| + TP3) | 0.0413 |
| HIF312 | 0.8255 | HIF312/HOI | 0.4607 | SGI312 | −0.0234 | \|SGI312\|/(\|SGI312\| + TP3) | 0.0476 |
| HIF321 | 0.3505 | HIF321/HOI | 0.1956 | SGI321 | 0.0371 | \|SGI321\|/(\|SGI321\| + TP3) | 0.0735 |

Values related to the lengths of the outline curves of the sixth embodiment based on Table 11 and Table 12 are listed in the following table:

| Sixth embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.546 | 0.598 | 0.052 | 109.49% | 0.468 | 127.80% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.546 | 0.572 | 0.026 | 104.78% | 0.349 | 163.78% |
| 31 | 0.546 | 0.548 | 0.002 | 100.36% | 0.559 | 98.04% |
| 32 | 0.546 | 0.550 | 0.004 | 100.80% | 0.559 | 98.47% |
| ARS | EHD | ARS value | ARS − EHD | (ARS/EHD) % | TP | ARS/TP (%) |
| 11 | 0.640 | 0.739 | 0.099 | 115.54% | 0.468 | 158.03% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.706 | 0.750 | 0.044 | 106.28% | 0.349 | 214.72% |
| 31 | 1.118 | 1.135 | 0.017 | 101.49% | 0.559 | 203.04% |
| 32 | 1.358 | 1.489 | 0.131 | 109.69% | 0.559 | 266.34% |

Figure 7A:
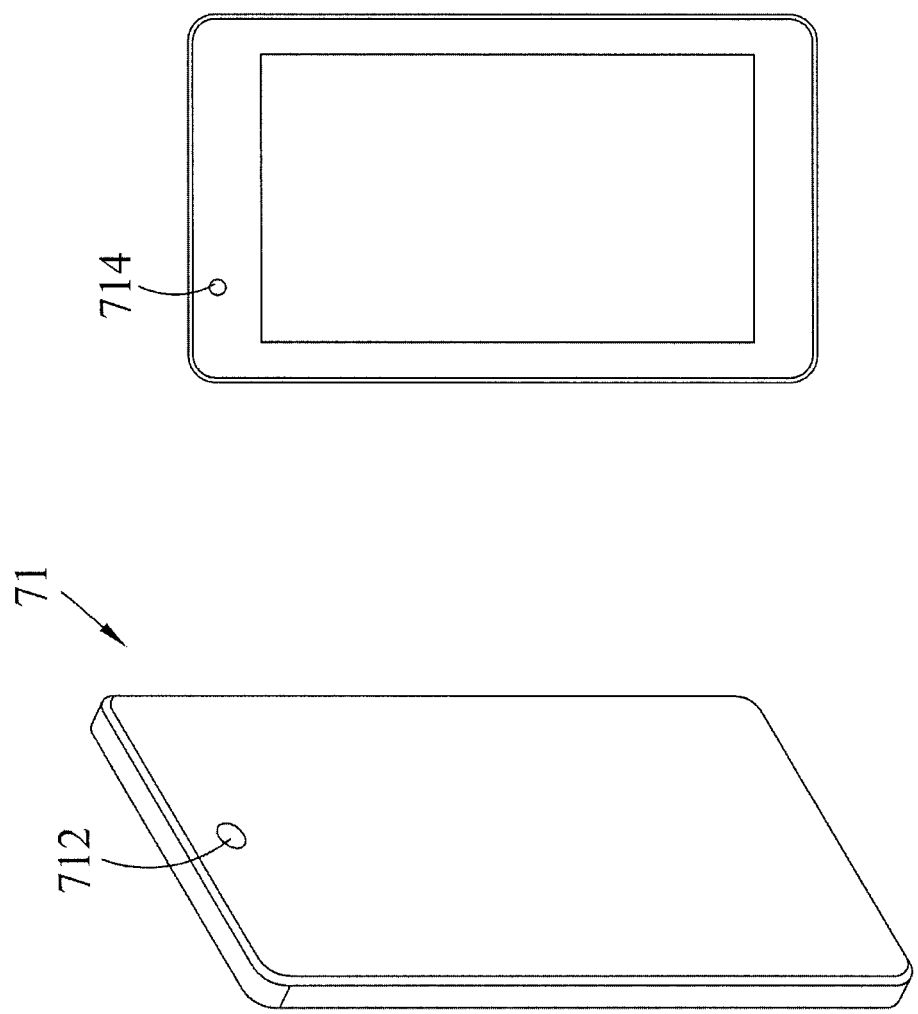
FIG. 7A shows a schematic view of the optical image capturing system applied to a mobile communication device, in accordance with the present invention.
Figure 7B:
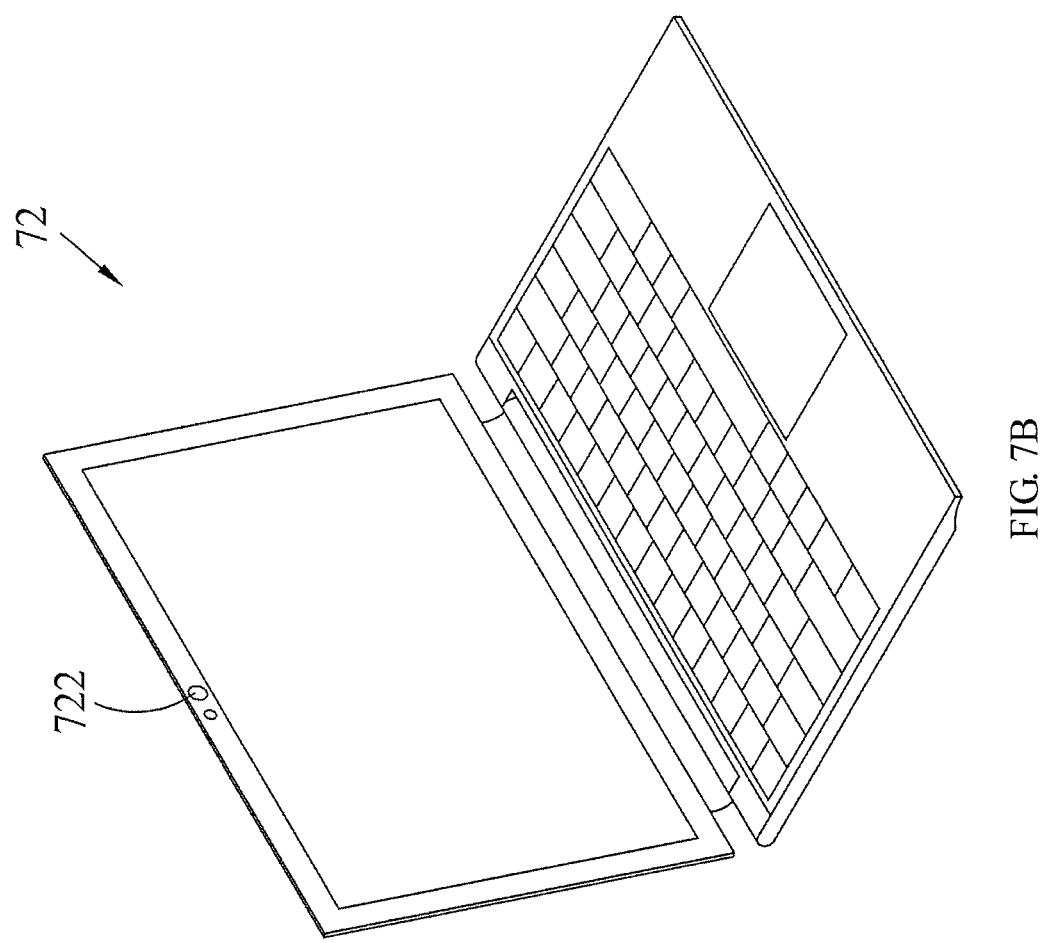
FIG. 7B shows a schematic view of the optical image capturing system applied to a mobile information device, in accordance with the present invention.
Figure 7C:
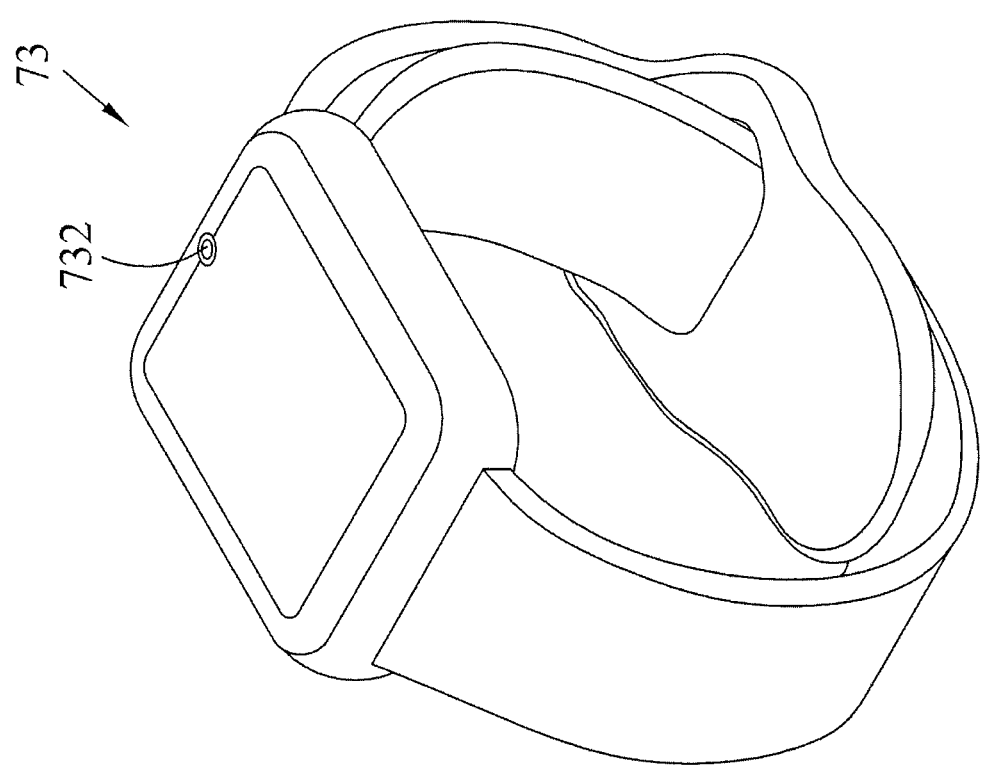
FIG. 7C shows a schematic view of the optical image capturing system applied to a smart watch, in accordance with the present invention.
Figure 7E:
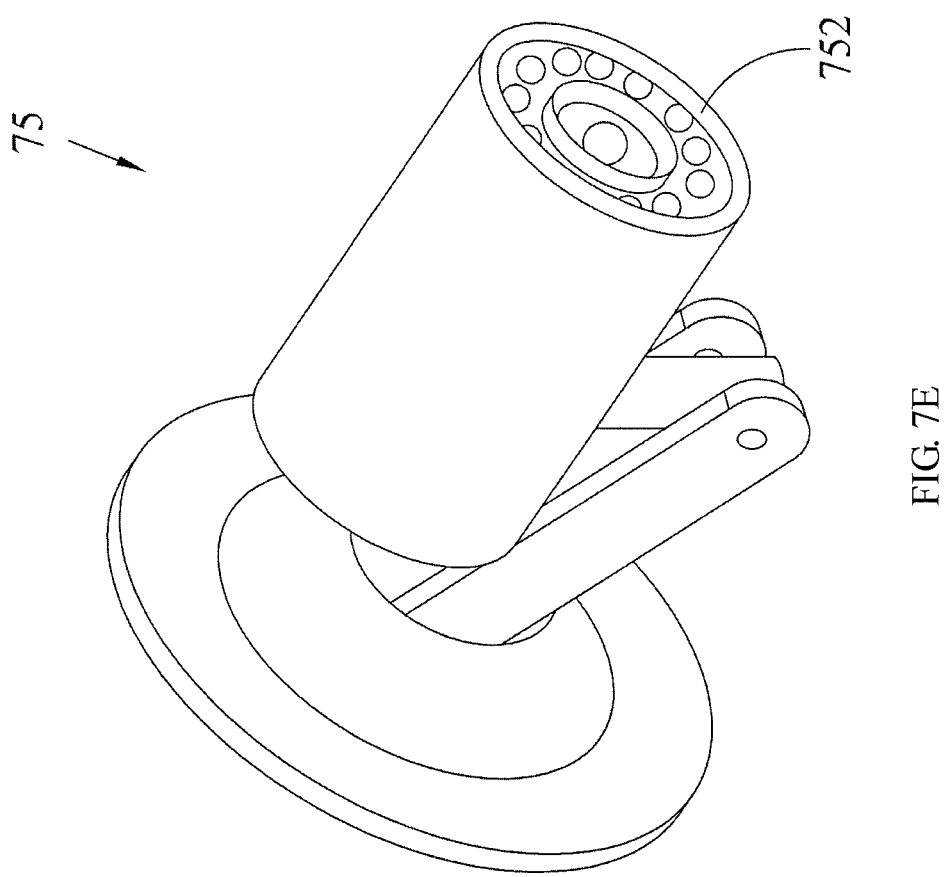
FIG. 7E shows a schematic view of the optical image capturing system applied to a security monitoring device, in accordance with the present invention.
Figure 7F:
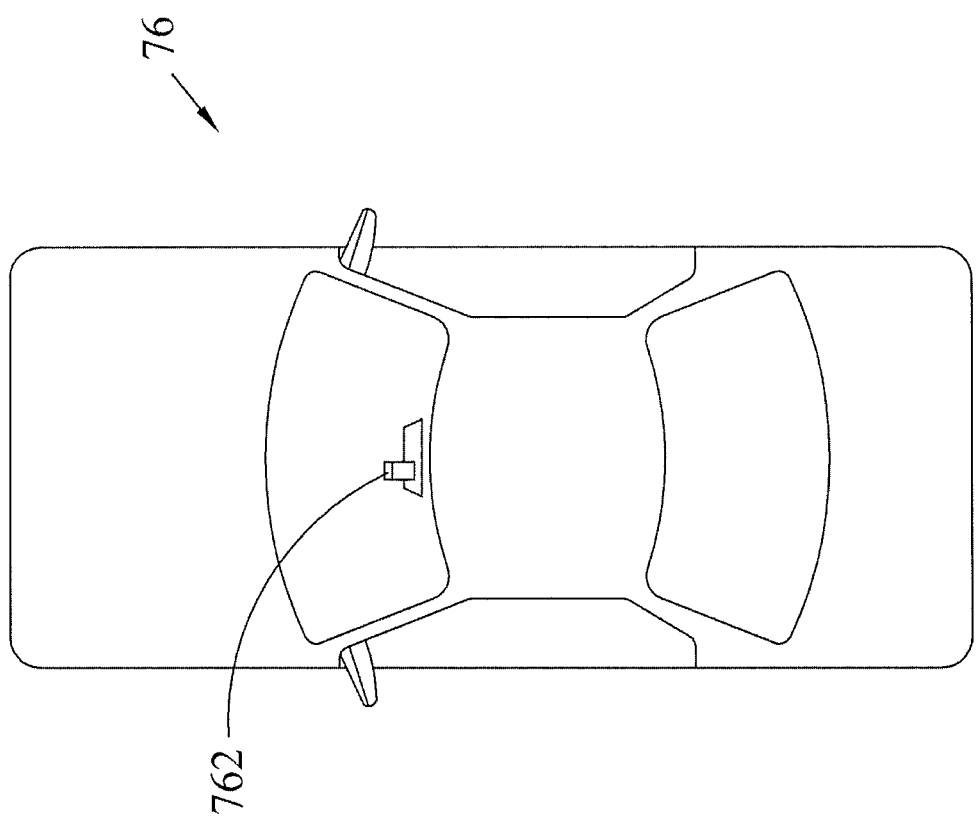
FIG. 7F shows a schematic view of the optical image capturing system applied to an automotive imaging device, in accordance with the present invention.
Figure 7G:
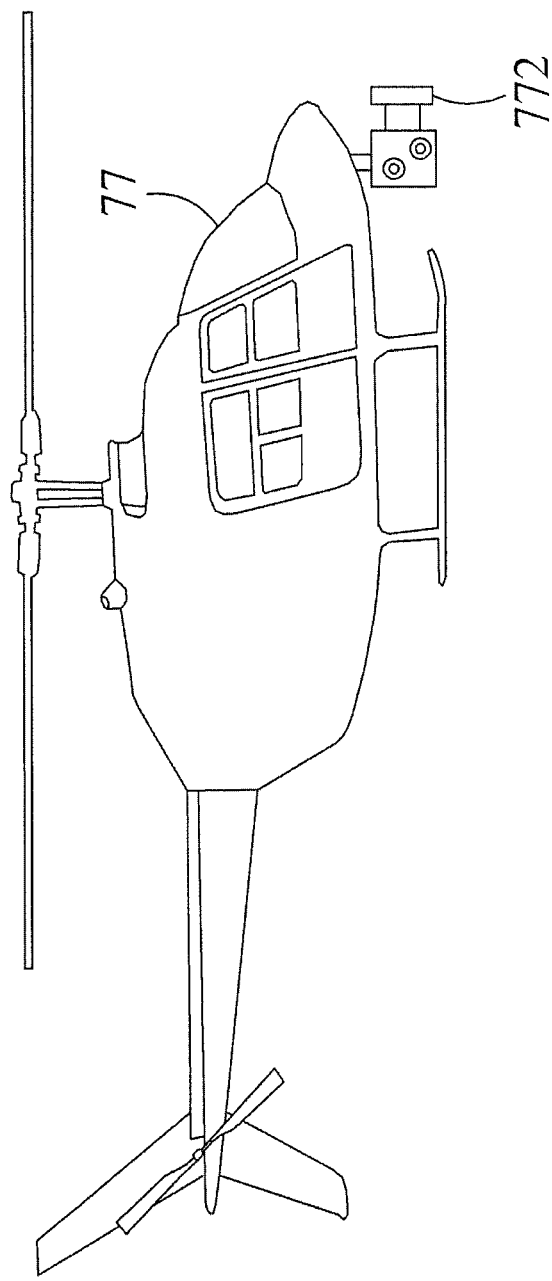
FIG. 7G shows a schematic view of the optical image capturing system applied to an unmanned aerial vehicle, in accordance with the present invention.
Figure 7H:
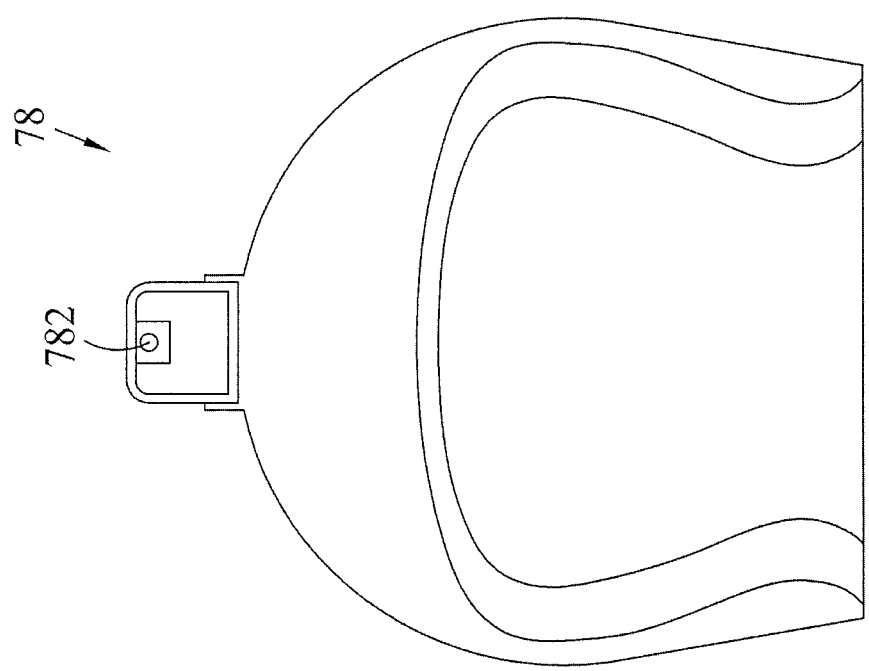
FIG. 7H shows a schematic view of the optical image capturing system applied to an extreme sport imaging device, in accordance with the present invention.

The optical image capturing system of present invention is selected from one among the group including an electronic portable device, an electronic wearable device, an electronic monitoring device, an electronic information device, an electronic communication device, a machinery visual device and an automotive electronic device, or from a combination thereof. The number and material of the lens of the lens assembly of the optical image capturing system may be adjusted upon demand, thereby providing a high imaging quality with respect to visible light and infrared light. Please refer to FIGS. 7A through 7H. FIG. 7A shows that an optical image capturing system 712 and an optical image capturing system 714 (acts as a front camera lens of the smart phone) of the present invention are applied to a mobile communication device 71, such as a smart phone. FIG. 7B shows that an optical image capturing system 722 of the present invention is applied to a mobile information device 72, such as a notebook. FIG. 7C shows that an optical image capturing system 732 of the present invention is applied to a smart watch 73. FIG. 7D shows that an optical image capturing system 742 of the present invention is applied to a smart head-mounted device 74, such as a smart hat. FIG. 7E shows that an optical image capturing system 752 of the present invention is applied to a security monitoring device 75, such as an IP Cam. FIG. 7F shows that an optical image capturing system 762 of the present invention is applied to an automotive imaging device 76. FIG. 7G shows that an optical image capturing system 772 of the present invention is applied to an unmanned aerial vehicle 77. FIG. 7H shows that an optical image capturing system 782 of the present invention is applied to an extreme sport imaging device 78.

Although the present invention is disclosed by the aforementioned embodiments, those embodiments do not serve to limit the scope of the present invention. A person skilled in the art can perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, comprising:
an optical imaging lens assembly comprising at least two lenses having refractive power;
an image plane;
a first lens positioning element, comprising a lens holder and a base seat, the lens holder being hollow and opaque for shielding the optical imaging lens assembly, the base seat being located proximate to the image plane for shielding the image plane, a side length on a plane of the periphery of the base seat and perpendicular to the optical axis of the optical imaging lens assembly is PhiD; and
a second lens positioning element, comprising a positioning portion accommodated in the lens holder, the positioning portion being hollow for accommodating the optical imaging lens assembly so as to make the lenses arranged on the optical axis, wherein internal sides of the lens holder are not in contact with any external side of the positioning portion, the first lens positioning element is bonded and fixed with the second lens positioning element in a manner of dispensing glue on at least the most object side surface of the first lens positioning element, a focal length of the optical imaging lens assembly is f, an entrance pupil diameter of the optical imaging lens assembly is HEP, a half maximum angle of view of the optical imaging lens assembly is HAF, and conditions as follows are satisfied: $1.0 \le f/HEP \le 10.0$, $0 \deg < HAF \le 150 \deg$, and $0 \text{ mm} < PhiD \le 18 \text{ mm}$.

2. The optical image capturing system according to claim 1, wherein a maximum effective diameter of an image-side surface of a lens closest to the image plane among the optical imaging lens assembly is PhiA, and a condition as follows is satisfied: $0 < PhiA/PhiD \le 0.99$.

3. The optical image capturing system according to claim 1, wherein a maximum thickness of a smallest side length of the base seat of the first lens positioning element is TH1, and a condition as follows is satisfied: $0 \text{ mm} < TH1 \le 0.5 \text{ mm}$.

4. The optical image capturing system according to claim 1, wherein a minimum thickness of the positioning portion is TH2, and a condition as follows is satisfied: $0 \text{ mm} < TH2 \le 0.5 \text{ mm}$.

5. The optical image capturing system according to claim 1, wherein the optical imaging lens assembly comprises three lenses having refractive power, a sequence from an object side to an image side is a first lens, a second lens and a third lens, a distance on the optical axis from an object-side surface of the first lens to the image plane is HOS, a distance on the optical axis from the object-side surface of the first lens to an image-side surface of the third lens is InTL, and a condition as follows is satisfied: $0.1 \le InTL/HOS \le 0.95$.

6. The optical image capturing system according to claim 1, wherein the optical imaging lens assembly comprises four lenses having refractive power, a sequence from an object side to an image side is a first lens, a second lens, a third lens and a fourth lens, a distance on the optical axis from an object-side surface of the first lens to the image plane is HOS, a distance on the optical axis from the object-side surface of the first lens to an image-side surface of the fourth lens is InTL, and a condition as follows is satisfied: $0.1 \le InTL/HOS \le 0.95$.

7. The optical image capturing system according to claim 1, wherein the optical imaging lens assembly comprises five lenses having refractive power, a sequence from an object side to an image side is a first lens, a second lens, a third lens, a fourth lens and a fifth lens, a distance on the optical axis from an object-side surface of the first lens to the image plane is HOS, a distance on the optical axis from the object-side surface of the first lens to an image-side surface of the fifth lens is InTL, and a condition as follows is satisfied: $0.1 \le InTL/HOS \le 0.95$.

8. The optical image capturing system according to claim 1, wherein the optical imaging lens assembly comprises six lenses having refractive power, a sequence from an object side to an image side is a first lens, a second lens, a third lens, a fourth lens, a fifth lens and a sixth lens, a distance on the optical axis from an object-side surface of the first lens to the image plane is HOS, a distance on the optical axis from the object-side surface of the first lens to an image-side surface of the sixth lens is InTL, and a condition as follows is satisfied: $0.1 \le InTL/HOS \le 0.95$.

9. The optical image capturing system according to claim 1, wherein the optical image capturing system further comprises an aperture and an image sensing element, the image sensing element is configured on the image plane, a distance on the optical axis from the aperture to the image plane is InS, a distance on the optical axis from an object-side surface of the first lens to the image plane is HOS, the optical image capturing system is structured such that the optical axis of the optical imaging lens assembly overlaps a normal line at a center of the image sensing element, and a condition as follows is satisfied: $0.2 \le InS/HOS \le 1.1$.

10. An optical image capturing system, comprising:
an optical imaging lens assembly, comprising at least two lenses having refractive power;
an image plane;
a first lens positioning element, comprising a lens holder and a base seat, the lens holder being hollow and opaque for shielding the optical imaging lens assembly, the base seat being located proximate to the image plane for shielding the image plane, a side length on a plane of the periphery of the base seat and perpendicular to the optical axis of the optical imaging lens assembly is PhiD; and
a second lens positioning element, comprising a positioning portion accommodated in the lens holder, the positioning portion being hollow for accommodating the optical imaging lens assembly so as to make the lenses arranged on the optical axis, wherein internal sides of the lens holder are not in contact with any external side of the positioning portion, the first lens positioning element is bonded and fixed with the second lens positioning element in a manner of dispensing glue on at least the most object side surface of the first lens positioning element, a focal length of the optical imaging lens assembly is f, an entrance pupil diameter of the optical imaging lens assembly is HEP, a half maximum angle of view of the optical imaging lens assembly is HAF, a maximum thickness of a smallest side length of the base seat is TH1, a minimum thickness of the positioning portion is TH2, and conditions as follows are satisfied: $1.0 \le f/HEP \le 10.0$, $0 \deg < HAF \le 150 \deg$, $0 \text{ mm} < PhiD \le 16 \text{ mm}$ and $0 \text{ mm} < TH1+TH2 \le 1.5 \text{ mm}$.

11. The optical image capturing system according to claim 10, wherein the optical image capturing system has a maximum image height HOI on the image plane and perpendicular to the optical axis, and a condition as follows is satisfied: $0 < (TH1+TH2)/HOI \le 0.95$.

12. The optical image capturing system according to claim 10, wherein a distance on the optical axis from an object-side surface of the first lens to the image plane is HOS, a condition as follows is satisfied: $0 < (TH1+TH2)/HOS \le 0.95$.

13. The optical image capturing system according to claim 10, wherein a maximum effective diameter of an image-side surface of a lens closest to the image plane among the optical imaging lens assembly is PhiA, and a condition as follows is satisfied: $0 < (TH1+TH2)/PhiA \le 0.95$.

14. The optical image capturing system according to claim 10, wherein the first lens positioning element and the second lens positioning element are fixed to each other by glue.

15. The optical image capturing system according to claim 10, wherein the optical imaging lens assembly comprises three lenses having refractive power, a sequence from an object side to an image side is a first lens, a second lens and a third lens, a distance on the optical axis from an object-side surface of the first lens to the image plane is HOS, a distance on the optical axis from the object-side surface of the first lens to an image-side surface of the third lens is InTL, and a condition as follows is satisfied: $0.1 \le InTL/HOS \le 0.95$.

16. The optical image capturing system according to claim 10, wherein the optical imaging lens assembly comprises four lenses having refractive power, a sequence from an object side to an image side is a first lens, a second lens, a third lens and a fourth lens, a distance on the optical axis from an object-side surface of the first lens to the image plane is HOS, a distance on the optical axis from the object-side surface of the first lens to an image-side surface of the fourth lens is InTL, and a condition as follows is satisfied: 0.1≤InTL/HOS≤0.95.

17. The optical image capturing system according to claim 10, wherein the optical imaging lens assembly comprises five lenses having refractive power, a sequence from an object side to an image side is a first lens, a second lens, a third lens, a fourth lens and a fifth lens, a distance on the optical axis from an object-side surface of the first lens to the image plane is HOS, a distance on the optical axis from the object-side surface of the first lens to an image-side surface of the fifth lens is InTL, and a condition as follows is satisfied: 0.1≤InTL/HOS≤0.95.

18. The optical image capturing system according to claim 10, wherein the optical imaging lens assembly comprises six lenses having refractive power, a sequence from an object side to an image side is a first lens, a second lens, a third lens, a fourth lens, a fifth lens and a sixth lens, a distance on the optical axis from an object-side surface of the first lens to the image plane is HOS, a distance on the optical axis from the object-side surface of the first lens to an image-side surface of the sixth lens is InTL, and a condition as follows is satisfied: 0.1≤InTL/HOS≤0.95.

19. The optical image capturing system according to claim 10, wherein the optical imaging lens assembly comprises seven lenses having refractive power, a sequence from an object side to an image side is a first lens, a second lens, a third lens, a fourth lens, a fifth lens, a sixth lens and a seventh lens, a distance on the optical axis from an object-side surface of the first lens to the image plane is HOS, a distance on the optical axis from the object-side surface of the first lens to an image-side surface of the seventh lens is InTL, and a condition as follows is satisfied: 0.1≤InTL/HOS≤0.95.

20. An optical image capturing system, comprising:
an optical imaging lens assembly, comprising at least three lenses having refractive power;
an image plane;
a first lens positioning element, comprising a lens holder and a base seat, the lens holder being hollow and opaque for shielding the optical imaging lens assembly, the base seat being located proximate to the image plane for shielding the image plane, a side length on a plane of the periphery of the base seat and perpendicular to the optical axis of the optical imaging lens assembly is PhiD; and
a second lens positioning element, comprising a positioning portion accommodated in the lens holder, the positioning portion being hollow for accommodating the optical imaging lens assembly so as to make the lenses arranged on the optical axis, wherein internal sides of the lens holder are not in contact with any external side of the positioning portion, the first lens positioning element is bonded and fixed with the second lens positioning element in a manner of dispensing glue on at least the most object side surface of the first lens positioning element, a focal length of the optical imaging lens assembly is f, an entrance pupil diameter of the optical imaging lens assembly is HEP, a half maximum angle of view of the optical imaging lens assembly is HAF, a maximum thickness of a smallest side length of the base seat is TH1, a minimum thickness of the positioning portion is TH2, and conditions as follows are satisfied: 1.0≤f/HEP≤10.0, 0 deg<HAF≤150 deg, 0 mm<PhiD≤18 mm, 0 mm<TH1≤0.3 mm and 0 mm<TH2≤0.3 mm.

21. The optical image capturing system according to claim 20, wherein a maximum effective diameter of an image-side surface of a lens closest to the image plane among the optical imaging lens assembly is PhiA, and a condition as follows is satisfied: 0<(PhiA/PhiD)≤0.99.

22. The optical image capturing system according to claim 20, wherein the optical image capturing system is selected from one among a group including an electronic portable device, an electronic wearable device, an electronic monitoring device, an electronic information device, an electronic communication device, a machinery visual device and an automotive electronic device.

23. The optical image capturing system according to claim 20, wherein the optical imaging lens assembly comprises four lenses having refractive power, a sequence from an object side to an image side is a first lens, a second lens, a third lens and a fourth lens, a distance on the optical axis from an object-side surface of the first lens to the image plane is HOS, a distance on the optical axis from the object-side surface of the first lens to an image-side surface of the fourth lens is InTL, and a condition as follows is satisfied: 0.1≤InTL/HOS≤0.95.

24. The optical image capturing system according to claim 20, wherein the optical imaging lens assembly comprises five lenses having refractive power, a sequence from an object side to an image side is a first lens, a second lens, a third lens, a fourth lens and a fifth lens, a distance on the optical axis from an object-side surface of the first lens to the image plane is HOS, a distance on the optical axis from the object-side surface of the first lens to an image-side surface of the fifth lens is InTL, and a condition as follows is satisfied: 0.1≤InTL/HOS≤0.95.

25. The optical image capturing system according to claim 20, wherein the first lens positioning element and the second lens positioning element are fixed to each other by glue.

* * * * *